US011925947B2

(12) United States Patent
Boulais

(10) Patent No.: US 11,925,947 B2
(45) Date of Patent: Mar. 12, 2024

(54) FLUID DISPENSER

(71) Applicant: GB DEVELOPPEMENT, Vernon (FR)

(72) Inventor: Guillaume Boulais, Levallois Perret (FR)

(73) Assignee: GB DEVELOPPEMENT, Vernon (FR)

( * ) Notice: Subject to any disclaimer, the term of this patent is extended or adjusted under 35 U.S.C. 154(b) by 1 day.

(21) Appl. No.: 17/627,856

(22) PCT Filed: Jul. 16, 2020

(86) PCT No.: PCT/EP2020/070226
§ 371 (c)(1),
(2) Date: Jan. 18, 2022

(87) PCT Pub. No.: WO2021/009324
PCT Pub. Date: Jan. 21, 2021

(65) Prior Publication Data

US 2022/0266281 A1 Aug. 25, 2022

(30) Foreign Application Priority Data

Jul. 18, 2019 (FR) ...................................... 1908182
Aug. 26, 2019 (FR) ...................................... 1909405
Jun. 11, 2020 (FR) ...................................... 2006090

(51) Int. Cl.

| | |
|---|---|
| ***B05B 11/00*** | (2023.01) |
| ***B05B 11/04*** | (2006.01) |
| ***B05B 15/65*** | (2018.01) |
| ***B05B 15/30*** | (2018.01) |
| ***A45D 34/04*** | (2006.01) |
| *B05B 1/34* | (2006.01) |

(52) U.S. Cl.
CPC ............ *B05B 11/048* (2013.01); *A45D 34/04* (2013.01); *B05B 11/0029* (2013.01);
(Continued)

(58) Field of Classification Search
CPC ............... B05B 11/048; B05B 11/0029; B05B 11/0035; B05B 11/0054; B05B 11/0047;
(Continued)

(56) References Cited

U.S. PATENT DOCUMENTS 4,046,495 A 9/1977 Grimm, Jr.
4,154,374 A * 5/1979 Kirk, Jr. ............. B05B 11/0064 222/321.2

(Continued)

FOREIGN PATENT DOCUMENTS

EP 0484835 A1 3/1995
EP 2216099 A1 8/2010

(Continued)

OTHER PUBLICATIONS

International Search Report dated Oct. 20, 2020 in corresponding International Application No. PCT/EP2020/070226.

*Primary Examiner* — Vishal Pancholi
(74) *Attorney, Agent, or Firm* — Renner, Otto, Boisselle & Sklar, LLP

(57) ABSTRACT

A fluid dispenser device including an outlet, a pocket having an interior volume for containing a fluid, the interior volume being delimited at least in part by a movable wall, a reservoir arranged to contain the fluid, a pocket cap, a cavity, a reservoir orifice joining the reservoir and the cavity; wherein the pocket cap is arranged to be mounted by insertion in the cavity of the device so as to be mounted by extending: —by passing through the pocket at least partially while passing through the movable wall or—by going along the pocket at least partially, the device comprising an inlet orifice arranged to insert the pocket cap into the device from the outside of the device and opening into the cavity.

28 Claims, 22 Drawing Sheets

(52) U.S. Cl.
CPC ...... *B05B 11/0035* (2013.01); *B05B 11/0054* (2013.01); *B05B 11/047* (2013.01); *B05B 15/30* (2018.02); *B05B 15/65* (2018.02); *A45D 2200/055* (2013.01); *B05B 1/3436* (2013.01)

(58) Field of Classification Search
CPC ....... B05B 15/30; B05B 15/65; B05B 1/3436; B05B 11/0089; B05B 11/1035; B05B 11/1069; B05B 11/1074; B05B 11/0056; B05B 11/0091; B05B 11/026; B05B 11/028; B05B 11/1004; B05B 11/1029; B05B 11/1032; B05B 11/1043; B05B 11/1052; B05B 11/1059; B05B 11/1061; B05B 11/1064; B05B 11/107; B05B 11/1077; B05B 11/1094; B05B 11/0032; B05B 1/28; B05B 11/007; B05B 11/0097; B05B 11/047; A45D 34/04; A45D 2200/055; A45D 34/041
See application file for complete search history.

(56) References Cited

U.S. PATENT DOCUMENTS

| | | | | |
|---|---|---|---|---|
| 4,183,449 A * | 1/1980 | Blake | B05B 11/1016 | 222/321.2 |
| 5,437,398 A * | 8/1995 | Ritsche | B05B 11/1004 | 222/321.8 |
| 2010/0224653 A1* | 9/2010 | Donnette | B05B 11/1025 | 222/321.9 |
| 2015/0075038 A1* | 3/2015 | Hahn | D06F 87/00 | 38/3 |
| 2015/0202644 A1* | 7/2015 | Bruder | B05B 11/1077 | 222/383.1 |

FOREIGN PATENT DOCUMENTS

| | | | |
|---|---|---|---|
| EP | 2851132 | A1 | 3/2015 |
| FR | 2746076 | A1 | 9/1997 |
| WO | 2014/029568 | A1 | 2/2014 |
| WO | 2015/155318 | A1 | 10/2015 |

* cited by examiner

[Fig. 1]
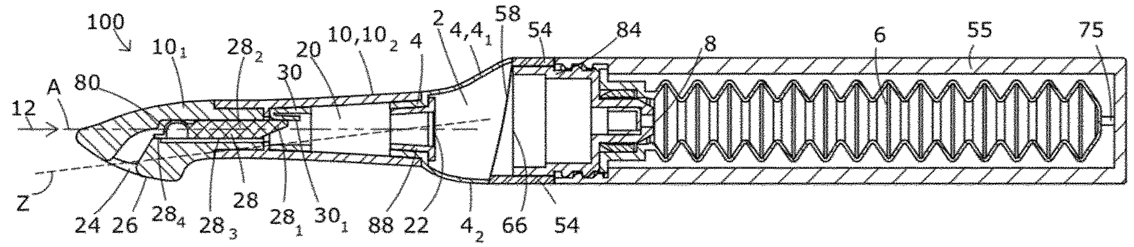
[Fig. 2]
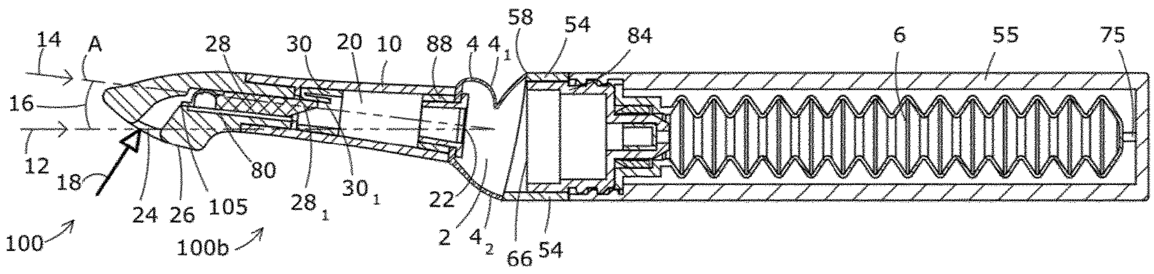
[Fig. 3]
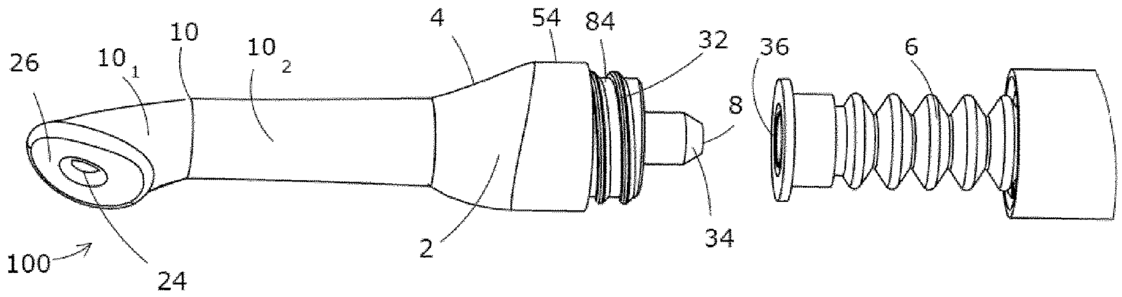

[Fig. 4]
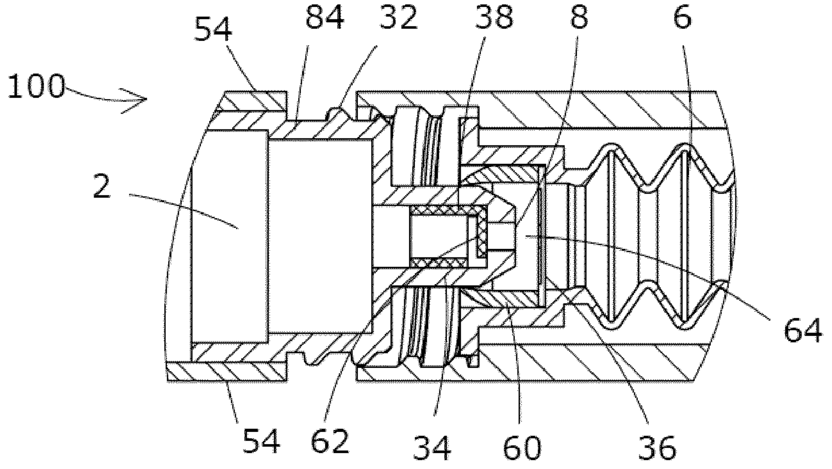
[Fig. 5]
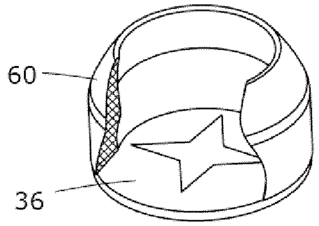
[Fig. 6]
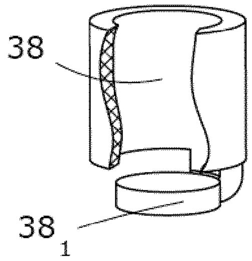

[Fig. 7]
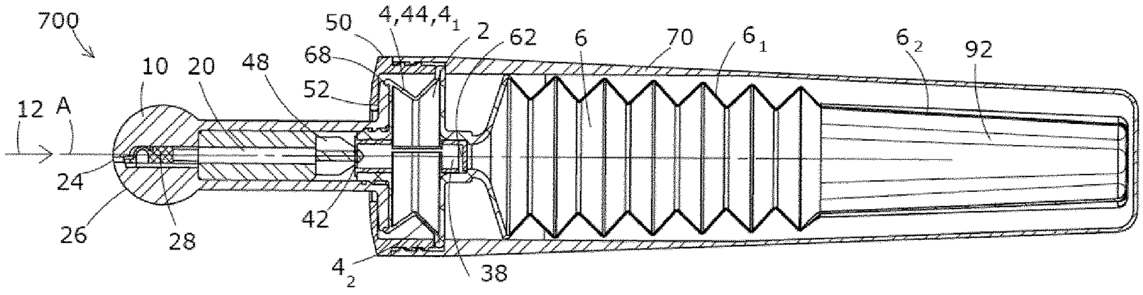
[Fig. 8]
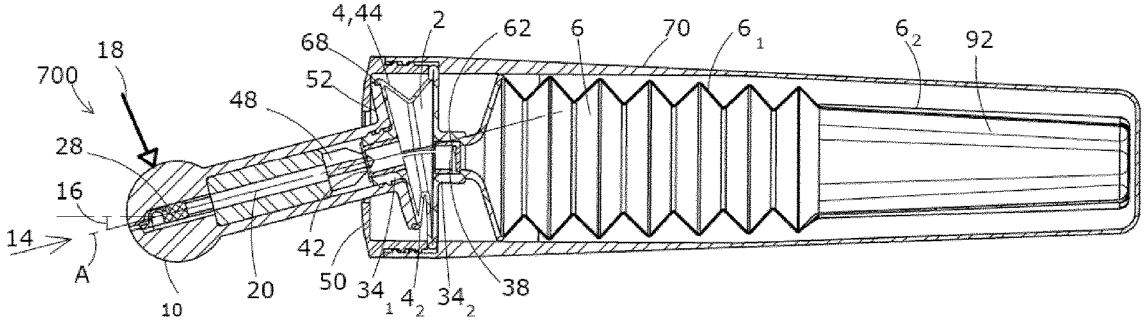
[Fig. 9]
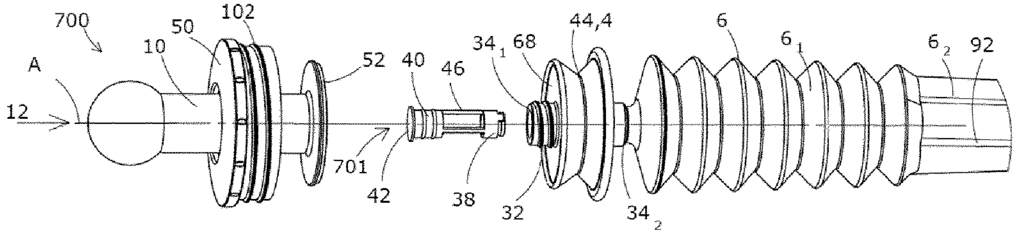

[Fig. 10]
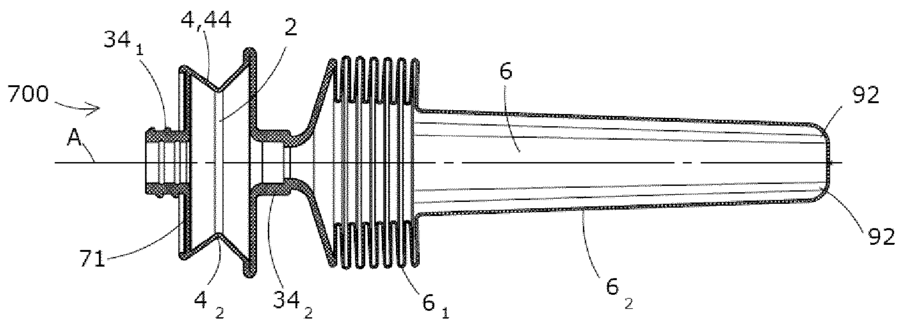
[Fig. 11]
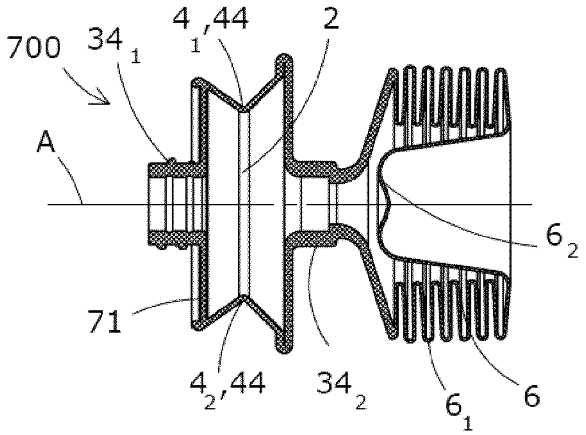
[Fig. 12]
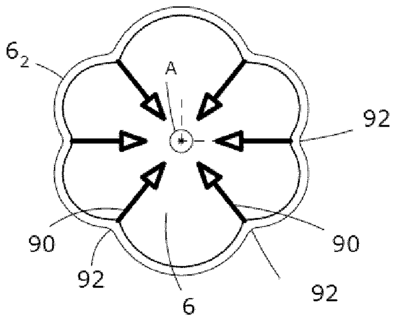

[Fig. 13]
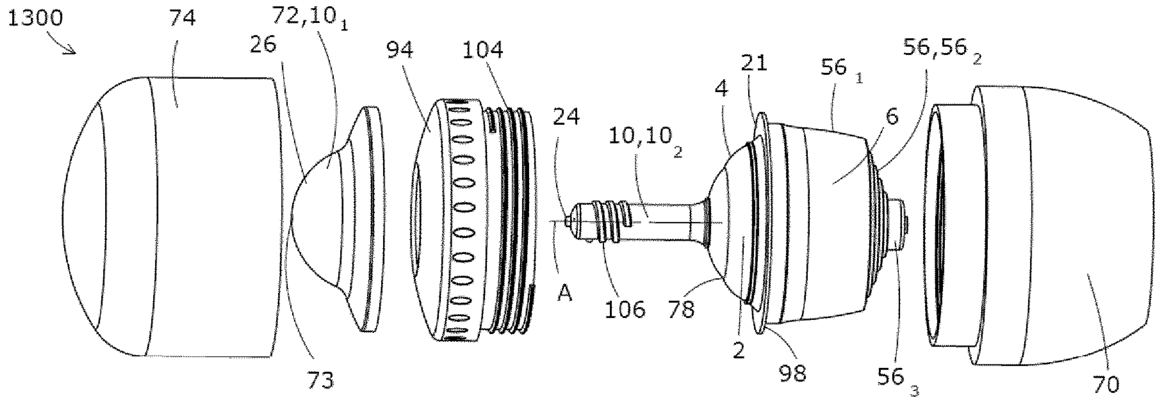
[Fig. 14]
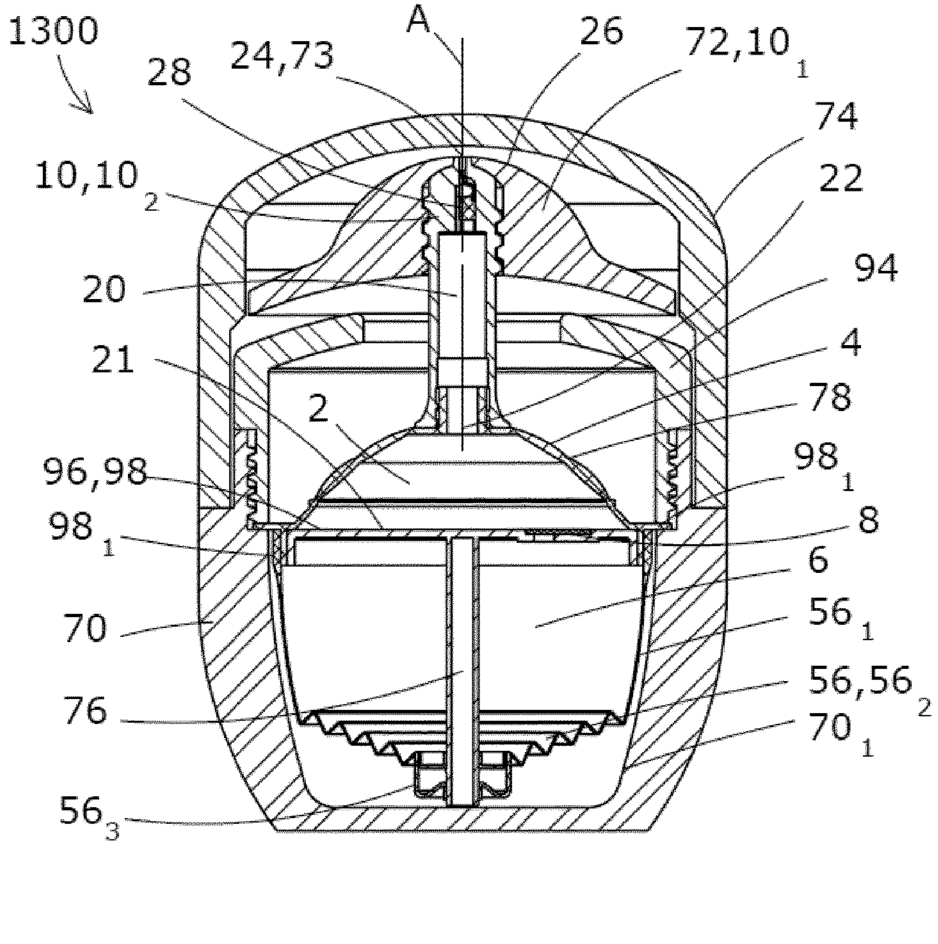

[Fig. 15]
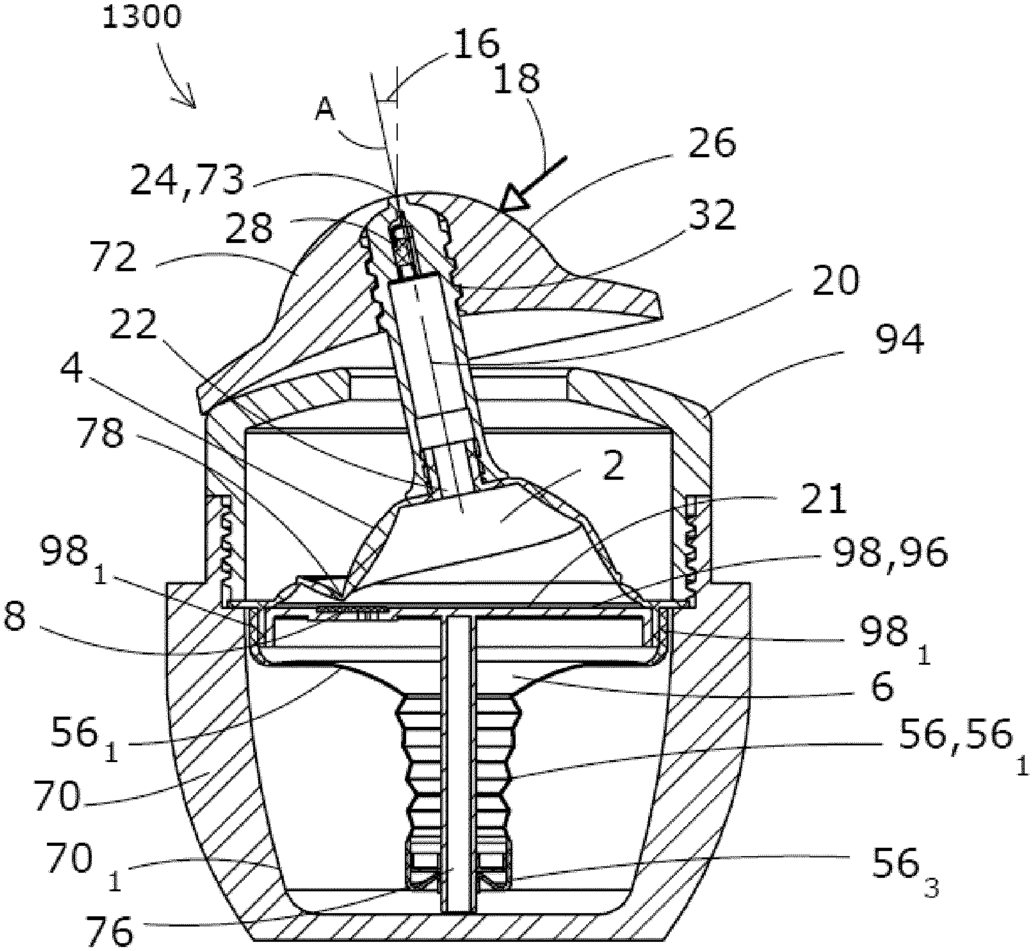
[Fig. 16]
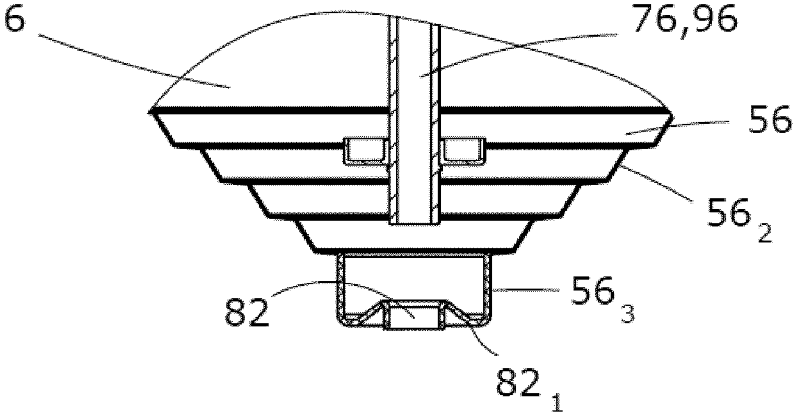

[Fig. 17]
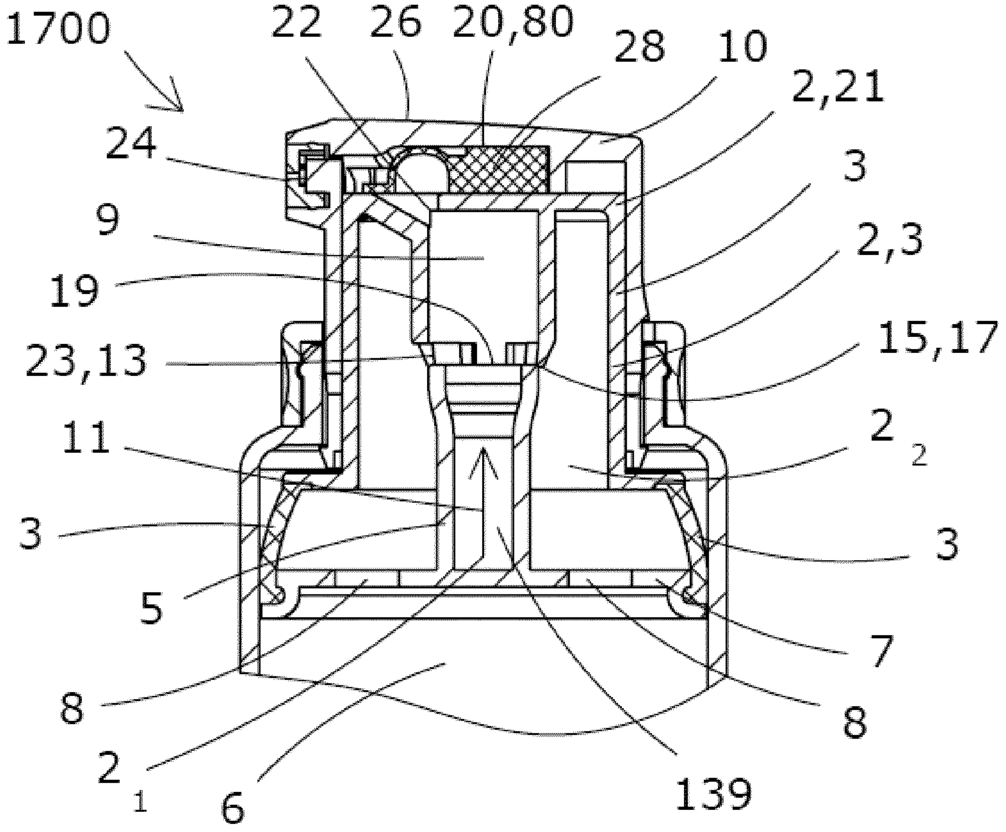
[Fig. 18]
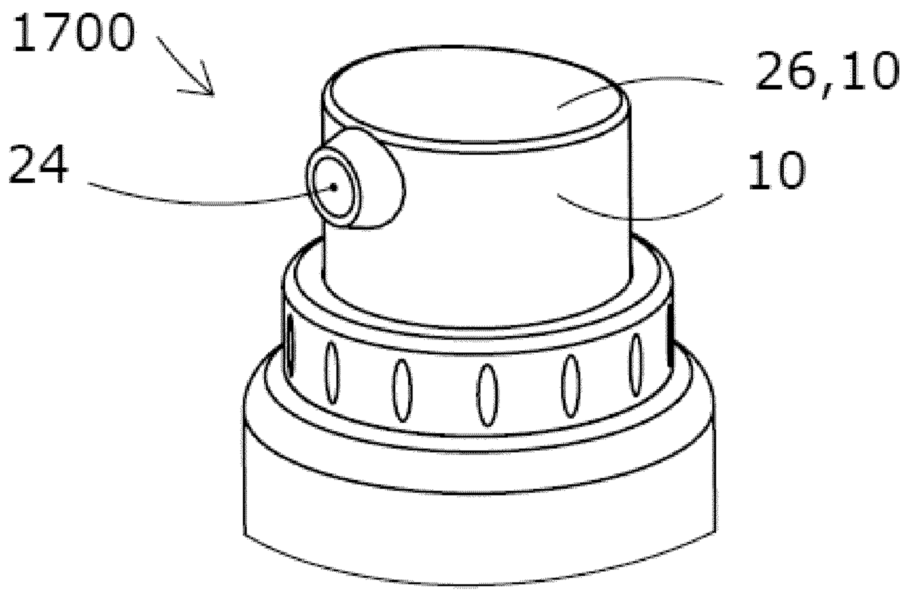

[Fig. 19]
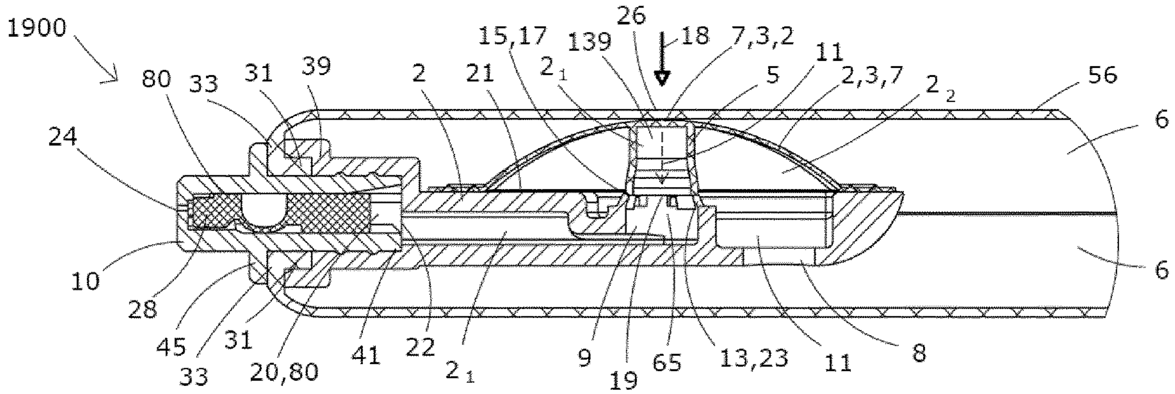
[Fig. 20]
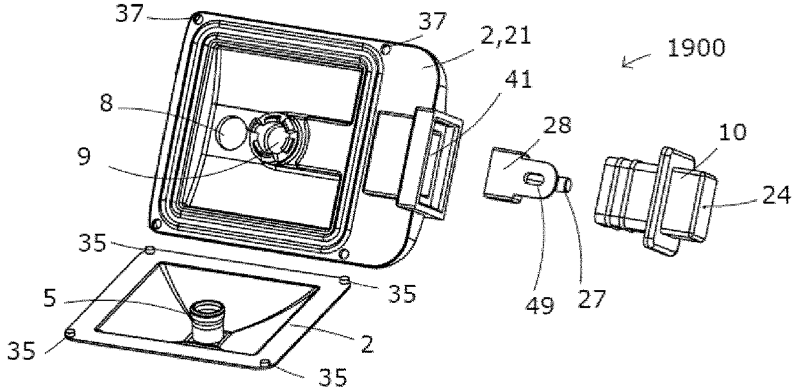
[Fig. 21]
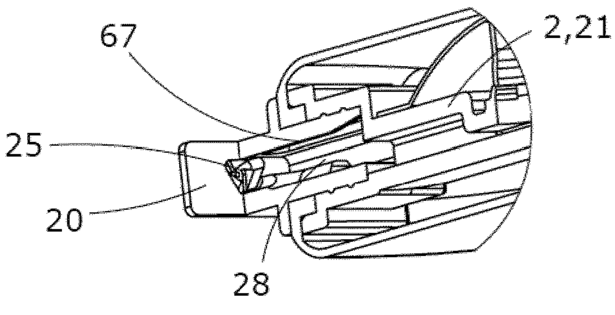

[Fig. 22]
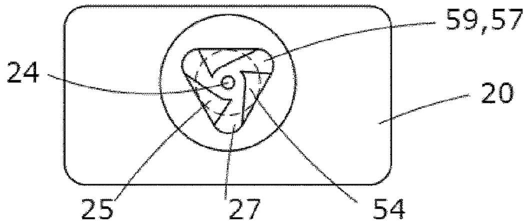
[Fig. 23]
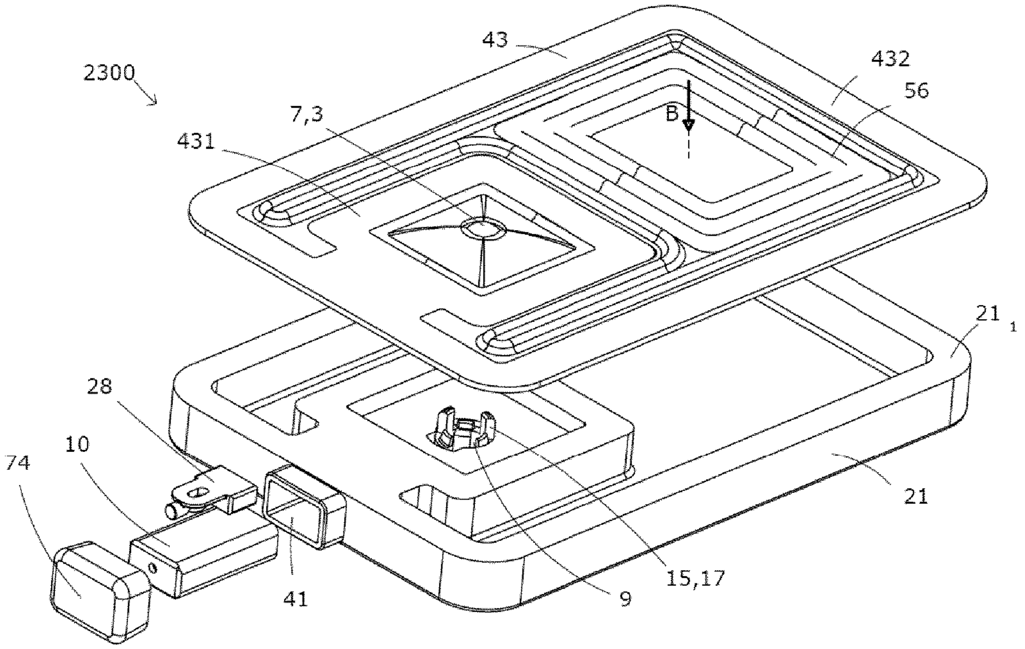
[Fig. 24]
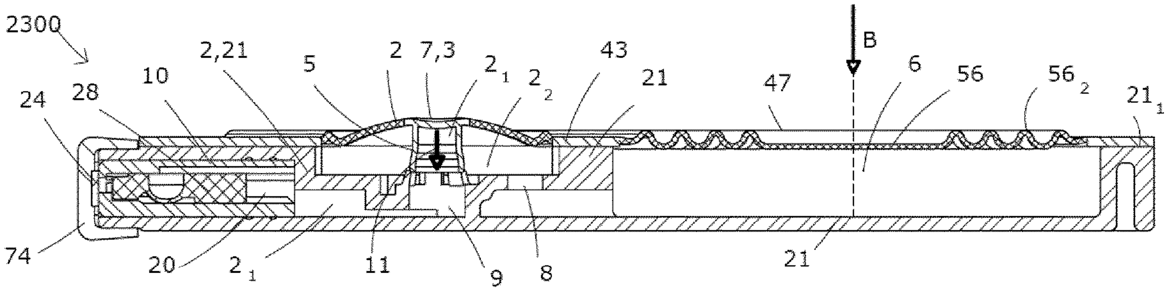

[Fig. 25]
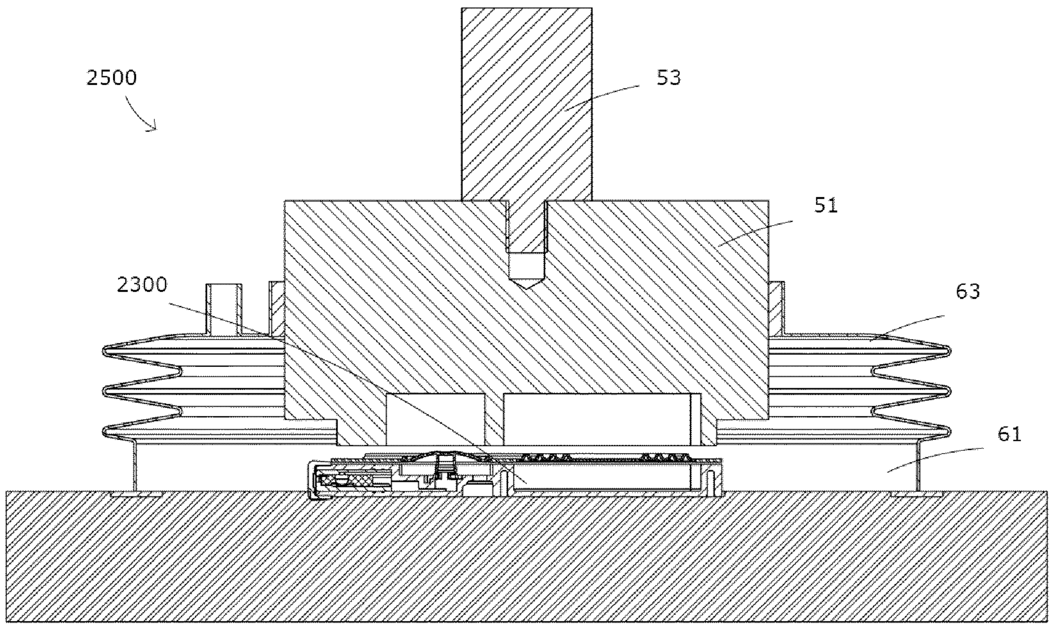

[Fig. 26]
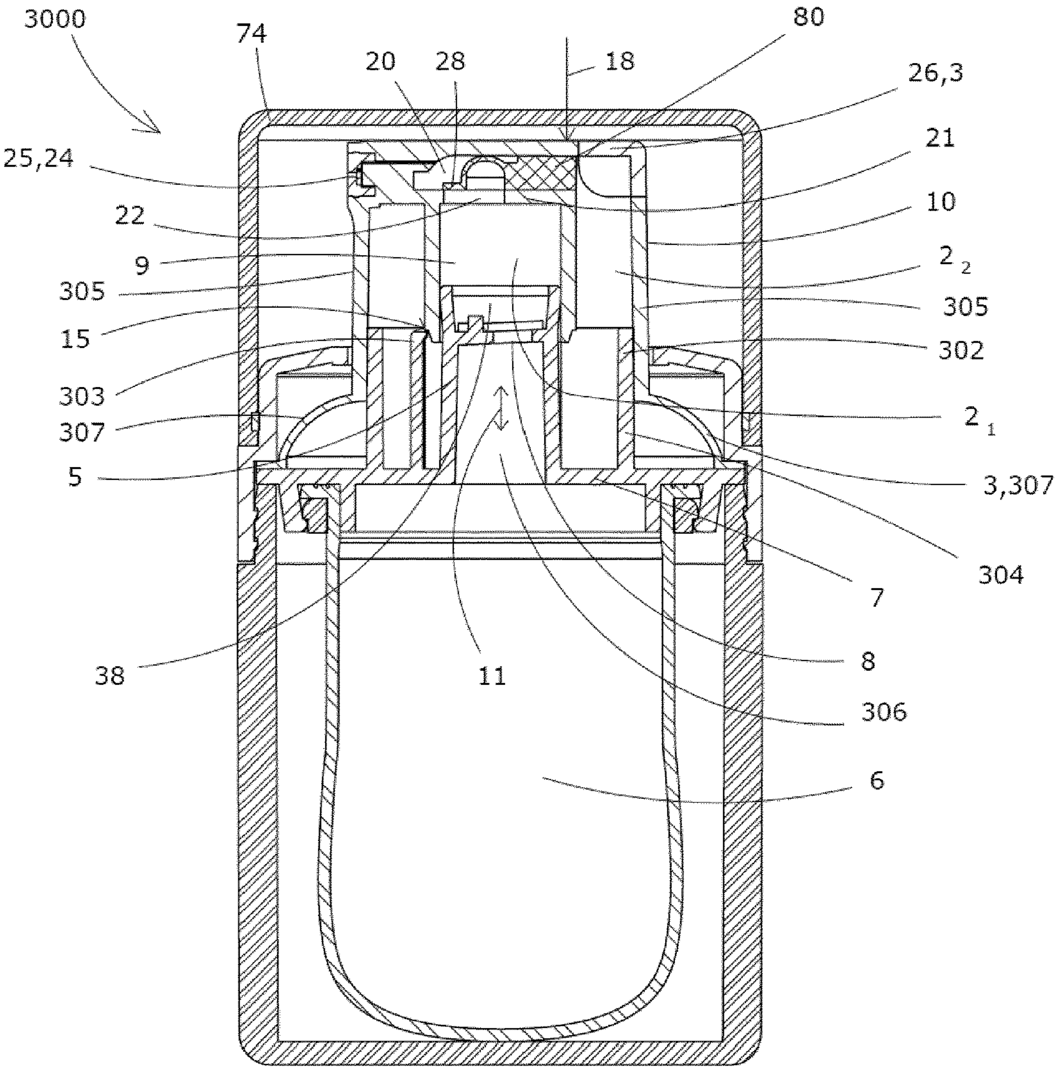
[Fig. 27]
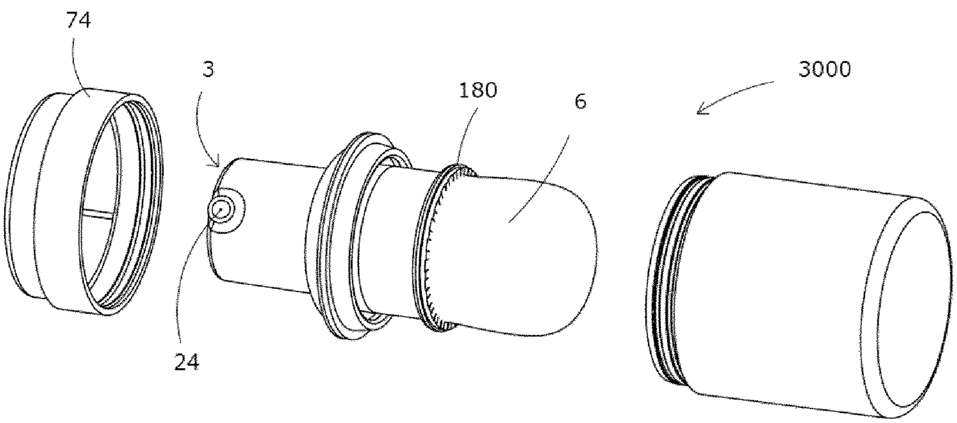

[Fig. 28]
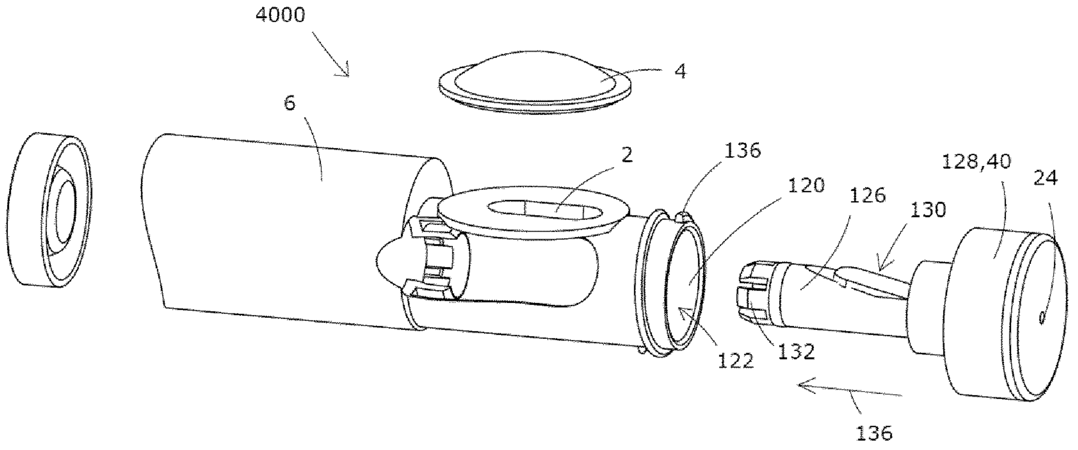
[Fig. 29]
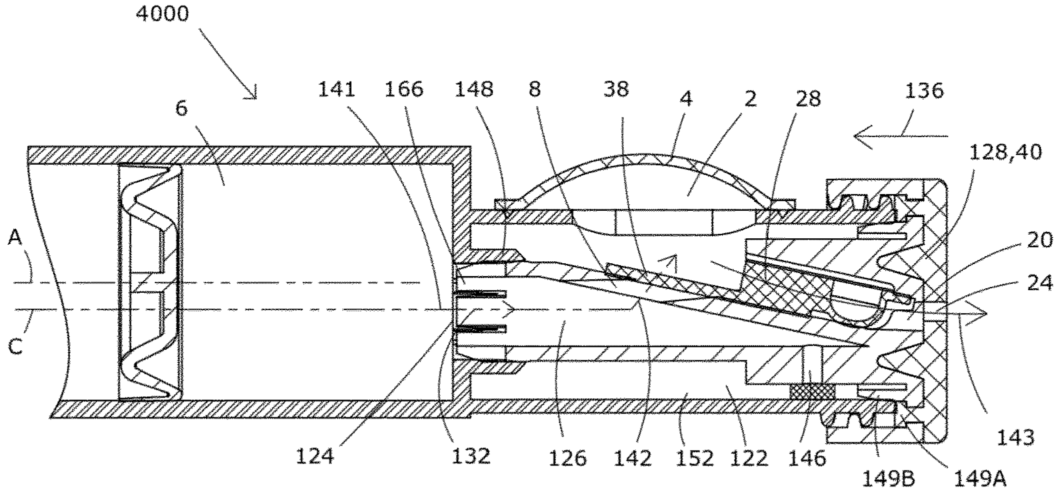
[Fig. 30]
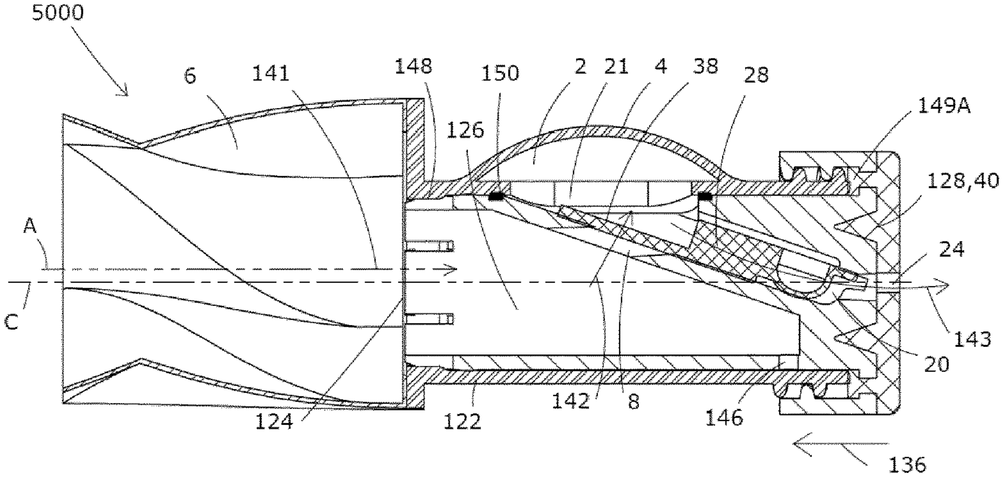

[Fig. 31]
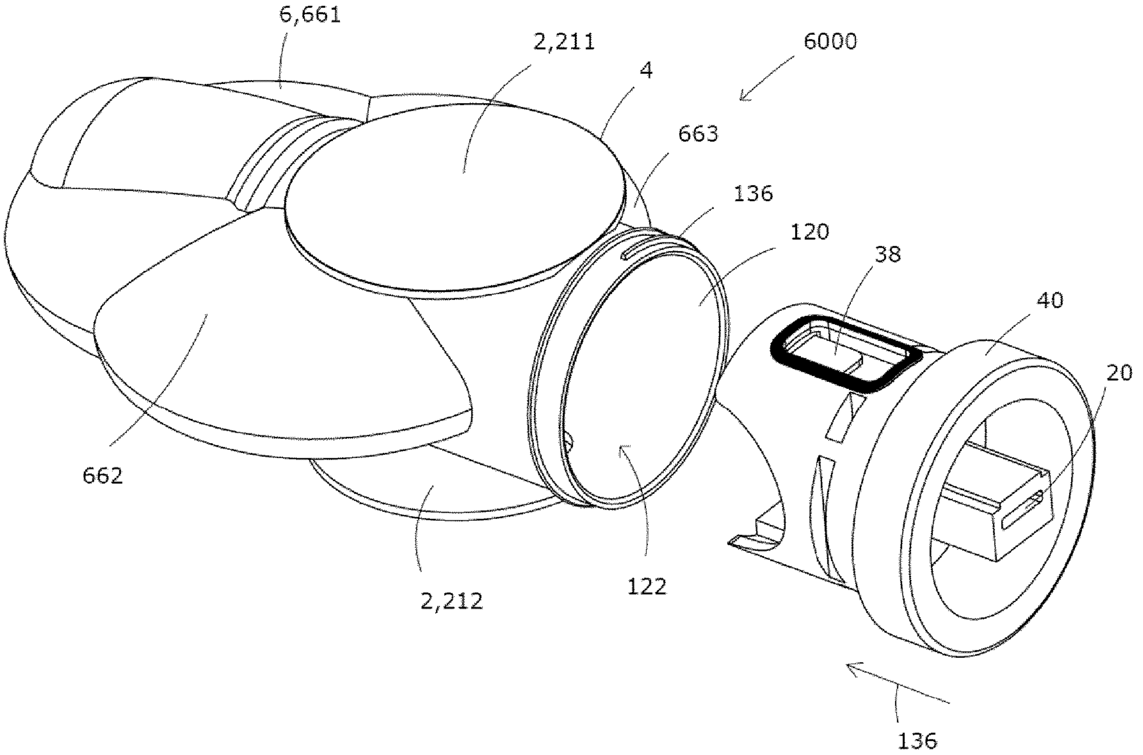
[Fig. 32]
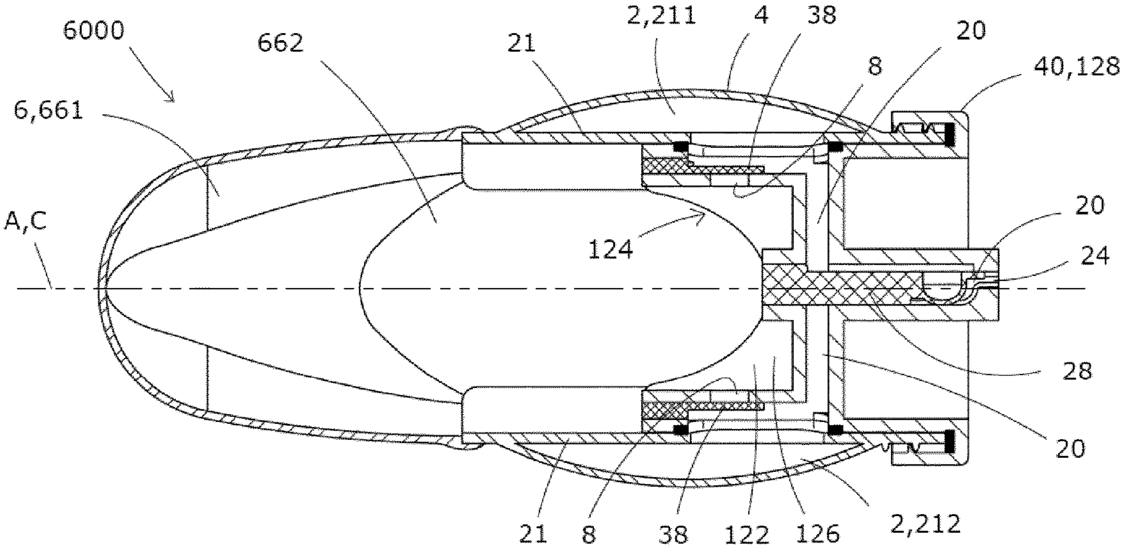

[Fig. 33]
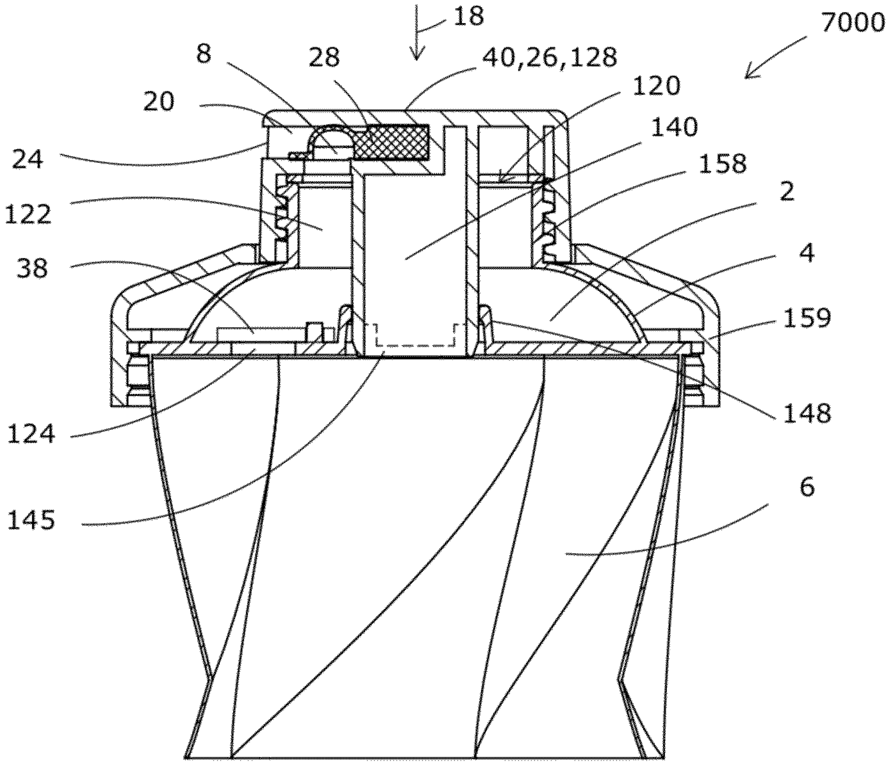
[Fig. 34]
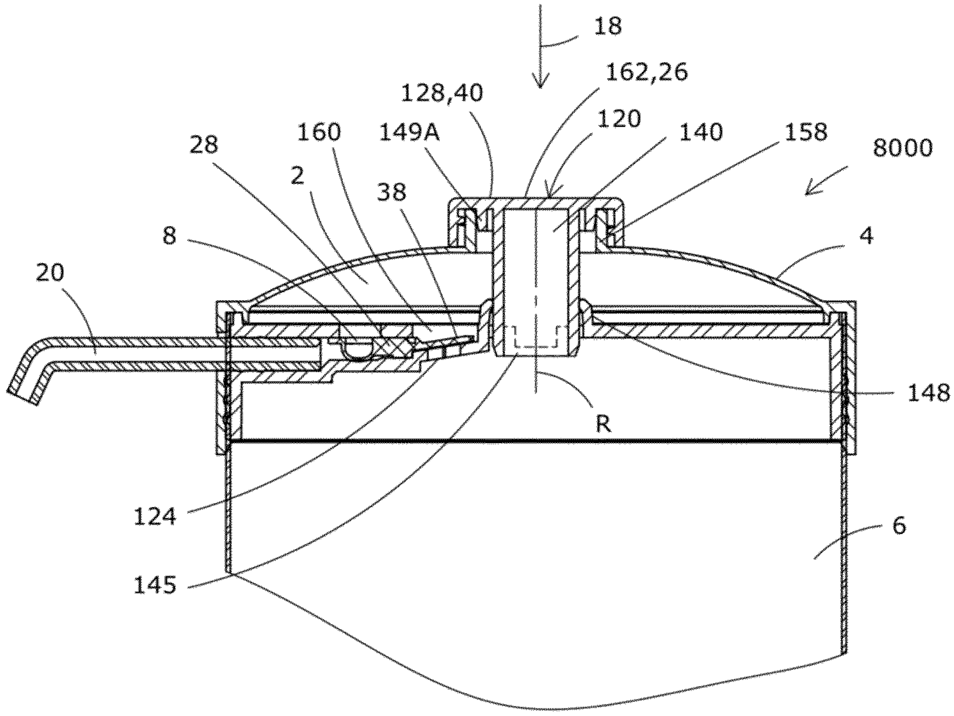

[Fig. 35]
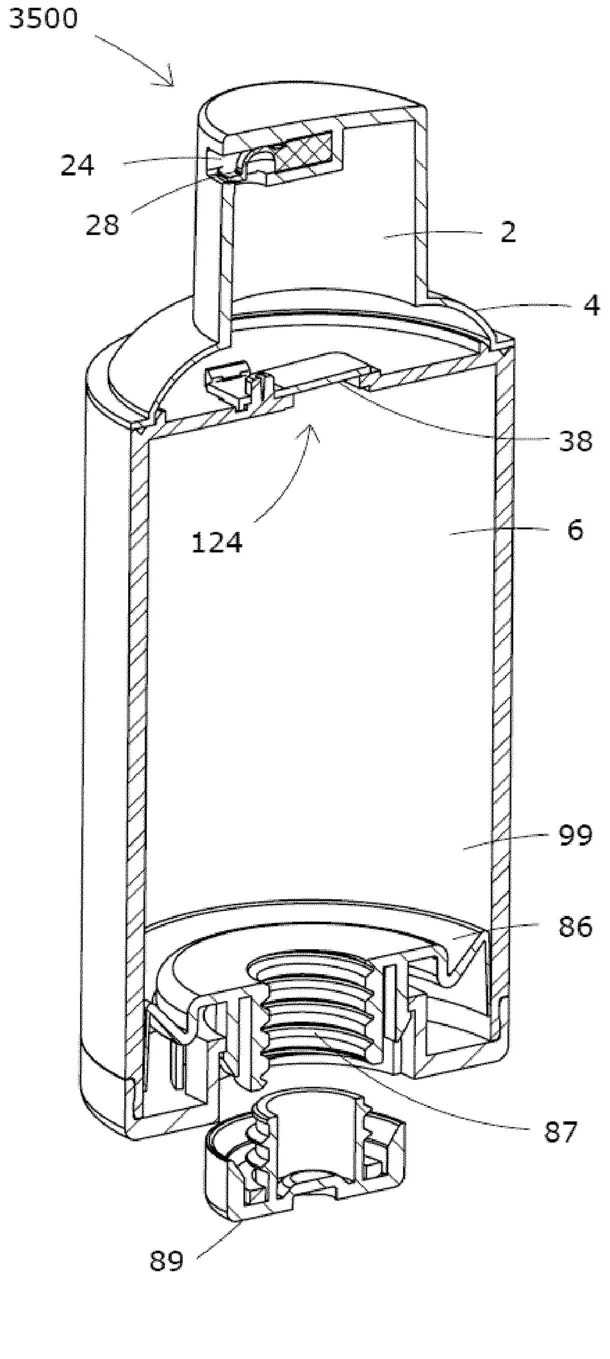

[Fig. 36]
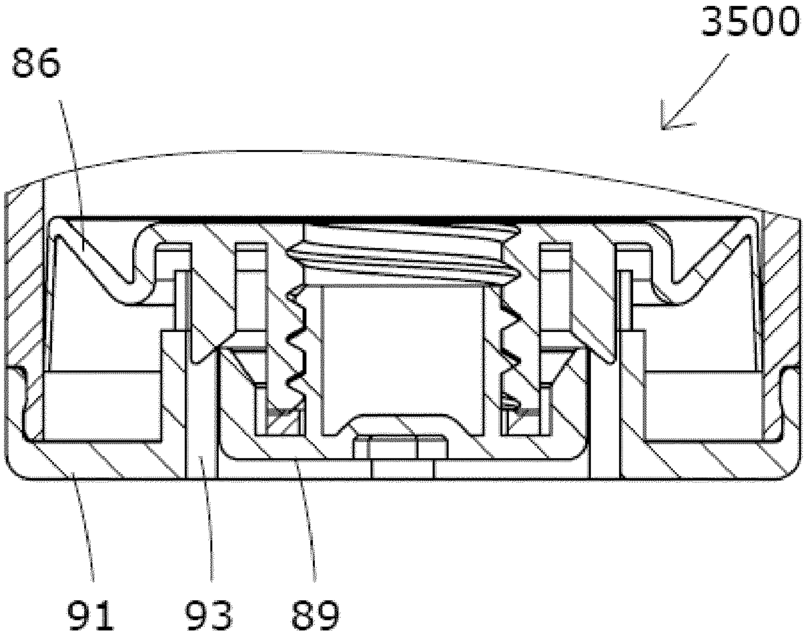
[Fig. 37]
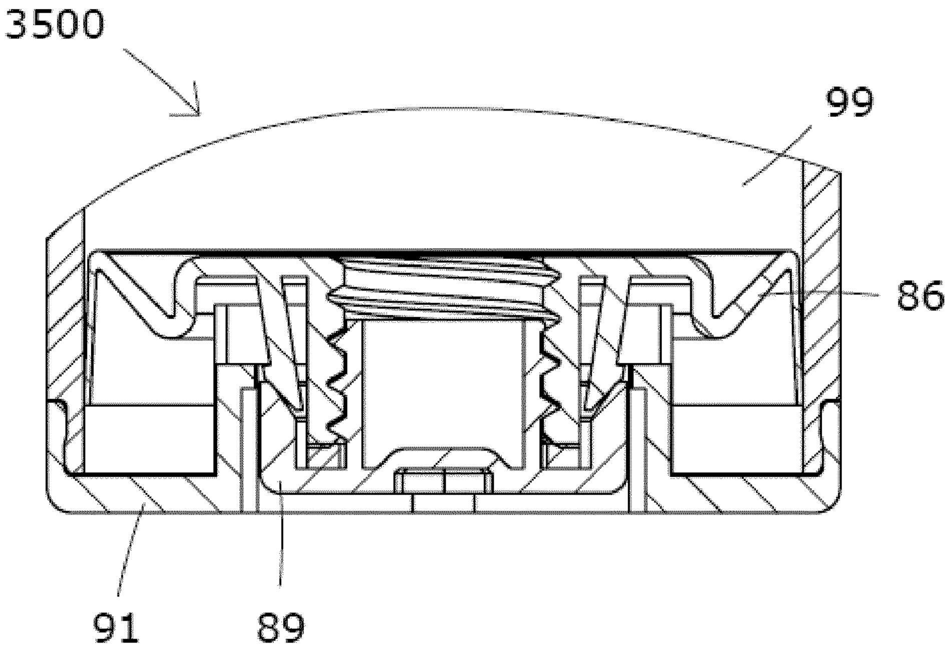

[Fig. 38]
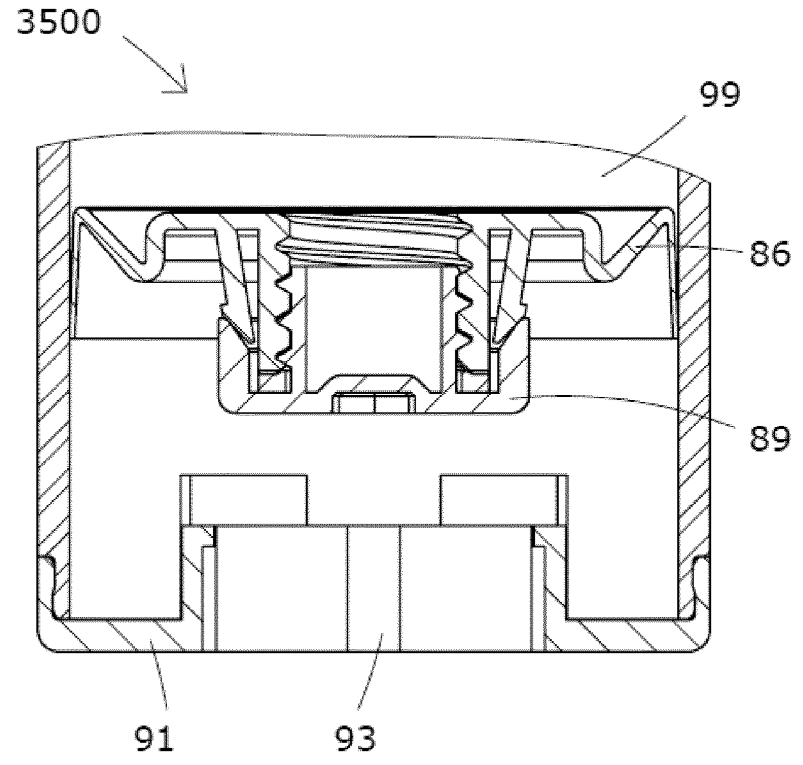
[Fig. 39]
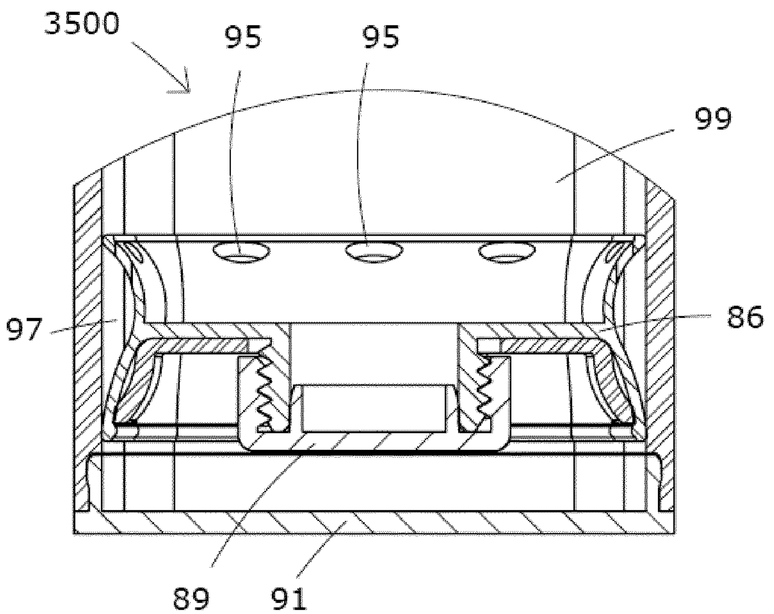

[Fig. 40]
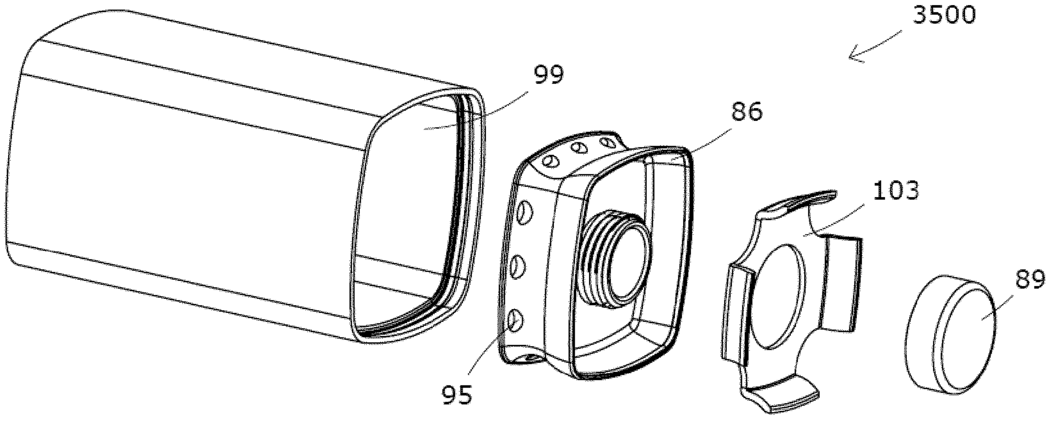
[Fig. 41]
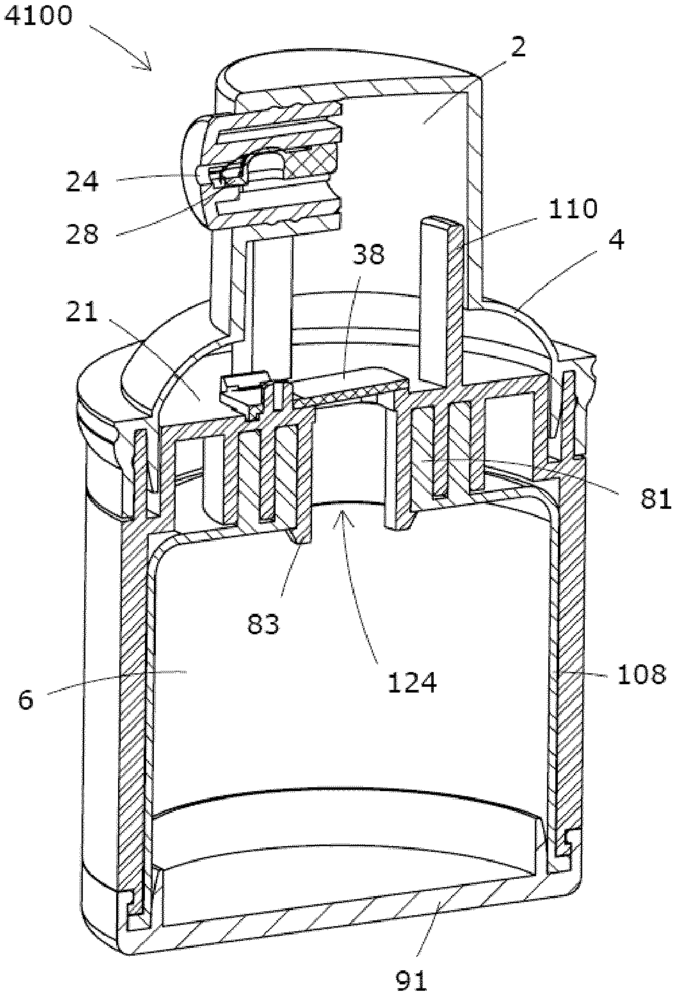

[Fig. 42]
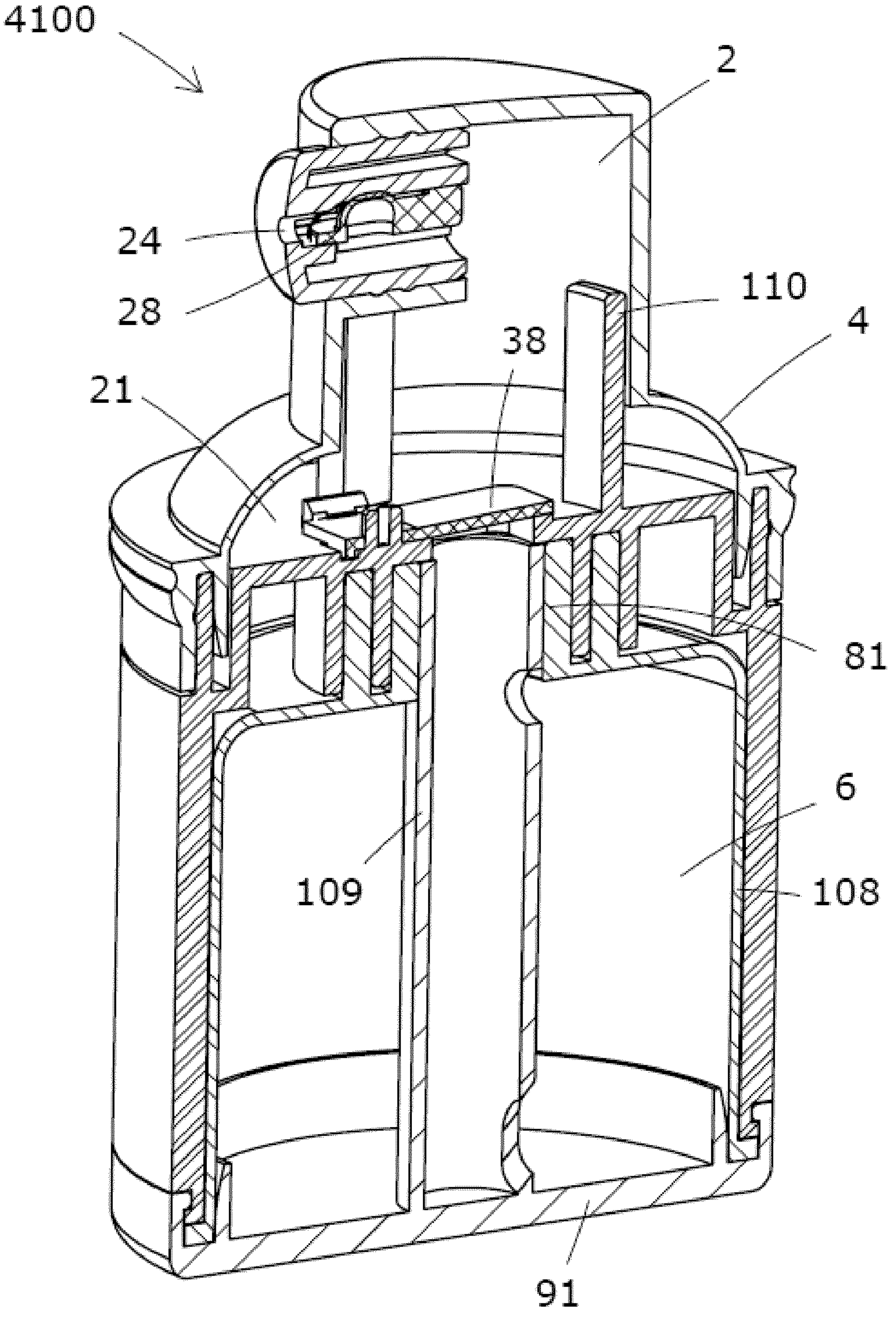

[Fig. 43]
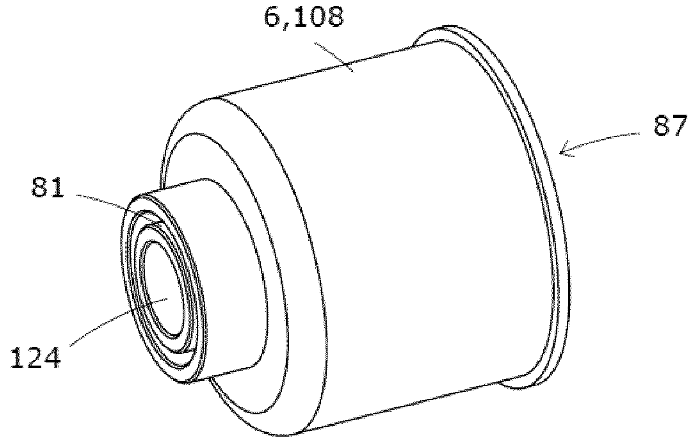
[Fig. 44]
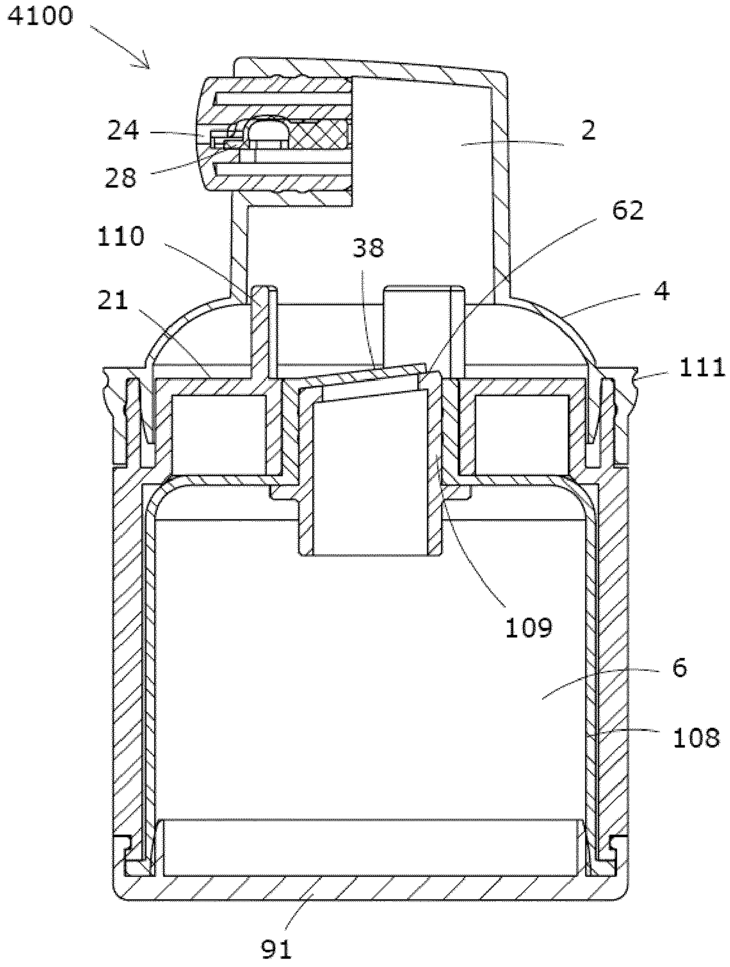

[Fig. 45]
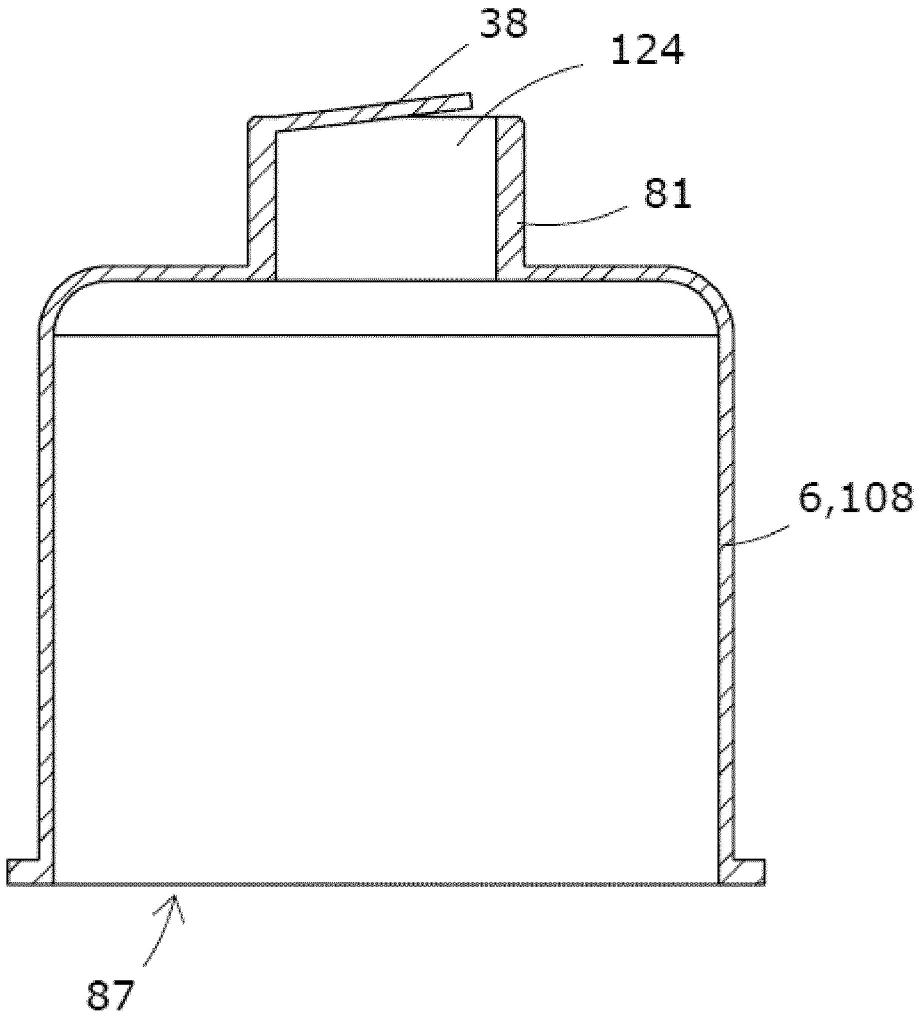

[Fig. 46]
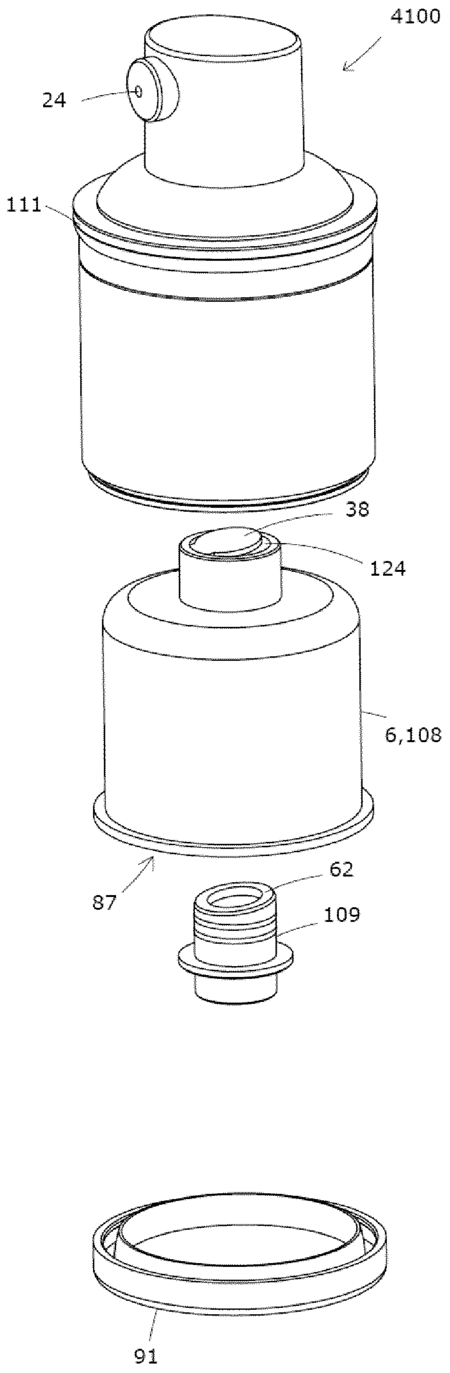

FLUID DISPENSER

TECHNICAL FIELD

The present invention relates to a device for dispensing a fluid.

Such a device allows a user to dispense a fluid. The field of the invention is more particularly that of the dispensing of products such as liquids, gels or creams, for example for the pharmaceutical or cosmetic or agro-food industry.

STATE OF THE ART

Fluid dispensers are known, such as disclosed for example by document WO2015155318.

In this area, manufacturers are making permanent efforts to try to improve and/or simplify the compactness, use, ergonomics, manufacture, reloading, priming, hygiene and/or recycling of such fluid dispensing devices.

The aim of the present invention is to solve at least one of these problems.

DISCLOSURE OF THE INVENTION

According to a first aspect of the invention, the invention makes it possible to achieve at least one of the aforementioned aims by a device for dispensing a fluid comprising:

- a pocket having an interior volume arranged to contain the fluid, the interior volume being delimited at least in part by a deformable wall,
- a reservoir having an inner envelope arranged to contain the fluid,
- a feed orifice connecting the interior volume of the reservoir to the interior volume of the pocket,
- preferably, a dispensing head fixed to the deformable wall of the pocket so that the dispensing head is carried by the deformable wall according to different possible positions with respect to the reservoir, at least of which:
- a stable position in the absence of external force exerted on the head and
- an inclined position at an inclination angle with respect to the stable position when exerting an external force on the head, so as to deform the deformable wall and thus reduce the interior volume of the pocket with respect to the stable position.

The device according to the invention may further comprise,

- a dispensing channel, preferably located in the dispensing head, and arranged to conduct the fluid, in a distribution direction, coming from the interior volume of the pocket and towards an outlet, said outlet being positioned at one end of the dispensing head,
- a dispensing orifice connecting the interior volume of the pocket to the dispensing channel.

The dispensing head preferably extends longitudinally over a length of at least 10 mm in a longitudinal direction connecting the dispensing orifice to one end of the dispensing head and/or a direction connecting the dispensing orifice to the outlet and/or to the surface defined below.

The dispensing head of the device according to the invention may extend longitudinally over a length of at least 20 mm, preferably at least 30 mm, ideally at least 40 mm.

The dispensing head of the device according to the invention may be a straight part extending longitudinally in the longitudinal direction.

The dispensing head may be longer (along the longitudinal direction) than the width thereof (perpendicular to the longitudinal direction).

Preferably, the dispensing head, except for its stable position and according to various possible inclined positions, may be arranged to reach a position of maximum inclination when the inclination angle is inclined by at least 15°, or even 20 degrees (°), preferably at least 30 degrees or even at least 45 degrees, relative to said stable position, said position of maximum inclination may be arranged to reduce the interior volume of the pocket.

Preferably, the dispensing head may comprise a contact surface arranged to, from outside the device, receive an external force preferably orthogonal to the longitudinal direction of the dispensing head positioned in the stable position.

The contact surface of the device according to the invention may be at least 10 $mm^2$, preferably at least 30 $mm^2$, preferably at least 60 $mm^2$, more preferably at least 100 $mm^2$.

The dispensing head may be arranged to incline on the side opposite to the contact surface.

Preferably, in the stable position of the dispensing head, the contact surface forms (preferably over a width of less than 15 mm and over an area of at least 30 $mm^2$, preferably over at least 60 $mm^2$, preferably over at least 100 $mm^2$) an angle between −45° and 45° (preferably between −30° and 30°, more preferably between −20° and 20°) with a direction in which the dispensing channel extends to the outlet from the pocket, i.e. at the junction between the pocket and the dispensing channel.

The dispensing head may be a straight part extending longitudinally in the longitudinal direction.

In this case, the dispensing head and the reservoir may extend longitudinally in the longitudinal direction when the head is in its stable position. In other words, the dispensing head and the reservoir may extend in the same direction of the device according to the invention.

Preferably, the dispensing head may comprise a dispensing valve located in the dispensing channel, and which, in an open state allows passage of fluid from the dispensing channel to the outlet, and, in a closed state, does not allow it. not.

In this case, the device according to the invention (and in particular the dispensing valve) may be arranged to remain in its closed state as long as the inclination angle is less than 5°, preferably 2°, relative to the stable position.

The dispensing head may comprise two separable parts, including:

- an upper part, in which the dispensing valve is located, and,
- a lower part fixed to the pocket and comprising an anti-drip device, the anti-drip device being located at the junction of these two parts and comprising a valve element in the dispensing channel, which:
- is arranged to be open and allow the passage of the fluid to the outlet when these two parts are assembled, and,
- is arranged to be closed when these two parts are separated so as to prevent an escape of fluid from this lower part to the outside of the device.

The dispensing valve may comprise a part arranged to maintain the valve element of the anti-drip device in its open state, that is to say in a position which allows the passage of the fluid towards the outlet, when the two parts of the head are assembled. Said part of the dispensing valve may be one end of the dispensing valve and is preferably of triangular or tapered shape.

Preferably, the deformable wall may comprise an asymmetry around an axis, so that the pocket is arranged to promote an inclination of the dispensing head in a favored direction of inclination and/or so as to reduce the force of distribution in a direction, said favored direction preferably being opposite to the contact surface and/or the outlet.

The device according to the invention may further comprise means for screwing the pocket to the reservoir.

In another embodiment, the pocket and the reservoir of the device according to the invention may be integral with one another so as to form a single piece, said part may be obtained by blowing.

In other embodiments, the pocket may comprises an end piece arranged to fit into the reservoir.

The end of the end piece may form the feed orifice.

The end piece may be pushed into the reservoir so as to secure the pocket to the reservoir.

In this case, the reservoir may comprise a sealing skirt positioned at the level of the feed orifice, said skirt comprising a lid, preferably mono-material, arranged to block the flow of fluid contained in the reservoir towards the pocket as long as the end of the pocket is not pushed into the reservoir, for example as long as the end of the pocket is not fitted and/or screwed into the reservoir.

Preferably, the end piece may be arranged to pierce the lid. It may be at least 8 mm long (preferably in the longitudinal direction).

The device according to the invention may comprise a feed valve positioned at the level of the feed orifice, and which, in an open state, allows the passage of the fluid contained in the reservoir towards the pocket, and which, in a closed state, does not allow it.

In this case, the reservoir may be arranged to reduce its interior volume after each opening of the feed valve.

The reservoir may be equipped with a part comprising:

the feed valve housed at a feed seat, said valve being located at the junction between the interior volume of the pocket and an interior volume of the reservoir, and/or a support and/or cap preferably provided with a lid housed in a dispensing seat, said support and/or cap being located at the junction between the interior volume of the pocket and the dispensing channel, and/or a connecting element connecting the feed valve and the support and/or cap and/or dispensing valve, said connecting element preferably being arranged to deform or break during a deformation of the pocket this aspect of the invention being able to be claimed as such independently of the dispensing head and/or its inclination.

This part allows mounting of the feed valve by passing through the pocket.

The connecting element may be flexible or breakable after mounting the device according to the invention.

The dispensing head may be equipped with a perforator arranged to perforate the lid of the cap housed in the dispensing seat.

In one embodiment, the deformable wall of the pocket of the device according to the invention may comprise a bellows, the device may comprise locking means arranged to limit and/or prevent stretching of one of the sides of the bellows during any inclined position of the dispensing head.

The locking means may be and/or comprise a rigid case.

The dispensing head may be equipped with a pusher arranged to:

press against a holding surface of the pocket, preferably a holding surface of the bellows, and hold said holding surface fixed with respect to the dispensing head.

The holding surface may be flat and/or rigid.

The locking means may press on the pusher, said pusher itself being able to press on the holding surface.

The pusher and the holding surface may be held assembled by clamping the locking means on a case containing the reservoir.

The holding surface may be rigid.

The device according to the invention may comprise means for screwing the pocket to the dispensing head.

The deformable wall of the pocket may comprise areas of weakness and/or joints arranged to allow at least one inclined position (with a preferential angle allowing a dosage, defining a volume of fluid leaving the pocket), and preferably stable, of the dispensing head in the absence of any external force applied to the contact surface.

The reservoir may comprise a deformable envelope delimiting at least in part the interior volume of the reservoir, said deformable envelope possibly comprising radially successive corrugations.

According to a second aspect of the invention, the invention makes it possible to achieve at least one of the aforementioned aims by a device for distributing a fluid, comprising:

a pocket comprising an interior pocket, said interior pocket having an interior volume arranged to contain the fluid, a movable wall being arranged to, under the exertion of a pressing pressure preferably on a pressing surface, to reduce the interior volume of the interior pocket by deforming and/or by moving, an outlet arranged to dispense the fluid, characterized in that the interior volume of the interior pocket is delimited at least in part by:

a piston integral with a junction wall or a bottom wall (21), a housing of the piston arranged to accommodate the piston and guide it during an axial movement of said piston in the housing.

According to the second aspect of the invention:

the piston or the housing may be formed at least in part by at least part of the movable wall, and/or:

the piston or the housing may be in direct contact with a wall forming the pressing surface; or the piston or the housing may be formed at least in part by at least part of the pressing surface.

According to the second aspect of the invention, the invention makes it possible to achieve at least one of the aforementioned aims preferably by the device for dispensing a fluid, comprising:

a pocket comprising an interior pocket and an exterior pocket, said interior pocket being located at least partly in the exterior pocket, said interior and exterior pockets each having an interior volume arranged to contain the fluid, said interior volume of the exterior pocket being delimited at least in part by a movable wall, said movable wall being arranged to, under the exertion of a pressing pressure, reduce the interior volume of the interior pocket and the interior volume of the exterior pocket by deforming and/or by moving, an outlet arranged to dispense the fluid.

The interior volume of the interior pocket is preferably delimited at least in part by:

a piston integral with a junction wall delimiting at least in part the interior volume of the exterior pocket,

- a housing of the piston arranged to accommodate the piston and guide it during an axial movement of said piston in the housing.

The device according to the invention is arranged to guide the fluid according to a circuit comprising:

- a first route, passing:
- from the inside of the exterior pocket to the inside of the interior pocket (preferably of the piston) via at least one connecting orifice connecting the interior volume of the exterior pocket to the inside of the interior pocket (preferably of the piston), and
- a second route, passing from the inside of the interior pocket (preferably of the piston) to the outlet.

The device according to the invention may comprise braking means arranged to block an axial movement of the piston in the housing reducing the interior volume of the interior pocket and of the exterior pocket when the movable wall is subjected to a pressing pressure, less than a threshold force.

In this case:

- the braking means may be integral with the piston and may preferably comprise at least one tab inclined towards the outside of the piston, and/or
- the braking means may be integral with the housing of the piston and may preferably comprise at least one tab inclined towards the inside of the housing.

The device according to the invention may be arranged to guide the fluid along the second route, at each pressing pressure on the movable wall greater than the threshold force and/or at each decrease of the interior volume of the interior pocket and of the exterior pocket for which the connecting orifice is closed.

The device according to the invention may be arranged to guide the fluid along the first route, after the end of each pressing pressure greater than the threshold force, and/or at each increase of the interior volume of the interior pocket and the exterior pocket for which the connecting orifice is opened.

The connecting orifice:

- may be formed at a junction between one end of the piston and one end of the housing of the piston, and/or
- may comprise a hole located in the housing of the piston.

The connecting orifice may preferably be arranged to:

- close during a movement of the piston reducing the interior volume of the pocket,
- open during a movement of the piston increasing the interior volume of the pocket.

The device according to the invention may comprise a dispensing channel arranged to conduct the fluid coming from the interior pocket towards the outlet.

In this case, the device according to the invention may comprise a dispensing valve located in the dispensing channel and arranged to conduct the fluid from the interior pocket to the outlet.

The device according to the invention may also comprise:

- the dispensing valve,
- a mixer arranged to receive different separate streams of fluid and mix them in the form of a spray at the outlet.

One end of the dispensing valve may be integral with a rod arranged to be inserted into the mixer so as to form different channels arranged to conduct the different separate flows of fluid to the mixer.

The movable wall may be a deformable wall.

The movable wall may comprise the junction wall.

The movable wall may be separated from the junction wall.

The movable wall may be rigid.

The device according to the invention may comprise a reservoir communicating with the outer pocket through a feed orifice, said reservoir comprising an interior volume arranged to contain the fluid, said interior volume being delimited at least in part by a deformable envelope.

The deformable envelope of the reservoir may comprise successive radial corrugations around an axis.

The device according to the invention may further comprise an exterior pocket, said interior pocket being located at least in part in the exterior pocket, the interior pocket having an interior volume arranged to contain the fluid, the exterior pocket having an interior volume which is not arranged to contain the fluid, said interior volume of the exterior pocket being delimited at least in part by the movable wall, said movable wall being arranged to, under the exertion of the pressing pressure, reduce the interior volume of the exterior pocket by deforming and/or by moving, the device being arranged to guide the fluid according to a circuit comprising a route passing directly from a reservoir and/or from the inside of the piston up to the inside of the interior pocket, without going through the inside of the exterior pocket.

The device according to the invention may further comprise braking means arranged to block an axial movement, of the piston in the housing, reducing the interior volume of the interior pocket when the movable wall is subjected to a pressing pressure, less than a threshold force, the braking means preferably comprising:

- a lug or tab located on the exterior of the piston and/or the interior of the housing, this lug or tab being arranged to rub or be blocked by a surface respectively of the interior of the housing and/or of the exterior of the piston, and/or
- a lug or tab located on the exterior of the housing and/or the interior of a wall disposed around the housing, this lug or tab being arranged to rub or be blocked by a surface respectively of the interior of the wall disposed around the housing and/or of the exterior of the housing.

The interior pocket is preferably located under an exterior surface of the device within 10 mm of this exterior surface.

The exercise of a pressing pressure preferably allows a lateral exit of the product through the outlet and a displacement of the movable wall towards the reservoir or next to the reservoir.

In planes perpendicular to the direction of axial movement of the piston relative to the housing, the interior pocket preferably has a section smaller than the section of the exterior pocket and/or than the area of the pressing surface arranged to receive the pressing pressure from outside the device and/or than a section of the reservoir.

The pocket may be located:

- directly under a pressing surface arranged to receive the pressing pressure from outside the device, or
- directly under an assembly consisting of a pressing surface arranged to receive the pressing pressure from outside the device and a channel comprising a valve.

The device according to the invention may comprise return means, preferably non-metallic, arranged to bring the piston out of its housing.

The area of an internal section of the housing may be at least halved with respect to the area of a pressing surface arranged to receive the pressing pressure from outside the device.

According to a third aspect of the invention, the invention makes it possible to achieve at least one of the aforementioned aims by a device for dispensing a fluid comprising:

an outlet, a pocket having an interior volume for containing a fluid, the interior volume being delimited at least in part by a movable wall, a reservoir arranged to contain the fluid, a pocket cap, a cavity, a reservoir orifice forming a junction between the reservoir and the cavity.

The pocket cap is preferably arranged to be mounted by insertion into the cavity of the device so as to be mounted by extending:

preferably from the reservoir to the outlet, passing through the pocket at least partially while passing through the movable wall or going along the pocket at least partially.

The device preferably comprises an inlet orifice arranged to insert the pocket cap into the device from outside the device and opening into the cavity.

The pocket cap may comprise an interior volume into which is inserted a dispensing valve which in an open state allows a passage of fluid from the interior volume of the pocket to the outlet and in a closed state does not allow.

The interior volume of the pocket cap preferably connects the reservoir to the outlet.

The interior volume of the pocket cap preferably has a volume of at least 1 $cm^3$, or 3 $cm^3$ or even 5 $cm^3$.

The pocket cap may preferably comprises a feed valve which in an open state allows passage of fluid from the reservoir to the interior volume of the pocket and in a closed state does not allow, and/or a dispensing valve which in an open state allows passage of fluid from the interior volume of the pocket to the outlet and in a closed state does not allow.

Preferably, the distribution and feed valves may be integral and in one piece.

Preferably, the pocket cap may comprise a housing arranged to accommodate the feed valve and the dispensing valve.

The pocket cap may comprise an interior volume, called the head reservoir, arranged to open on one side to the reservoir orifice and on the other hand to a feed orifice connecting the head reservoir to the interior volume of the pocket.

The interior volume of the head reservoir may be at least 1 $cm^3$, or even at least 3 $cm^3$ or even at least 5 $cm^3$ and/or may comprise air or fluid to be dispensed.

The device may comprise a feed valve which in an open state allows a passage of fluid from the reservoir to the interior volume of the pocket and in a closed state does not allow, the feed valve may be located in the pocket cap so as, in its open state, to open the feed orifice and, in its closed state, to close the feed orifice.

The pocket cap may be mounted in the cavity so that a wall of the pocket cap, inserted into the reservoir orifice and delimiting at least in part the head reservoir, forms, preferably at the end of screwing, a sealed junction between the interior volume of the pocket and the reservoir and/or between the interior volume of the pocket and the head reservoir.

The head cap may further comprise a second part, preferably in which is positioned a dispensing channel, separate from the head reservoir and arranged to conduct the fluid from the interior volume of the pocket towards the outlet.

The second part may comprise a dispensing valve which in an open state allows passage of fluid from the interior volume of the pocket to the outlet and in a closed state does not allow.

The device may be arranged to guide the fluid along a circuit comprising:

a first route, passing from the reservoir to the head reservoir through the reservoir orifice, then a second route passing from the head reservoir to the interior volume of the pocket via the feed orifice, then a third route connecting the interior volume of the pocket to the outlet via the second part of the pocket cap.

The device may be arranged to guide the fluid along the first and second route, after each end of pressing pressure on the movable wall of the pocket and/or on each increase in the interior volume of the pocket.

The device may be arranged to guide the fluid along the third route, at each pressing pressure on the movable wall of the pocket and/or on each decrease in the interior volume of the pocket, said feed orifice may be closed by the valve.

The reservoir may comprise at least one flexible wall arranged to be inserted into the head reservoir as the reservoir is emptied of its fluid.

The pocket cap may comprise fixing means arranged to fix the pocket cap to walls delimiting the cavity by screwing.

The fixing means may comprise an anti-unlocking system of the pocket cap to the cavity arranged to prevent loosening of the pocket cap.

The reservoir, the cavity and the pocket may be integral so as to form a single piece.

The reservoir, the cavity and the pocket, with the exception of the movable wall of the pocket, may be integral so as to form a single piece.

The movable wall of the pocket may be assembled by welding to the single piece formed by the cavity and the reservoir.

The reservoir and the cavity may be produced by polymer injection or by 3D printing.

The reservoir may extend in a longitudinal direction centered on a first axis of elongation, the pocket may extend in a longitudinal direction centered on a second axis of elongation and/or the pocket cap may extend in a longitudinal direction centered on a third axis of elongation the first axis may be offset with respect to the second axis and/or to the third axis.

The first axis of elongation and/or the second axis of elongation and/or the third axis of elongation may preferably be parallel.

The pocket cap may extend in a direction of elongation, and may be arranged to be mounted by insertion into the cavity in an insertion direction parallel to its elongation direction, the inlet orifice and the reservoir orifice being aligned in the direction of elongation.

The cavity may comprise deformable walls arranged to laterally increase the capacity of the reservoir.

The cap may comprise a vent.

The cap may be arranged to slide in the bottom wall and/or may comprise a flexible or breakable part.

According to a fourth aspect of the invention, the invention makes it possible to achieve at least one of the aforementioned aims by a device for dispensing a fluid comprising:

an outlet, a pocket having an interior volume to contain a fluid, the interior volume of the pocket being delimited at least in part by a movable wall, a reservoir arranged to contain the fluid and comprising two openings including an upper opening oriented towards the pocket and a lower opening, said reservoir preferably being arranged to reduce its interior volume when the fluid exits from the reservoir, a dispensing valve which, in an open state allows passage of the fluid from the pocket to the outlet, and, in a closed state, does not allow it, a feed valve which, in an open state, allows the passage of the fluid contained in the reservoir to the pocket, and which, in a closed state, does not allow it, said lower opening being arranged to allow a passage of the fluid, preferably a passage of a cannula (or filling rod) transporting the fluid, so as to fill the reservoir at least in part with fluid at least up to the feed valve and preferably so as to fill with fluid also at least in part the interior volume of the pocket.

The reservoir may be delimited at least in part by a movable piston arranged to move so as to reduce the interior volume of the reservoir when the fluid exits from the reservoir, this piston being provided with the lower opening, the lower opening being closed by a removable cap.

The removable cap is preferably screwed onto the piston.

The piston may be provided with at least one hole arranged to allow passage of the fluid between the reservoir and a sealing zone comprised between the piston and a wall along which the piston is arranged to move.

The piston may be comprised between the reservoir and a bottom wall, said bottom wall being provided with means (for example typically comprising a slot into which a part of the piston is inserted and/or means for clipping the piston) for block the piston in rotation when screwing the cap onto the piston when the piston is in contact with the bottom wall.

The piston may have, in a sectional view perpendicular to a direction of movement of the piston along a wall, a polygon shape comprising several sides connected by angles, the device further comprising a force distribution part arranged to press the piston against the wall at several (preferably all) sides of the polygon but except for the angles of the polygon.

The reservoir arranged to contain the fluid may be delimited by:

a flexible wall comprising the two openings, the upper opening facing towards the pocket and the lower opening, and a rigid wall, preferably removable, arranged to block the lower opening.

The flexible wall may be fixed to the pocket according to a sealed junction:

by welding, and/or by clipping, and/or by interlocking, and/or by compressing the flexible wall around its upper opening between on the one hand a part forming or integral with the pocket and located outside the reservoir and on the other hand a ring (and whose upper edge may form the feed seat) inserted inside the reservoir.

The ring may be integral with the rigid wall.

The area of a section of the upper opening (this section being chosen to minimize the area of the upper opening) is preferably at least twice (preferably at least four times) smaller than the area of a section of the lower opening (this section being chosen to minimize the area of the lower opening).

The flexible wall and the feed valve may be formed in the same part with continuity of material.

The flexible wall may be arranged to deform so as to reduce the interior volume of the reservoir when fluid exits from the reservoir.

The device, preferably the rigid wall, may be arranged to keep the position of the lower opening in the device fixed with respect to the position of the upper opening in the device.

The first aspect and/or the second aspect and/or the third aspect and/or the fourth aspect of the invention may be combined with one another.

DETAILED DESCRIPTION OF FIGURES

Other advantages and characteristics will become apparent on examination of the detailed description of non-limiting examples, and of the appended drawings in which:

FIG. 1 is a side sectional view of a first embodiment of a device according to the invention, a dispensing head of which is in a stable position, FIG. 2 is a side sectional view of the first embodiment of the device according to the invention, the dispensing head of which is in an inclined position, FIG. 3 is a perspective view of the first embodiment of the device according to the invention, the dispensing head of which is removed, FIG. 4 is a zoom of a side view of the first embodiment of the device according to the invention, FIG. 5 is a schematic representation of a non-limiting exemplary embodiment of a cap provided with a lid according to the invention, FIG. 6 is a schematic representation of a non-limiting exemplary embodiment of a feed valve according to the invention, FIG. 7 is a side sectional view of a second embodiment of a device according to the invention, the dispensing head of which is in the stable position, FIG. 8 is a side sectional view of the second embodiment of the device according to the invention, the dispensing head of which is in the inclined position, FIG. 9 is an exploded perspective view of the second embodiment of the device according to the invention, the dispensing head of which is in the stable position FIG. 10 is a side sectional view of a reservoir and a pocket of the second embodiment of the device according to the invention after a partial emptying of the reservoir FIG. 11 is a side sectional view of the pocket and the reservoir of the second embodiment of the device according to the invention after a complete emptying of the reservoir FIG. 12 is a cross section of the lower part of the reservoir of FIG. 10

FIG. 13 is an exploded perspective view of a third embodiment of the device according to the invention, the dispensing head of which is in the stable position, FIG. 14 is a side sectional view of the third embodiment of a device according to the invention, the dispensing head of which is in the stable position, FIG. 15 is a side sectional view of the third embodiment of a device according to the invention, the dispensing head of which is in the inclined position, FIG. 16 is a zoom of profile sectional view of the third embodiment of the device according to the invention during stretching of the reservoir 6 for its filling, FIG. 17 is a side sectional view of part of a fourth embodiment of a device according to the invention, FIG. 18 is a perspective view of part of the fourth embodiment of the device according to the invention, FIG. 19 is a side sectional view of a fifth embodiment of a device according to the invention, FIG. 20 is an exploded perspective view of the fifth embodiment of the device according to the invention without its reservoir FIG. 21 is a side sectional view of a dispensing channel of the fifth embodiment of the device according to the invention FIG. 22 is a cross section of the dispensing channel of the fifth embodiment of the device according to the invention FIG. 23 is an exploded perspective view of a sixth embodiment of a device according to the invention, FIG. 24 is a side sectional view of the sixth embodiment of the device according to the invention, FIG. 25 is a side sectional view illustrating a step of a manufacturing process of the sixth embodiment of the device according to the invention, FIG. 26 is a side sectional view of a seventh embodiment of a device according to the invention, FIG. 27 is an exploded perspective view of the seventh embodiment of the device according to the invention, FIG. 28 is an exploded perspective view of an eighth embodiment of a device according to the invention.

FIG. 29 is a side sectional view of the eighth embodiment of the device according to the invention.

FIG. 30 is a side sectional view of a ninth embodiment of a device according to the invention.

FIG. 31 is an exploded perspective view of a tenth embodiment of a device according to the invention.

FIG. 32 is a side sectional view of the tenth embodiment of the device according to the invention.

FIG. 33 is a side sectional view of an eleventh embodiment of a device according to the invention.

FIG. 34 is a side sectional view of a twelfth embodiment of a device according to the invention.

FIG. 35 is a side sectional view of a thirteenth embodiment of a device according to the invention.

FIG. 36 is a side sectional view of part of the thirteenth embodiment of a device according to the invention.

FIG. 37 is a side sectional view of part of the thirteenth embodiment of a device according to the invention.

FIG. 38 is a side sectional view of part of the thirteenth embodiment of a device according to the invention.

FIG. 39 is a side sectional view of part of the thirteenth embodiment of a device according to the invention.

FIG. 40 is an exploded perspective view of the thirteenth embodiment of a device according to the invention.

FIG. 41 is a side sectional view of a fourteenth embodiment of a device according to the invention.

FIG. 42 is a side sectional view of the fourteenth embodiment of a device according to the invention.

FIG. 43 is a perspective view of the flexible wall 108 of the fourteenth embodiment of a device according to the invention.

FIG. 44 is a side sectional view of the fourteenth embodiment of a device according to the invention.

FIG. 45 is a side sectional view of the flexible wall 108 of the fourteenth embodiment of a device according to the invention.

FIG. 46 is an exploded perspective view of the fourteenth embodiment of a device according to the invention.

It is understood that the embodiments which will be described below are in no way limitative. It is possible in particular to imagine variants of the invention comprising only a selection of characteristics described below, in isolation from the other characteristics described, if this selection of characteristics is sufficient to confer a technical advantage or to differentiate the invention with respect to the prior art. This selection comprises at least one, preferably functional, characteristic without structural details, or with only a part of the structural details if this part alone is sufficient to provide a technical advantage or to distinguish the invention from the prior art.

In particular, all the variants and all the embodiments described may be combined with one another if there is nothing to prevent this combination from a technical point of view.

In the figures, the elements common to several figures retain the same reference.

We will first of all describe, with reference to FIGS. 1 to 6, a first embodiment of a device according to the invention for dispensing a fluid.

In FIGS. 1 to 3, the device 100 for dispensing the fluid comprises:

- a pocket 2 having an interior volume arranged to contain the fluid, the interior volume being delimited at least in part by a deformable wall 4,
- a reservoir 6 having an inner envelope arranged to contain the fluid,
- a feed orifice 8 connecting the interior volume of the reservoir 6 to the interior volume of the pocket 2,
- a dispensing head 10 fixed to the deformable wall 4 of the pocket 2 so that the dispensing head 10 is carried by the deformable wall 4 in different possible positions with respect to the reservoir 6, at least of which:
- a stable position 12 in the absence of external force 18 exerted on the head 10 and
- an inclined position 14 at an inclination angle 16 relative to the stable position 12, during the exercise of an external force 18 on the head 10, so as to deform the deformable wall 4 and thus reduce the interior volume of the pocket 2 relative to the stable position 12,
- a dispensing channel 20 located in the dispensing head 10 and arranged to conduct the fluid coming from the interior volume of the pocket 2 and towards an outlet 24, said outlet 24 being positioned at one end of the dispensing head 10,
- a dispensing orifice 22 connecting the interior volume of the pocket 2 to the dispensing channel 20.

In the present description, all the positions of the head are defined in a reference for which the feed orifice and/or the reservoir is fixed.

In the present description, the term "flexible" will be understood to mean any part which may be deformed under the effect of at least 1 kg, having for example a flexural modulus of less than 600 MPa and/or having a sufficiently reduced thickness.

In the present description, the term "rigid" will be understood to mean any part which may not be deformed under the effect of at most 1 kg, having for example a flexural modulus greater than 600 MPa and/or having a sufficiently large thickness.

The dispensing head 10 comprises a contact surface 26, arranged to, from outside the device, receive an external force 18 orthogonal to the longitudinal direction of the dispensing head 10 positioned in the stable position 12.

The dispensing head 10 of the device 100 extends longitudinally over a length of at least 10 mm (preferably at least 20 mm and even at least 30 mm or even at least 40 mm) according to:

- a longitudinal direction (carried by the axis A in FIG. 1) connecting the dispensing orifice 22 to one end of the head 10 (preferably carrying the surface 26 and/or the outlet 24), and/or a direction (carried by the Z axis in FIG. 1) connecting the dispensing orifice 22 to the outlet 24 and/or to the surface 26 (preferably carrying the outlet 24).

In particular, a long lever arm makes it possible to reduce the forces allowing the dispensing, for example less than 1 kg and even less than 0.5 kg if the device is an applicator for facial care (by comparison a common pump requires a pressing force of the order of 2 kg). The dispensing head 10 and the reservoir 6 extend longitudinally in the longitudinal direction when the head is in its stable position.

The distributor head is longer (along the longitudinal direction) than it is wide (perpendicular to the longitudinal direction).

The contact surface 26, accessible from the outside of the device 100 by a hand or even a fingernail of a user, or a face of a user, has a minimum surface area of 10 $mm^2$, and preferably at least 20 $mm^2$ (preferably at least 30 $mm^2$, preferably at least 60 $mm^2$, more preferably at least 100 $mm^2$) in the case where the contact surface 26 is arranged to be in contact with the face.

The axis A extends in an direction X.

In the stable position of the device according to the invention, the contact surface 26 forms (over a width of less than 15 mm defined in a plane perpendicular to the direction X and over an area of at least 30 $mm^2$, preferably over at least 60 $mm^2$, preferably over at least 100 $mm^2$) an angle between −45° and 45° (more precisely between −30° and 30°, more precisely between −20° and 20°) with the direction X in which the dispensing channel 20 extends to the outlet from the pocket 2.

The outlet 24 is located at a distance from the axis A of less than 10 mm.

The surface 26 is located at a distance from the axis A of less than 10 mm.

The outlet 24 is located on the surface 26.

The dispensing head 10 is arranged to incline on the side opposite to the contact surface 26. The dispensing head may have at its end an application and/or massage element on the face opposite to the surface 26 which may be made of metal. The device is arranged so that a force on this surface does not incline or only slightly inclines the head so as to limit or prohibit the exit of product.

The pocket 2 is formed mainly in three parts. A first part, comprising the deformable wall 4, a second part comprising a rigid wall 54 and a third part 84 (of the pocket 2) arranged to be fixed to the reservoir 6.

The rigid wall 54 of the pocket 2 is located below the deformable wall 4. The deformable wall 4, more exactly its lower part, is fixed or integral with the rigid wall 54 of the pocket 2 at the level of the connection point 58.

The deformable wall 4 of the pocket 2 is formed by a part $4_1$ and a part $4_2$.

The parts $4_1$ and $4_2$ face each other. The part $4_1$ of the deformable wall 4 is arranged to bend under the effect of the compression by the force 18, the part $4_2$ of the deformable wall 4 elongates very slightly under the effect of the traction but moves less than the part $4_1$ so as to promote the inclination of the head 10 of the device 100 on the side of the part $4_1$ when the external force 18 is exerted at the level of the contact surface 26 of the dispensing head 10. So as to promote the inclination of part $4_1$, the curvilinear length in a section plane of part $4_1$ of dispensing head 10 in the stable position 12, is higher (i.e. longer) than that of part $4_2$ (which forms a hinge).

Thus, the deformable wall 4 comprises an asymmetry around an axis A, so that the pocket 2 is arranged to promote an inclination of the dispensing head 10 in a favored direction of inclination, that is to say opposite to the contact surface 26 and/or the surface of the outlet 24. Thus, the parts $4_1$ and $4_2$ are asymmetrical so as to promote the inclination of the dispensing head 10 on the side of the part $4_1$.

Thus the deformable wall 4 of the pocket 2 comprises:

- a certain flexibility to allow the inclination of the dispensing head 10, that is to say the passage from its stable position 12 to a inclined position 14, and
- an elastic return force arranged to reposition the dispensing head 10, inclined according to its inclined position 14, in its stable position 12.

The deformable wall 4 is for example a thin wall and the rigid wall 54 is for example a wall thicker than the wall 4.

Preferably, the deformable wall 4 may be associated with the wall 54 by a "co-molding", that is to say either by overmolding or bi-injection of materials having different flexibility, preferably with PP for the rigid wall 54 of pocket 2 and with TPO for the deformable wall 4 of pocket 2.

The parts $4_1$ and $4_2$ of the deformable wall 4 and the rigid wall 54 may also be injected all at once when the rigid wall 54 and the deformable wall 4 of the pocket are for example made of polypropylene.

The deformable wall 4 is preferably made of PP with a polymer or plastomer additive (such as, for example, Vistamaxx™ 6202), in order to reduce its hardness so that the hardness of the wall 4 is less than 80 Shore D. Therefore, too great a fineness and weaknesses of the wall 4 are avoided.

The rigid wall 54 is arranged to fit on the third part 84 of the pocket 2.

At the level of the weld or connection point 58, a stop 66 materializes the junction between the third part 84 of the pocket 2 and the rigid wall 54 of the pocket 2. This stop 66 is orthogonal to the axis A when the device 100 is in a stable position 12.

The deformable wall 4 of the pocket 2 holds the dispensing head 10.

The pocket 2 is fixed to the dispensing head 10. The pocket 2 is in particular embedded in the dispensing channel 20 of the dispensing head 10 via a ring 88.

The dispensing head 10 comprises the ring 88, located at the junction between the interior volume of the pocket 2 and the dispensing channel 20, in which the dispensing orifice 22 is housed. Specifically, at the level of said junction between the interior volume of the pocket 2 and the dispensing channel 20, the deformable wall 4 of the pocket 2 is compressed against the dispensing channel 20 by the ring 88. The ring 88 is clamped, fitted into the dispensing head 10. The ring 88 is arranged to be fitted by force into the dispensing channel 20.

The dispensing head 10, over its entire length, is traversed by the dispensing channel 20.

The dispensing channel 20 begins at the level of the dispensing orifice 22 and extends to the outlet 24 housed in the dispensing head 10.

Further, the dispensing head 10 comprises a dispensing valve 28 located in the dispensing channel 20, and which, in an open state allows passage of fluid from the dispensing channel 20 to the outlet 24, and, in a closed state, does not allow it.

The dispensing valve 28 is typically made of thermoplastic polyolefin or TPO (polyolefin compositions: polyethylene and polypropylene) (flexible, recyclable), Polypropylene (PP) or modified polyethylene (PE). TPO has the advantage of being flexible, more easily recyclable if we take the same sub-family (for example PP with TPO base PP).

The dispensing valve 28 is arranged to remain in its closed state as long as the inclination angle 16 is less than 2° or 5° with respect to the stable position 12. The device 100 is arranged so as not to incline more than 2 degrees as long as a threshold force is not reached, said threshold force corresponding, for example, to an external force (perpendicular to the surface 26) of 0.5 kilogram (kg).

For the device 100, if the external force 18 is greater than or equal to the threshold force of 0.5 kg, then an overpressure in the pocket 2 and in the dispensing channel 20 makes it possible to open the dispensing valve 28, thus causing the dispensing of fluid at the outlet 24.

If the external force 18 is less than the threshold force when the dispensing head 10 is in its stable position 12, then the dispensing head 10 does not incline more than 2 degrees from its stable position 12. In the case where the dispensing head 10 is in the inclined position 14, if the external force 18 is less than the threshold force but present to hold down the elastic return force of the pocket 2 (precisely of the deformable wall 4), then the dispensing head 10 remains inclined in its inclined position 14.

In the case of FIGS. 1 to 3, the dispensing head 10 comprises two separable parts $\mathbf{10}_1$, $\mathbf{10}_2$, including:

- an upper part $\mathbf{10}_1$, in which the dispensing valve 28 is located, and,
- a lower part $\mathbf{10}_2$ fixed to the pocket 2 and comprising an anti-drip device 30.

The anti-drip device 30 is located at the junction of these two parts $\mathbf{10}_1$, $\mathbf{10}_2$ and comprises a valve element $\mathbf{30}_1$ in the dispensing channel 20, which:

- is arranged to be open and allow the passage of the fluid to the outlet 24 when these two parts $\mathbf{10}_1$, $\mathbf{10}_2$ are assembled, and,
- is arranged to be closed when these two parts $\mathbf{10}_1$, $\mathbf{10}_2$ are separated so as to prevent an exit of fluid from this lower part $\mathbf{10}_2$ to the outside of the device.

The upper and lower parts $\mathbf{10}_1$, $\mathbf{10}_2$ are nested one inside the other.

The dispensing valve 28 comprises a part $\mathbf{28}_1$, in particular one of its ends $\mathbf{28}_1$, arranged to maintain the valve element $\mathbf{30}_1$ of the anti-drip device 30 in its open state, that is to say in a position which allows the passage of the fluid towards the outlet 24, when the two parts $\mathbf{10}_1$, $\mathbf{10}_2$ of the head 10 are assembled. The end $\mathbf{28}_1$ is of tapered shape so that it may open the valve $\mathbf{30}_1$ of the anti-drip device 30 towards an internal wall of the dispensing channel 20. In this configuration, the anti-drip device 30 allows the fluid contained in the pocket 2 to be directed and conveyed to the outlet 24.

The dispensing valve 28 comprises a part $\mathbf{28}_2$ held by clamping between internal walls of the dispensing channel 20.

The dispensing valve 28 is housed in a dispensing housing 80. The housing 80 is part of the channel 20.

The part $\mathbf{28}_2$ is stationary between the open and closed states of the dispensing valve 28.

A conduit $\mathbf{28}_3$ allows the passage of fluid between the part $\mathbf{28}_2$ and the internal walls of the housing 80 in the direction of the outlet 24 when the valve 28 (and more precisely its movable part $\mathbf{28}_4$) is open.

The dispensing valve 28 comprises a movable part $\mathbf{28}_4$ which, in the closed state of this dispensing valve 28, is pressed against a dispensing seat 105 so as to plug this dispensing seat 105, and in the open state of this dispensing valve 28, moves away from the dispensing seat 105 so as to open this dispensing seat 105.

This part $\mathbf{28}_4$ is a membrane.

The dispensing valve 28 comprises the part $\mathbf{28}_4$ which is inserted into the upper part $\mathbf{10}_1$ of the dispensing head 10. The part $\mathbf{28}_4$ is the part of the dispensing valve 28 closest to the outlet 24. This part $\mathbf{28}_4$ is the movable membrane $\mathbf{28}_4$ of the dispensing valve 28.

The part $\mathbf{28}_4$ is movable between the open and closed states of the dispensing valve 28.

The dispensing seat 105 is a lateral part of the internal walls of the housing 80, that is to say that this seat 105 is limited to one face, preferably flat (or curved), of the internal walls of the housing 80, and does not go all the way around a section of the housing 80 which would be made in a plane perpendicular to the direction of elongation of the part of the housing 80 enclosing the valve 28.

In one embodiment of a method of manufacturing the device 100, the dispensing valve 28 is mounted in the dispensing housing 80 by inserting the dispensing valve 28 into the upper head $\mathbf{10}_1$ at the junction between the upper head $\mathbf{10}_1$ and lower head $\mathbf{10}_2$ before the upper head $\mathbf{10}_1$ and lower head $\mathbf{10}_2$ are assembled together.

The device 100, in particular the upper part $\mathbf{10}_1$ of the dispensing head 10, comprises the outlet 24.

The outlet 24 opens onto the outside of the device 100.

The outlet 24 is located at the end of the dispensing head 10, in particular in the upper part $\mathbf{10}_1$ of the dispensing head 10. The outlet 24 is positioned on the left side of the dispensing head 10 relative to the axis A.

The contact surface 26 surrounds or borders the outlet 24.

The outlet 24 is arranged to dispense fluid in a direction substantially perpendicular to the pressing surface 26.

The outlet 24 is arranged to dispense the fluid in a direction substantially perpendicular and in a direction opposite to the external force 18 exerted on the contact surface 26 at the level of the dispensing head 10.

In FIGS. 1 to 4, the pocket 2 is fixed to the reservoir 6. To fix the pocket 2 to the reservoir 6, the device 100 further comprises means 32 for screwing the pocket 2 to the barrel 55 so as to fix the reservoir 6.

The means for screwing 32 comprise a screw thread 32.

The pocket 2 comprises an end piece 34 arranged to sink (i.e. fit) into the reservoir 6. The end piece 34 is rigid and preferably made of PP or PE and is preferably at least 8 mm long. The feed orifice 8 is positioned at the end of the end piece 34.

In a variant of the device 100, the end piece 34 is pressed into the reservoir 6 so as to fix the pocket 2 to the reservoir 6.

On the device 100, the reservoir 6 comprises a lid 36 arranged to block the circulation of fluid contained in the reservoir 6 towards the pocket 2 as long as the end piece 34 of the pocket 2 is not pushed into the reservoir 6. Thus, before positioning the pocket 2 above the reservoir 6, the reservoir 6 is airtight because the lid 36 has not yet been pierced.

The end piece 34 is arranged to pierce the lid 36. Thus, to fix the pocket 2 to the reservoir 6, it is necessary to push the end piece 34 into the reservoir 6 and then screw the means 32 for screwing the pocket 2 to the barrel 55 for fix the reservoir 6. During the step of screwing the means 32 to the barrel 55, a finger 75 disposed in the bottom of the barrel 55 presses the bottom of the reservoir 6 in order to facilitate the priming of the device. In another embodiment, the reservoir 6 may comprise a rigid cylindrical container in which a piston slides, the finger 75 is then arranged to push the said piston by passing through an orifice arranged in the bottom of the rigid cylindrical container.

The device 100 comprises a feed valve 38 positioned at the level of the feed orifice 8, more precisely inside the end piece 34 in a feed seat 62, and which, in an open state, allows the passage of the fluid contained in the reservoir 6 towards the pocket 2, and which, in a closed state, does not allow it.

In FIGS. 1 to 3, the reservoir 6 is arranged to reduce its interior volume after each opening of the feed valve 38. In FIGS. 1 to 4, the part of the reservoir 6 further comprises the feed valve 38 housed at the level of the feed seat 62, said valve 38 being located at the junction between the interior volume of the pocket 2 and an interior volume of the reservoir 6.

The feed valve 38 of device 100 is shown in FIG. 6.

The feed valve 38 has two parts. An upper part formed by a cylinder and a lower part. The lower part of the feed valve 38 comprises a pusher or a membrane $\mathbf{38}_1$ The feed valve 38 is typically made of TPO.

The feed valve 38 is located inside the pocket 2 and is arranged to:

in its closed state, press against the feed orifice 8, and in its open state, move away from the feed orifice 8.

At rest, that is to say without the device 100 being subjected to any stress or external force 18, the feed valve 38 is in its closed state.

The feed valve 38 comprises a second anti-drip device located with the valve 38 and the feed seat 62, inside the end piece 34. This second anti-drip device is arranged to limit the quantity of product remaining in the feed orifice 8. The second anti-drip device may be merged with the feed valve 38. The feed valve 38 is arranged to be closed if a force is applied to the pocket 2.

Preferably, even if this is less essential, at rest, that is to say without the device 100 being subjected to any stress or external force 18, the valve 38 is also in its closed state.

When the pocket 2 is filled with the fluid to be dispensed and the volume of the pocket 2 decreases (for example due to an increase and/or an application of the external force 18 on the contact surface 26):

the dispensing valve 28 (more exactly the membrane $\mathbf{28}_4$) moves away from the distribution seat 105 and the dispensing valve 28 is in its open state; fluid comes out through the outlet 24 and the pocket 2 empties at least partially, the feed valve 38 (in particular the valve element $\mathbf{38}_1$ of the valve 38) is pressed against the internal wall of the end piece 34 of the pocket 2 and blocks the passage of fluid come from the feed orifice 8. The feed valve 38 is in its closed state; fluid cannot (or hardly ever) escape from pocket 2 to reservoir 6.

When the pocket 2 is filled with the fluid to be dispensed and the volume of the pocket 2 increases (for example by releasing the external force 18 on the contact surface 26):

the dispensing valve 28 (more exactly the membrane $\mathbf{28}_4$) is pressed against the distribution seat 105 and the valve 28 is in its closed state; fluid cannot pass from pocket 2 to outlet 24, the feed valve 38 is “sucked” and the valve element $\mathbf{38}_1$ of the valve 38 moves away from the internal walls of the end piece 34 of the pocket 2 facing the feed orifice 8. The valve 38 is in its open state; fluid can pass from the reservoir 6 (passing through the feed orifice 8) to the pocket 2 so as to refill the pocket 2.

The reservoir 6 is equipped with a part 64 comprising a sealing skirt 60 provided with the lid 36, said sealing skirt 60 being located at the junction of the end piece 34 of the pocket 2 and the upper envelope of the reservoir 6.

The part 64 of the reservoir 6 is integral with the inner envelope of the reservoir 6. The part 64 of the reservoir 6 is in particular located in the upper part of the reservoir 6, that is to say in a housing of the reservoir 6 located at the junction between the reservoir 6 and the end piece 34 of the pocket 2.

The feed orifice 8 is located at the end of the end piece 34, that is to say at the junction between the reservoir 6 and the pocket 2.

FIG. 5 illustrates the sealing skirt 60 including the lid 36.

The sealing skirt 60 is typically made of PP and the lid 36 of PP. The lid 36 is made of the same material as the sealing skirt 60. There is continuity of material between the sealing skirt 60 and the lid 36. Thus, the sealing skirt 60 and the lid 36 form one piece.

The reservoir 6 is preferably made of polyolefin and is produced by blowing. FIGS. 1 and 2 typically show two configurations of device 100 arranged to dispense a fluid.

The fluid comprises a liquid and/or a gas, and is preferably a liquid, a cream, a paste, a gel or a mixture thereof.

The plane of the junction between the upper head $\mathbf{10}_1$ and lower head $\mathbf{10}_2$ and the plane, in which the dispensing orifice 22 is located, are parallel.

In FIGS. 1 to 3, the dispensing head 10 extends mainly longitudinally along the axis A.

Unless stated otherwise, throughout this description, the axis A will be defined by default as the axis A in the stable position 12.

This axis A passes through the barycenter of the dispensing orifice 22 and the central axis of the dispensing channel 20.

The central axis of the dispensing channel 20 passes through the barycenter of the junction between the upper head $\mathbf{10}_1$ and lower head 102.

In FIG. 1, no external force is applied at the level of the contact surface 26. The dispensing head 10 is therefore in a stable position 12. Thus, the device 100 is said to be in a stable position 12 when the plane containing the stop 66 of the pocket 2 and the plane containing the dispensing orifice 22 are parallel. In this case, the axis A intersects perpendicularly the stop 66 of the pocket 2, in particular at its barycenter.

In FIG. 2, the external force 18 is exerted at the level of the contact surface 26. The dispensing head 10 is therefore in an inclined position 14. The plane containing the stop 66 of the pocket 2 and the plane containing the dispensing orifice 22 are no longer parallel. The axis A passes through the barycenter of the stop 66 but does not intersect it perpendicularly.

The dispensing head 10 inclines according to the inclination angle 16. The inclination angle 16 is defined, in FIG. 2, by the angle between (for example at the level of the intersection on the stop 66) from:

the axis A or the longitudinal direction of the head 10 in the stable position 12 of the dispensing head 10, with the axis A or the longitudinal direction of the head 10 in the inclined position 14 of the dispensing head 10, that is to say typically when the dispensing orifice 22 is no longer parallel to the stop 66 from pocket 2.

This angle 16 is the same between:

the direction connecting the dispensing orifice 22 to the outlet 24 and/or to the surface 26 in the stable position 12 of the dispensing head 10, and the direction connecting the dispensing orifice 22 to the outlet 24 and/or to the surface 26 in the inclined position 14 of the dispensing head 10.

In FIG. 2, the dispensing head 10 is typically inclined in a inclined position 14 of 25 degrees (25°). However, the dispensing head 10 may incline in other inclined positions 14. In the case considered, the dispensing head 10 inclines on the right side with respect to the axis A of the dispensing head 10.

In fact, the dispensing head 10, except for its stable position 12 and according to various possible inclined positions 14, is arranged to reach a position of maximum inclination when the inclination angle 16 is inclined by at least 20°, preferably 30 degrees, or even at least 45 degrees, relative to said stable position 12, said position of maximum inclination being arranged to reduce the interior volume of the pocket 2, typically by at least 20%. Thus, the dispensing head 10 cannot incline beyond the position of maximum inclination, even if the external force 18 is greater than the threshold force. If the device 100 is in its position of maximum inclination and an external force 18 greater than the threshold force is applied at the contact surface 26, then such external force 18 could damage the device 100.

FIGS. 7 to 12 illustrate another embodiment of a device 700 for dispensing a fluid. The device 700 comprises all the elements of the device 100. Thus, only the differences with the device 100 will be described. In this part, we consider that the axis A is defined by the axis on which the dispensing head 10 is centered.

The dispensing valve 28 of the device 700 comprises all the elements of the dispensing valve 28 of the device 100 except the part $\mathbf{28_1}$, tapered end $\mathbf{28_1}$, of the dispensing valve 28 of the device 100.

In the device 700, the deformable wall 4 of the pocket 2 comprises a bellows 44.

The bellows 44 is a bellows 44 comprising a pleat. In an alternative embodiment, the device 700 may comprise at least one pleat.

The bellows 44 is of cylindrical shape and is centered, when the device 700 is in a stable position 12, on an axis collinear with the axis A. In this case, the bellows 44 therefore comprises on its outer wall corrugations propagating in such a manner parallel to the axis A, i.e. parallel to the direction of elongation of the dispensing head 10.

In FIG. 7, the device 700 is in a stable position 12.

The two parts $\mathbf{4_1}$ and $\mathbf{4_2}$ of the deformable wall 4 are identical. The device 700 may therefore incline according to different inclined positions 14 on both sides of the axis of elongation of the dispensing head 10 or even in all directions of inclination of the dispensing head 10 around the axis A.

The bellows 44 is also arranged to be compressed when an external force 18, comprising at least one component parallel to the axis of the cylinder of the bellows 44 and oriented in the direction of the reservoir 6, is applied at the level of the dispensing head 10.

Bellows 44 is made of TPO

The device 700 comprises locking means 50 arranged to limit and/or prevent stretching of one of the sides of the bellows 44 during any inclined position of the dispensing head 10. In fact, the bellows 44 of the pocket 2 is comprised in a rigid case 50 serving as a locking means 50. Thus, when the bellows 44 inclines to the left side in FIG. 8, the portion $\mathbf{4_2}$ of the deformable wall of the bellows 44 collapses and folds over it even while the part $\mathbf{4_1}$ stretches slightly and will come into abutment against the rigid case 50. The extension of the part $\mathbf{4_1}$ of the deformable wall 4 is therefore blocked by the rigid case 50.

The locking means 50 are also arranged to limit and/or prevent stretching of the bellows 44 when the bellows 44 is subjected to any stretching force.

Thus, the distance separating the two ends of the part $\mathbf{4_1}$ of the deformable wall 4, in the inclined position 14, is equal to or only very slightly greater than the distance separating the two ends of the part $\mathbf{4_1}$ of the deformable wall 4 of the position stable 12.

The distance separating the two ends of the part $\mathbf{4_2}$ of the deformable wall 4, in the inclined position 14, is less than the distance separating the two ends of the part $\mathbf{4_2}$ of the deformable wall 4 of the stable position 12.

The distance separating the two ends of the part $\mathbf{4_1}$ of the deformable wall 4, in the inclined position, is greater than or equal to the distance separating the two ends of the part $\mathbf{4_2}$ of the deformable wall 4 of the inclined position 14.

In the case where the bellows 44 is compressed, then the distances separating the two ends of the parts $\mathbf{4_1}$ and $\mathbf{4_2}$ of the deformable wall 4 are less than the distances separating the two ends of the parts $\mathbf{4_1}$ and $\mathbf{4_2}$ of the deformable wall 4 when no force is exerted on the dispensing head 10.

In FIG. 8, the dispensing head 10 is inclined to the left side of the axis of elongation of the dispensing head 10.

There is therefore an asymmetry between the two parts $\mathbf{4_1}$ and $\mathbf{4_2}$ of the deformable wall 4 of the bellows 44 in position 14.

The pocket 2 of the device 700 comprises two end pieces $\mathbf{34_1}$ and $\mathbf{34_2}$ positioned at the two ends, upper and lower, of the pocket 2.

The upper end of the pocket 2 comprises a holding surface 68.

The end pieces $\mathbf{34_1}$ and $\mathbf{34_2}$ are cylindrical in shape.

The pocket 2 or the module 46 comprises means 32 for screwing the pocket 2 to the dispensing head 10. The module 46 may fit or screw into the pocket 2.

The means 32 for screwing include a screw thread 32.

The end piece $\mathbf{34_1}$ is positioned on the upper end of the pocket 2, that is to say on the holding surface 68, and is arranged to be screwed inside the dispensing channel 20 in the dispensing head 10.

The thread 32 is positioned on the outer wall of the end piece $\mathbf{34_1}$. Thus, the end piece $\mathbf{34_1}$ is screwed to the dispensing head 10 inside the dispensing head 10.

The end piece $\mathbf{34_2}$ is positioned on the lower end of the pocket 2, that is to say on a surface of the pocket 2 opposite the holding surface 68. The end piece $\mathbf{34_2}$ is arranged to fit into and/or be integral with the reservoir 6.

When the device 700 is not subjected to an external force 18, for example in FIG. 7, the holding surface 68 is a planar surface.

The device 700 is arranged so that the upper end of the pocket 2, in particular the holding surface 68, deforms as little as possible to maximize the reduction in volume of the pocket 2. This may take the form of:

- a holding surface 68 sufficiently rigid so that its deformation, caused by the inclination of the pocket 2, at the level of the attachment of the end piece $\mathbf{34_1}$, only comprises deformation heights less than or equal to 2 or 3 mm with respect to to the flat surface of the holding surface 68 (either when no force is applied at the contact surface 26), and/or
- consolidation of the upper end of the pocket 68 (with the walls of the end piece $\mathbf{34_1}$). Said consolidation may typically be produced at the level of a plate 52 (or pusher 52) integral with the dispensing head 10 and preferably being fixed by interlocking the pocket 2 on the end piece $\mathbf{34_1}$ at the level of the plate 52 (or pusher 52) of the dispensing head 10, and/or the end piece $34_1$ which comprises an exterior diameter almost as large as the diameter of the bellows 44, for example being at least two thirds of the diameter of the bellows 44.

The dispensing head 10 is a single piece which is broken down into:

a middle part (preferably cylindrical), centered on the axis A, and in which the dispensing channel 20 is arranged in its center, an applicator, carried by the middle part, and comprising at least one curved shape (i.e. a curve) comprising the contact surface 26 and/or the outlet 24. For the device 700, the curved shape is a sphere and extends over the entire surface of the applicator;

a part, in the form of a plate 52, carrying the middle part and positioned at the end of the dispensing head 10, that is to say the end of the dispensing head 10 facing the holding surface 68 of the pocket 2.

The part in the form of a plate 52 and facing the holding surface 68 comprises the pusher 52.

The dispensing channel 20 passes through all the parts of the dispensing head 10 and is centered on the central axis of the dispensing head 10, or on the axis A.

The applicator, that is to say the spherically shaped part of the dispensing head 10, is located at the upper end of the dispensing head 10 and thus comprises the outlet 24 through which the fluid of the device 700 escapes.

The outlet 24 of the device 700 is arranged to dispense fluid in the direction of elongation of the dispensing head 10.

The contact surface 26 of the dispensing head 10, precisely of the applicator, extends over the entire perimeter of the curved shape of the applicator and therefore over the entire spherical part of the dispensing head 10. In this way, the device 700 comprises an extended contact surface 26 which makes it possible to exert an external force 18 at a multitude of positions located on the applicator of the dispensing head 10. The device 700 may therefore be adapted to different forms of application of external force 18.

In the case of FIG. 7, no external force 18 is applied to the contact surface 26.

The longitudinal direction of the dispensing head is defined by the axis A, i.e. the axis on which the middle part of the dispensing head 10 is centered.

The dispensing head 10 and the reservoir 6 are aligned axially in the longitudinal direction when the head 10 is in its stable position 12, that is to say that there is a co-axiality of the dispensing head 10 with the reservoir 6.

The dispensing head 10 and the pocket 2 are also aligned axially in the longitudinal direction when the head 10 is in its stable position 12, that is to say that there is a co-axiality of the dispensing head 10 with pocket 2.

The dispensing head 10 is arranged to incline on the opposite side on which the external force 18 is exerted at the level of the contact surface 26.

The arrangement of the device 700, i.e. the use of the bellows 44 and a spherical contact surface 26 causes the dispensing head 10 and the pocket 2 to follow the same inclined movement when the external force 18 is applied to the device 700 at the contact surface 26.

In FIG. 8, an external force 18 is exerted on the right side of the contact surface 26. The dispensing head 10 and the pocket 2 are inclined to the left side of the elongation axis of the dispensing head 10, i.e. on the left side of axis A.

The dispensing head 10 is equipped with the pusher 52 arranged to:

press against the holding surface 68 of the pocket 2, preferably a holding surface 68 of the bellows 44, and hold said holding surface 68 fixed with respect to the dispensing head 10.

In the case of FIG. 8, when the dispensing head 10 is inclined, the locking means 50 press on the pusher 52 and the pusher 52 itself presses on the holding surface 68 of the pocket 2. In FIGS. 7 and 8, the holding surface 68 and the pusher 52 are held assembled by clamping the locking means 50 on a case 70 containing the reservoir 6.

The case 70 may be made of metal and/or of polymer.

The locking means 50, that is to say the rigid case 50, are arranged to limit and/or prevent stretching of one of the sides of the pocket 2, and thus limit the inclination of the dispensing head 10.

The locking means 50 is of cylindrical shape.

The means 50 comprises an orifice for inserting the head 10.

The dispensing head 10 is arranged in the orifice of the locking means 50. Thus the orifice of the locking means 50 surrounds the middle part of the dispensing head 10. The orifice of the locking means 50 therefore comprises an internal diameter larger than the middle part of the dispensing head 10 so as to allow the inclination of the dispensing head 10 while limiting it.

Thus, the interior and/or external diameter of the locking means 50 may be chosen so as to define the maximum inclination angle.

The locking means 50 comprise, on an outer wall, means for screwing 102 the locking means 50 to the rigid case 70 comprising the reservoir 6. The rigid case 70 is arranged to contain the entire volume of the reservoir 6.

Reservoir 6 is equipped with a part comprising:

the feed valve 38 housed at a feed seat, said valve 38 being located at the junction between the interior volume of the pocket 2 and an interior volume of the reservoir 6, and a cap 40 provided with a lid 42, said cap 40 being located at the junction between the interior volume of the pocket 2 and the dispensing channel 20, and arranged to fit into the end piece $34_1$ (in the interior part of the end piece $34_1$) and a connecting element 46 connecting the feed valve 38 and the cap 40, said connecting element 46 being arranged to deform during a deformation of the pocket 2.

The part of the reservoir 6 comprising the cap 40 further comprises the feed valve 38 housed at the level of the feed seat 62, said valve 38 being located at the junction between the interior volume of the pocket 2 and an interior volume of the reservoir 6.

The cap 40 further comprises insertion means arranged to push the feed valve 38 into the end piece $34_2$, more precisely in the inner part of the end piece $34_2$ of the pocket 2.

These insertion means are connected to the feed valve so as to insert it into the pocket forming an provided element, preferably connected to the end opposite to the feed valve, and are means for taking it and fixing it more precisely by fitting it into the pocket on the side of the upper end piece $34_1$ and/or lower end piece $34_2$.

The feed valve is housed at the lower end piece.

The lid of the cap is housed in the upper end piece.

The connecting element connects the feed valve to the insertion means.

In the case of FIGS. 7, 8 and 9, the feed valve 38, the cap 40 provided with the lid 42 and the connecting element 46 form a single and unique connecting piece 701.

Thus, as regards the end pieces $34_1$ and $34_2$ of the pocket 2:

the end piece $34_1$ of the pocket 2 comprises an internal diameter, hollow (and of cylindrical shape), arranged so as to accommodate the cap 40 of the connecting piece 701, and the end piece $34_2$ of the pocket 2 comprises an internal diameter, hollow (and cylindrical in shape), arranged to accommodate the feed valve 38 of the connecting piece 701 (and so as to fit on the upper end of the reservoir 6).

In the case of FIGS. 7 and 8, the connecting element 46 is flexible and is located in the interior volume of the pocket 2.

The device 700 further comprises a perforator 48, located in the dispensing head 10, and arranged to perforate the lid 42 of the cap 40 housed in the dispensing seat when the device 700 is assembled. Mainly, the perforator 48 thus comprises one end provided with an acute angle, oriented towards the lid 42 of the cap 40 and arranged to pierce the lid 48 of the cap 40.

In the case of FIGS. 7 to 9, the connecting element 46 of the connecting piece 701 is flexible or breakable after mounting the pocket 2 on the reservoir 6.

In the case considered of the device 700, the connecting element 46 is flexible. In this way, at each inclination of the dispensing head 10, the connecting element 46 follows the movement of the pocket 2 and does not break. The pocket 2 is no longer aligned with the central axis of the reservoir 6 and the axis A. Note that the pocket 2 may incline relative to a stable position 12 but also compress along the axis A even in the stable position 12, including for the device 100. The device is arranged to dispense product by inclining the dispensing head 10 with respect to a stable position 12, but it is also arranged to dispense product by compressing the dispensing head 10 along axis A.

The reservoir 6 of the device 700 is formed from a single piece.

The reservoir 6 and the pocket 2 of the device 700 are formed from a single piece.

The reservoir 6 of the device 700 comprises a bellows $6_1$ of the reservoir 6. Thus, the reservoir 6 of the device 700 comprises an outer wall comprising two parts:

a first part $6_1$ comprising the bellows $6_1$ of the reservoir 6, a second part $6_2$ positioned below the bellows $6_1$ of the reservoir 6.

The bellows $6_1$ of the reservoir 6 (preferably cylindrical) is centered on the axis A when the head is in the stable position 12 (FIG. 7). The bellows $6_1$ of the reservoir 6 therefore comprises on its outer wall parallel corrugations $6_1$ succeeding parallel to the axis A, that is to say parallel to the direction of elongation of the dispensing head 10 when the dispensing head 10 is in a stable position.

The reservoir 6, more precisely the bellows $6_1$ of the reservoir 6, is arranged to compress in a direction parallel to the axis A and in a direction starting from the reservoir 6 towards the pocket 2.

The reservoir 6, more precisely the part $6_2$ of the reservoir 6, is arranged to compress towards the inside of the reservoir 6, preferably in a direction orthogonal to the axis A and in a direction 90 starting from the outer wall of the reservoir 6 towards the axis of the reservoir 6, i.e. the axis A.

For this, the reservoir 6 comprises on its outer wall grooves 92 or stiffnesses 92, in particular on the part $6_2$ of the reservoir 6, arranged to approach towards the inside of the reservoir 6. Thus the grooves 92 are arranged to compress the reservoir 6 in the direction orthogonal to the axis A and in the direction 90, at each decrease in the volume of fluid contained in the reservoir 6.

The grooves 92 of the reservoir are located below the bellows $6_1$ of the reservoir 6 more precisely in the part $6_2$ of the reservoir 6.

The reservoir 6, more precisely the part $6_2$ of the reservoir 6, is arranged to compress by entering inside the reservoir 6 (more exactly inside the bellows $6_1$), preferably in a direction parallel to the axis A as shown in FIG. 11.

In FIGS. 11 and 10, the device 700 is in a stable position 12. These figures do not illustrate the locking means 50, the case 70 of the reservoir 6 and the dispensing head 10.

The pocket 2 and the reservoir 6 of the device 700 are integral with one another so as to form a single piece. Said part is preferably obtained by blowing or 3D printing.

More precisely, FIGS. 10 and 11 illustrate the device 700 comprising the pocket 2 and the reservoir 6 blown after a complete use or not of the device 700.

Indeed, in FIG. 10, we see that:

the upper part $6_1$ (i.e. the bellows $6_1$ of the reservoir 6), comprising corrugations parallel to the central axis of the device 1000, is compressed. In FIG. 10, the spacing between the corrugations of the reservoir 6 has decreased compared to FIGS. 7, 8 and 9. Thus, the length of the bellows $6_1$ of the reservoir 6 in FIG. 10 is less than the length of the bellows $6_1$ of the reservoir 6 of the FIGS. 7, 8 and 9. The bellows $6_1$ of the reservoir 6 is therefore compressed.

the lower part $6_2$ comprises a smooth wall but structured by stiffeners 92, also called grooves 92, arranged so that this part $6_2$ of the reservoir 6 is radially deformed in order to avoid folds, for example pinching at the level of the wall of the reservoir 6. The shape of the longitudinal “embossing” stiffeners 92 is illustrated by the cross section of portion $6_2$ of reservoir 6 in FIG. 12.

Thus, FIG. 10 illustrates, after several dispensations of fluid, a reduced form of the reservoir 6. The use of the device 700 is not complete, that is to say that there is still fluid contained in the pocket 2 and the reservoir 6 of the device 700.

In FIG. 11, the use of the device 700 is complete, that is to say that there is no longer any fluid contained in the reservoir 6, device 700. A certain quantity may remain in the pocket 2.

In FIG. 11, the spacing between the corrugations of the reservoir 6 is the same as the spacing of the corrugations of the reservoir 6 of FIG. 10. However, the part $6_2$ of the reservoir 6 has compressed in the direction of the axis A.

In the case of the device 700, if the reservoir 6, in particular the part $6_1$ of the reservoir 6 comprises an exterior diameter greater than the exterior diameter of the part $6_2$ of the reservoir 6, then part $6_2$ is arranged to enter into the interior of the reservoir 6.

Thus, after each inclination of the dispensing head 10, the interior volume of the reservoir 6 decreases, preferably is compressed, so that the lower part $6_2$ of the reservoir 6 approaches the upper part $6_1$ of the reservoir 6 and/or is compressed radially on part $6_2$.

Indeed, in FIG. 11, the lower part $6_2$ of the reservoir 6 is compressed and is folded inside the upper part $6_1$ of the reservoir 6, in order to optimize emptying of the fluid contained in the reservoir 6.

FIGS. 13-16 illustrate another embodiment of a device 1300 for dispensing a fluid. Only the differences with the device 700 will be described.

The dispensing valve 28 of the device 1300 is identical to the dispensing valve of the device 700.

Device 1300 comprises:

the reservoir 6 positioned in the rigid case 70, the pocket 2 carried by the reservoir 6, the dispensing head 10 carried by the pocket 2, a cover 94 being in the case of FIGS. 13 to 16, a rigid cover 94 positioned above the pocket 2, a dispensing button 72 forming part of the dispensing head 10, a cap 74 covering the dispensing button 72, the cover 94, the dispensing head 10, the pocket 2 and the reservoir 6.

The cap 74 is arranged to fit onto the rigid case 70 when the device 1300 is no longer used to dispense fluid. The entire interior volume of the reservoir 6 is comprised in the rigid case 70.

The rigid case 70 comprises an interior wall $\mathbf{70}_1$.

The rigid case 70 may be made of metal and/or glass, and/or wood.

The device 1300 (more exactly the head 10) comprises a position of maximum inclination.

The device 1300 comprises the cover 94 arranged to limit and/or prevent the inclination of the dispensing head 10 beyond the position of maximum inclination. Thus the cover 94 blocks the inclination of the dispensing head 10 when the dispensing head has reached its position of maximum inclination.

The cover 94 comprises means for screwing 104 the cover 94 to the rigid case 70, thus making it possible to keep the dispensing head 10, the pocket 2 and the reservoir fixed to the rigid case 70.

The cover 94 comprises, as for the device 700, an orifice and positioned on the central axis of the cover 94, said axis being collinear with the axis A. The orifice of the cover 94 is arranged to pass the dispensing head 10. through the inside of the orifice in the cover 94. The diameter of the orifice in the cover 94 is therefore larger than the diameter of the dispensing head 10. The position of maximum inclination of the dispensing head 10 is given by the diameter of the orifice in the cover. In a variant of the device 1300, the diameter of the orifice of the cover 94 is arranged so as not to block the inclination of the dispensing head 10.

The dispensing button 72, $\mathbf{10}_1$ of the head 10 comprises an outer wall and an inner wall.

The dispensing head 10, on its outer wall, comprises means 106 for screwing the part $\mathbf{10}_2$ of the dispensing head 10 comprising the channel 20 to the dispensing button 72, typically to the inner wall of the dispensing button 72.

The dispensing button 72 further comprises an orifice 73 positioned on the upper wall of the dispensing button 72 and passing through the outer and inner wall of the dispensing button 72. The orifice 73 is arranged so as to be centered on the outlet 24 of the dispensing head 10 when the device 1300 is mounted, that is to say when the dispensing button 72, the cover 94 the dispensing head 10, the pocket 2, the reservoir 6 and the rigid case 70 are assembled together. Thus, when the part $\mathbf{10}_2$ is attached to the dispensing button 72, fluid can escape through the outlet 24 passing through the orifice 73 of the dispensing button 72 of the head 10.

As the dispensing button 72 is fixed by the means for screwing 106, the outer wall of the dispensing button 72 of the head comprises the contact surface 26.

The dispensing button 72, being fixed to the part $\mathbf{10}_2$, it follows the positions, that is to say the stable position 12 and/or the inclined positions 14, of the assembly of the dispensing head 10.

The reservoir 6 comprises a cap 96 arranged to at least partially delimit the reservoir 6. The cap 96 comprises two parts:

a platform 98, and a trunk 76 housed in the reservoir 6 and carrying the platform 98 of the cap 96.

The platform 98 and the trunk 76 are integral.

The trunk 76 is cylindrical and is centered on the central axis of the dispensing channel 20, said central axis being collinear with the axis A. Thus, the trunk 76 and the dispensing channel 20 are coaxial in position 12. The trunk 76 is also centered on the central axis of the deformable envelope 56 of the reservoir 6.

The platform 98 of the cap 96 comprises a flat rigid wall having at its ends two edges $\mathbf{98}_1$ made of corner oriented towards the interior of the reservoir 6.

The reservoir 6 comprises the deformable envelope 56 delimiting at least in part the interior volume of the reservoir 6, said deformable envelope 56 comprising radially successive corrugations $\mathbf{56}_2$ around the axis A.

The deformable envelope 56 of the reservoir 6 thus comprises three parts:

an upper part $\mathbf{56}_1$ comprising edges, preferably smooth, and running along the inner wall $\mathbf{70}_1$ of the rigid case 70, a lower part $\mathbf{56}_2$ comprising the radially successive corrugations $\mathbf{56}_2$, a bottom part $\mathbf{56}_3$ carrying the corrugations $\mathbf{56}_2$ and comprising a filling orifice 82.

The bottom part $\mathbf{56}_3$ is a rigid wall, that is to say more rigid than the lower part $\mathbf{56}_2$ comprising the corrugations 562.

The filling orifice 82 comprises a central axis centered on the central axis of the reservoir 6 (i.e. on the axis A). Thus, the filling orifice 82 and the reservoir 6 are coaxial and the filling orifice 82 and the trunk 76 of the cap 96 of the reservoir 6 are coaxial.

The filling orifice 82 is of circular shape and has a diameter equivalent to the external diameter of the trunk 76.

The filling orifice 82 is arranged to fit together and/or embed the trunk 76 of the cap 96 of the reservoir 6 during the assembly of the device 1300, more precisely during the assembly of the reservoir 6. In this way, the trunk 76 is arranged to trap a air bubble (not shown) during assembly of the trunk 76 in the filling orifice 82 after filling the reservoir 6 with the fluid, said air bubble being trapped in the trunk 76. This prevents this air bubble from rising in the reservoir 6 then the pocket 2.

The part $\mathbf{56}_3$ of the reservoir 6, comprising the filling orifice 82, comprises hermetic closure means $\mathbf{82}_1$. The hermetic closure means $\mathbf{82}_1$ comprises a sealing skirt $\mathbf{82}_1$.

The filling orifice 82 is arranged to be closed by the cap 96 of the reservoir 6, in particular by the trunk 76. The part $\mathbf{56}_3$ of the deformable envelope 56 of the reservoir 6 is arranged to be separated from the cover 94, in particular from the trunk 76, for example, with suction cups during a filling phase of the device 1300.

The deformable wall 56 of the reservoir is fixed or welded to the cover 94 of the reservoir 6.

The corner edges $\mathbf{98}_1$ of the platform 98 of the reservoir 6 are arranged to hold the deformable wall 56 of the reservoir 6. In particular, the corner edges $\mathbf{98}_1$ of the platform 98 of the reservoir 6 press the upper end of the wall 56 against the interior wall $\mathbf{70}_1$ of the rigid case 70.

The deformable envelope 56 is arranged to fold back towards the platform 98 at each decrease in volume of the deformable envelope 56.

The deformable envelope 56 is arranged to fold up around the trunk 76 at each decrease in volume of the deformable envelope 56.

Indeed, in FIGS. 13 and 14, the device 1300 is completely filled. Thus, the reservoir 6, containing all the fluid available from the device 1300, therefore comprises its maximum interior volume. In this case, the successive corrugations 56$_2$ of the deformable envelope 56 of the reservoir 6 are radial with respect to the central axis of the trunk 76, i.e. around the axis A.

In FIG. 15, almost all of the fluid contained in the deformable envelope 56 of the reservoir 6 has been dispensed. The deformable envelope 56 is folded towards the platform 98. Thus, the corrugations 56$_2$ of the deformable envelope 56, initially radial around the axis of the trunk 76, have moved towards the trunk 76 and thus form the corrugations 56$_2$.

The smooth edges 56$_1$, of the deformable envelope 56, initially pressed against the inner wall 70$_1$ of the rigid case 70 are arranged to approach the cap 96 of the reservoir 6, in particular of the platform 98, at each decrease in the volume of the fluid contained in the reservoir 6.

Such a configuration makes it possible to consume as much as possible the volume of fluid contained in the reservoir 6 and to optimize the return of fluid:

- by increasing the area of the deformable wall 56 of the reservoir 6, in particular by the corrugations 56$_2$ of the deformable wall 56, and
- by arranging the deformable wall 56 so that it matches the rigid shapes of the reservoir as much as possible, in particular the cover 96, at each decrease in the volume of the envelope of the reservoir 6.

The device 1300 for dispensing a fluid comprises the pocket 2 having an interior volume arranged to contain the fluid, the interior volume being delimited at least in part by the deformable wall 4.

The pocket 2 is formed by a bottom wall 21 and by the flexible deformable wall 4.

The walls 21 and 4 face each other.

The wall 4 forms a skirt, of concave shape, and has an upper part and a lower part.

The deformable wall 4 (more exactly its lower part) is fixed or welded to the bottom wall 21.

The bottom wall 21 preferably has the shape of a plane or substantially a plane.

The bottom wall 21 is a rigid wall, that is to say more rigid than the wall 4.

The deformable wall 4 is for example a thin wall and the bottom wall 21 is for example a wall thicker than the wall 21.

The walls 21 and 4 are for example made of polypropylene (PP).

The deformable wall 4 is preferably made of PP with a polymer or plastomer additive (such as, for example, Vistamaxx™ 6202), in order to reduce its hardness so that the hardness of the wall 4 is less than 80 Shore D. Therefore, too great a fineness and weaknesses of the wall 4 are avoided.

The bottom wall 21 is parallel to the platform 98. More precisely, the bottom wall 21 is fixed to the platform 98 of the cap 94. In a variant of device 1300, the bottom wall 21 and the platform 98 are a single piece.

The feed orifice 8 is located at the level of the bottom wall 21 and pierces the bottom wall 21 and the platform 98 so as to connect the reservoir 6 to the pocket 2.

The deformable wall 4 of the pocket 2 comprises zones of weakness 78 and/or joints 78 arranged to allow inclined positions 14, inclined but stable, of the dispensing head 10 in the absence of external force 18.

These zones of weakness 78 correspond to a zone 78 where the deformable wall of the pocket 2 is thinner than on the other parts of the deformable wall 4.

When the dispensing head 10 is in the inclined position 14, the zone of weakness 78 of the deformable wall 4 is arranged to press against and/or approach the bottom wall 21 of the pocket 2, thus forming the inclined position 14 preferential (and stable) of the dispensing head 10.

As long as no secondary external force is applied to the contact surface 26, the device 1300 remains and maintains this inclined but stable position 14 of the dispensing head 10. However, this secondary external force must be applied on the opposite side to the side on which the external force 18 has been exerted in order to position the dispensing head 10 in its inclined position 14.

In all cases, the deformation force is more difficult at the start of the inclination to then arrive more easily or automatically at a preferential position at an angle precise to within 5 degrees, thus allowing a dosage.

Indeed, in FIG. 15, the external force 18, with respect to the central axis of the dispensing channel 20, is applied on the right side of the dispensing head 10. The dispensing head 10 and the pocket 2 maintain an inclined position 14 but stable on the left. Thus, to return the device 1300 to its initial stable position, that is to say before the exercise of any external force 18 (i.e. when there is co-axiality between the dispensing head 10 and the reservoir 6), the secondary external force must be applied on the left side of the dispensing head 10, i.e. on the side with the inclined position 14.

In one embodiment of a method for assembling the device 1300, illustrated in FIG. 16, the deformable wall 56 of the reservoir 6, in particular the part 56$_3$, is pulled outwards so as to release the filling orifice 82. The reservoir 6 is filled with fluid and it is closed with the cap 96 by pushing the deformable wall 56 of the reservoir 6 towards the interior of the reservoir 6, in particular, the part 56$_3$ (movement opposite to the previous one). The reservoir 6 comprises the sealing skirt which makes it possible to seal the part 56$_3$, i.e. the bottom of the reservoir 6 mounted in the cap 96. The deformable wall 56 of the reservoir 6 comprises the skirt and is of the same material.

The skirt is more rigid than the part 56$_2$ of the deformable wall 56.

In the case of assembling the device 1300 by blowing, the sealing skirt may be made with a more rigid material because the thicknesses of the deformable wall 56 may be reduced.

In the case of mounting the device 1300 by injection: one works with deformable wall thicknesses varying between 0.4 mm to 0.5 mm. In this case, a flexible material is used to design the reservoir, in particular the deformable wall 56. The sealing skirt is designed with a more rigid material than the material used for the deformable wall 56.

In a variant of the devices 100, 700, 1300, there may be two fluids contained in two separate reservoirs 6. The devices 100, 700, 1300 may have a preferential inclination for each of the fluids, and/or a third inclination arranged to mix the fluids. The third inclination may be, for example, a pressing force 18 parallel to the direction of elongation of the dispensing head 10, or collinear with the axis A.

FIGS. 17-18 illustrate another embodiment of a device 1700 for dispensing fluid. Only the differences with the devices 100, 700 and 1300 will be described.

The device 1700 for distributing the fluid comprises:

a pocket 2 comprising an interior pocket $2_1$ and an exterior pocket $2_2$, said interior pocket $2_1$ being located at least partly in the exterior pocket $2_2$, said interior and exterior pockets $2_1$, $2_2$ each having an interior volume arranged to contain the fluid, said interior volume of the exterior pocket $2_2$ being delimited at least in part by a movable wall 3, said movable wall 3 being arranged to, under the exertion of a pressing pressure 18, reduce the interior volume of the interior pocket $2_1$ and the interior volume of the exterior pocket $2_2$ by deforming and/or by moving, an outlet 24 arranged to dispense the fluid.

The interior volume of the interior pocket $2_1$ is delimited at least in part by:

a piston 5 integral with a junction wall 7 delimiting at least in part the interior volume of the exterior pocket 22, a housing 9 of the piston 5 arranged to accommodate the piston 5 and guide it during an axial movement 11 of said piston 5 in the housing.

The device 1700 is arranged to guide the fluid according to a circuit comprising:

a first route, passing:

from the inside of the exterior pocket $2_2$ to the inside of the interior pocket $2_1$ and/or the piston 5 in the interior pocket $2_1$, via at least one connecting orifice 13 connecting the interior volume of the exterior pocket $2_2$ to the inside of the interior pocket $2_1$ and/or the piston 5, and a second route, passing from the inside of the interior pocket $2_1$ and/or the piston 5 to the outlet 24.

The device 1700 also comprises a feed orifice 8 connecting a reservoir 6 to the interior volume of the exterior pocket 22.

From FIG. 17, the term volume of pocket 2 means the sum of the interior volume of the interior pocket $2_1$ and the interior volume of the exterior pocket $2_2$.

The pocket 2 is delimited by the movable wall 3, the junction wall 7 and the bottom wall 21.

The device 1700 further comprises braking means 15 arranged to block an axial movement 11, of the piston 5 in the housing 9, reducing the interior volume of the interior pocket $2_1$ and of the exterior pocket $2_2$ when the movable wall 3 is subjected to a pressing pressure 18 (previously called external force 18), less than a threshold force. The device 1700 comprises means for "free" displacement in which the interior volume of the pocket 2 decreases without overpressure constraint of the liquid during the closing of the connecting orifice 13 (playing the role of inlet valve). During this step, the liquid is pumped into the reservoir 6 through the orifice 8 and the pocket 2 is deformed and the piston 5 rubs against the interior walls of the housing 9 and/or guide means 65 of the piston 5 in the housing 9, this step allows an acceleration/impulse of the pressing surface 26. Finally, the device 1700 comprises means for increasing the pressure: as soon as the connecting orifice 13 is closed, the piston compresses the product in the interior pocket $2_1$. Preferably, the pressing force during the pressure build-up is less than the threshold force.

The piston 5 and the housing 9 are therefore arranged to allow three phases of movement of the piston 5 in the housing 9 during an exercise of the force 18:

1 a blocking phase for which the piston 5 does not move beyond the means 15 as long as the force 18 is less than the threshold force, then a crossing of the means 15 as soon as the force 18 is greater than this threshold force;

2 a free movement of the piston 5 in the housing 9 once the piston 5 has passed the means 15 (acceleration in space during the closing of the orifice 13, space between the piston and the housing), typically according to a translation of the piston 5 of at least 0.5 mm or even 1 mm in its housing 9, making it possible to give an impulse or acceleration to the threshold force (kinetic energy) and 3 a compression phase, comprising an increase in the pressure in the pocket $2_1$ after closing the orifice 13.

The most important are phases 2 and 3, phase 1 is optional and/or may be recovered by the return forces of deformation or displacement of the exterior pocket.

The axial movement 11 of the piston 5 is along the central axis of the piston 5.

The device 1700 comprises a pressing surface 26, also called a contact surface 26, arranged to, under the exertion of the pressing pressure 18 and by means of the dispensing head 10, reduce the interior volume of the interior pocket $2_1$ and exterior pocket $2_2$ by deforming and moving the movable wall 3.

The pressing surface 26 is integral with the dispensing head 10, and preferably comprises at least part of the dispensing head 10.

The device 1700 comprises the outlet 24.

The outlet 24 opens onto the outside of the device 1700.

The outlet 24 is located on the dispensing head 10.

The outlet 24 is arranged to dispense the fluid in a direction substantially perpendicular to a direction of movement of the dispensing head 10.

The dispensing head 10 is arranged to follow a translational movement.

The outlet 24 is arranged to dispense fluid in a direction substantially parallel to an axis of elongation of the dispensing channel 20.

The device 1700 comprises a dispensing orifice 22 connecting the pocket 2 to the dispensing channel 20.

The dispensing valve 28 is inside the dispensing channel 20 of the device 1700.

The dispensing channel 20 of the device 1700 comprises an interior volume arranged to only comprise (or accommodate) the dispensing valve 28. Thus only the dispensing valve 28 is comprised in the dispensing channel 20.

The device 1700 comprises the dispensing valve 28 located in the dispensing channel 20, and which, in an open state, allows fluid to pass from the inside of the interior pocket $2_1$ to the outlet 24, passing through the dispensing orifice 22 and the dispensing channel 20 (in particular through the housing 80), and, in a closed state, does not allow a passage of fluid from the interior of the interior pocket $2_1$ to the outlet 24 passing through the dispensing orifice 22 and by the dispensing channel 20 (precisely by the housing 80).

The dispensing head 10 is integral with the bottom wall 21 by overmolding or bi-injection of the dispensing head 10 on the bottom wall 21.

Thus, the dispensing channel 20 comprises and/or is formed by a wall of the dispensing head 10 and an upper wall of the bottom wall 21.

The dispensing head 10 comprises a spray 10.

The dispensing head 10 is located outside the pocket 2.

The dispensing head 10 is arranged to, by exerting pressure 18 on the pressing surface 26, move at least according to the translational movement. The translational movement of the dispensing head 10 is in the same direction but in the sense opposite to the axial movement 11 of the piston 5.

Part of the dispensing head 10 is arranged, under the exertion of the pressing pressure 18, to slide at least in part along the outer wall of the exterior pocket $2_2$ so as to move and/or deform the movable wall 3 of the exterior pocket $2_2$.

The pressing surface 26 is arranged to, under the exertion of pressure, reduce the interior volume of the interior pocket $2_1$ and exterior pocket $2_2$ by deforming the movable wall 3, more exactly by crushing it in the direction of the wall of junction 7.

The deformable movable wall 3 has a shape memory. When this wall 3 is not subjected to any exterior stress, it resumes or remains in its form illustrated in FIG. 17, which maximizes the volume of the interior pocket $2_1$ and exterior pocket $2_2$.

The pressing surface 26, accessible from the outside of the device 1700 by a hand of a user, has a minimum surface area of 10 $mm^2$.

The housing 9 of the piston 5 is delimited at least in part by the bottom wall 21. A part of the bottom wall 21, that is to say the part of the bottom wall 21 in contact with the dispensing channel 20, is integral with the housing 9 of the piston 5.

The bottom wall 21 at least partially delimits the volume of the exterior pocket $2_2$.

The junction wall 7 at least partially delimits the piston 5.

The bottom wall 21 at least partially delimits the housing 9 of the piston 5.

The distance between the wall 7 and the wall 21 defines the volume of the interior pocket $2_1$.

In the device 1700, the braking means 15 are integral with the housing 9 of the piston 5 and preferably comprise at least one tab 17 inclined towards the inside of the housing 9.

The device 1700 comprises a tab 17.

In the device 1700, the movable wall 3 is separated from the junction wall 7. The junction wall 7 is arranged to delimit the interior volume of the pocket 2 and the interior volume of the envelope of the reservoir 6.

The junction wall 7 comprises a substantially planar shape. In the case of the device 1700, the junction wall 7 is rigid, that is to say more rigid than the deformable wall 3 of the pocket 2.

The movable wall 3 is located between the bottom wall 21 and the junction wall 7.

The junction wall 7 has the same rigidity as the bottom wall 21.

The junction wall 7 is fixed to the movable wall 3 of the pocket 2.

The movable wall 3 is fixed to the bottom wall 21 of the pocket 2.

The deformable wall 3 is flexible.

The movable wall 3 is typically made of TPO.

The piston 5 is partially delimited by the junction wall 7.

The piston 5 is fixed to the junction wall 7 by welding and/or molding.

The piston 5 is integral with the flat part of the junction wall 7.

The junction wall 7 is made of PP.

The piston 5 is made of the same material as the junction wall 7. On the device 1700, the piston 5 and the junction wall 7 form a single piece.

Thus the piston 5 is therefore positioned between the flat part of the junction wall 7 and the housing 9 for the piston 5.

The housing 9 for the piston 5 is positioned between the piston 5 and the dispensing channel 20.

The piston 5 is hollow and cylindrical and comprises an exterior diameter delimited by the junction wall 7.

The exterior diameter of the piston 5 comprises an increase in its diameter at the end of the piston 5 facing the housing 9 of the piston 5. This arrangement makes it possible to have a sealed linear annular contact during compression phases, that is to say when the dispensing head 10 is driven by the translational movement reducing the volume of the pocket 2. This makes it possible, among other things, to increase the sealing performance of the device 1700. A low rotational movement (for example of the ball joint type) and optionally complementary to this translational movement.

The device 1700 further comprises a feed orifice 8 connecting the feed channel 78 and/or a reservoir 6 to the volume of the exterior pocket $2_2$.

The device 1700 comprises the reservoir 6. The reservoir 6 communicates with the exterior pocket $2_2$ through the feed orifice 8. The reservoir 6 comprises an interior volume arranged to contain the fluid.

The device 1700 is arranged to guide the fluid along the second route, at each pressing pressure 18 on the movable wall 3 greater than the threshold force, and/or, at each decrease of the interior volume of the interior pocket $2_1$ and exterior pocket $2_2$ for which the connecting orifice 13 is closed, thus causing the movement of the piston 5 in the housing 9. The movement of the piston 5 in the housing 9 causes compression of the product present in the volume of the pocket 2.

The connecting orifice 13 closes after a (sufficient) pressure on the movable wall 3, it thus forms the feed valve of the interior pocket $2_1$.

The device 1700 is arranged to guide the fluid along the first route:

- after an end of each pressing pressure 18 greater than the threshold force, that is to say when the movable wall 3 is no longer under the exertion of a pressing pressure 18 greater than the threshold force, and or
- at each increase of the interior volume of the interior pocket $2_1$ and exterior pocket $2_2$ for which the connecting orifice 13 is opened, that is to say when the piston 5, located in the housing 9, returns to and in the exterior pocket $2_2$.

The connecting orifice 13:

- is formed at a junction 19 between one end of the piston 5 and one end of the housing 9 of the piston 5, and/or
- comprises a hole 23 located in the housing 9 of the piston 5.

The connecting orifice 13 is arranged to:

- close when the piston 5 moves, reducing the interior volume of the pocket 2,
- open during a movement of the piston 5 increasing the interior volume of the pocket 2.

Note that this embodiment comprises a cavity 139.

This cavity 139 corresponds to the interior volume of the piston 5.

This cavity 139 is not closed but the fluid contained in the reservoir 6 can flow from the reservoir 6 to the cavity 139, and/or from the cavity 139 to the outlet 24.

However, a majority (over 50%) or even all of the volume of cavity 139 is dead volume, i.e. the fluid can flow from reservoir 6 to outlet 24 without disturbing or creating movement of the fluid in the cavity 139.

It is further noted that the interior volume of the cavity 139 is greater than the maximum volume of fluid exiting through the outlet 24 when the piston 5 enters its housing 11(sic).

FIGS. 19 to 22 illustrate another embodiment of a device 1900 for dispensing a fluid. Only the differences with the device 1700 will be described.

The device 1900 comprises the dispensing head 10 extending longitudinally over a certain length in a longitudinal direction connecting the dispensing orifice 22 to the outlet 24.

The dispensing head 10 is substantially (at +/−20 mm) in the extension of the reservoir (at the end of the reservoir) and the direction of dispensing substantially opposite to the elongation of the reservoir at +/−20 degrees. The device 1900 is arranged to operate in all positions, in particular head up or down with respect to the earth's gravitational force.

The dispensing head 10 is a straight part extending longitudinally in the longitudinal direction.

The dispensing head 10 comprises the dispensing channel 20. The dispensing channel is a cylinder extending longitudinally over the entire length of the dispensing head 10 and in the same longitudinal direction as the dispensing head 10.

The dispensing head 10 is equipped with a flange 45. The flange 45 is arranged to fix the reservoir 6 in the bottom wall 21.

The axis of the dispensing channel 20 is centered on the central axis of the dispensing head 10, that is to say that the channel 20 and the head 10 are coaxial.

In FIGS. 19 and 22, the device 1900 comprises the reservoir 6 comprising a deformable envelope 56. The deformable envelope 56 of the reservoir 6 is arranged to delimit the pocket 2.

The device 1900 comprises a dispensing orifice 22 connecting the pocket 2, in particular the interior pocket $2_1$ to the dispensing channel 20.

The braking means 15 are integral with the housing 9 and preferably comprise at least one tab 17 inclined towards the exterior of the piston 5.

The connecting orifice 13 includes the hole 23 located in the housing 9 of the piston 5.

The connecting orifice 13 is arranged to close when the piston 5 moves, reducing the interior volume of the pocket 2, open during a movement of the piston 5 increasing the interior volume of the pocket 2.

The device 1900 further comprises the dispensing channel 20 arranged to conduct the fluid coming from the interior pocket $2_1$ towards the outlet 24.

The device 1900 comprises the dispensing valve 28 located in the dispensing channel 20 and arranged to conduct the fluid from the interior pocket $2_1$ to the outlet 24.

The device 1900 further comprises:

the dispensing valve 28, a mixer 25 arranged to receive different separate flows of fluid (coming from the pocket 2) and mix them in the form of a spray at the outlet 24.

The flows may come from the same fluid and/or from different fluids.

One end or part (more exactly the part $28_3$) of the dispensing valve 28 is integral with a rod 27 arranged to sink into the mixer 25 so as to form different channels 59 arranged to conduct the different separate flows of fluid up to the mixer 25.

The dispensing valve 28 comprises a stiffener 49 arranged to prevent bending or (too great) deformation of the valve 28 when it is inserted into the channel 20.

The rod 27 is an element used to produce a spray (i.e. vaporizer).

The mixer 25 comprises three cavities 57 arranged in the dispensing channel 20 (housing 80 of valve 28) to converge towards the outlet 24. The outlet 24 is closed by a front face of the rod 27 (forming the cavities 57 of the mixer 25 connected to the channels 59). These cavities 57 are supplied by the three channels 59 formed by the side walls of the rod 27 and the triangular hole of the distribution part 25, spaced from one another, and arranged to define the three channels 59. In variants, there are at least two cavities 57 and at least two channels 59. Blades are at the bottom of the part 25, in order to increase the pressure at the outlet 24 and create a vortex. Thus, these channels 59 are directed towards the same central direction so as to create a vortex. A groove in the inner wall of the channel 20, and which is an extension of the channels 59, imparts a rotational movement to the fluid circulating therein.

The channels 59, and the cavities 57 (located in the extension of the channels 59), are arranged to create a vortex, at outlet 24, comprising the flows coming from the pocket 2.

The movable wall 3 is a deformable wall.

The movable wall 3 comprises the junction wall 7. More precisely, there is continuity of material between the movable wall 3 and the junction wall 7. The movable wall 3 and the junction wall 7 are similar, that is to say say made of the same material.

The walls 3 and 7 are for example made of polypropylene.

The movable wall 3 delimits at least in part the volume of the exterior pocket $2_2$. The movable wall 3 forms a dome, that is to say that the movable wall 3 comprises a portion of concave shape with respect to the bottom wall 21.

The interior pocket $2_1$ comprises a part delimited by the bottom wall 21. The bottom wall 21 comprises the housing 9 for the piston 5. The housing 9 for the piston 5 is delimited at least in part by the bottom wall 21.

The exterior pocket $2_2$ comprises a part delimited by the bottom wall 21. The bottom wall 21 comprises the feed orifice 8 to connect the pocket 2 to the reservoir 6, more precisely the exterior pocket $2_2$ to the reservoir 6.

The bottom wall 21 preferably comprises a shape of a plane or substantially a plane on which the movable wall 3 is fixed.

The movable wall 3 is fixed or welded to the bottom wall 21, in particular to a plane of the bottom wall 21.

The bottom wall 21 is a rigid wall, that is to say more rigid than the movable wall 3.

The movable wall 3 is for example a thin wall and the bottom wall 21 is for example a wall thicker than the movable wall 3.

The movable wall 3 is preferably made of PP with a polymer or plastomer additive (such as for example Vistamaxx™ 6202), in order to reduce its hardness so that the hardness of the movable wall 3 is less than 80 Shore D Therefore, too great a fineness and fragilities of the movable wall 3 are avoided.

The pocket 2, more precisely the bottom wall 21, delimits at least one housing 39 arranged to accommodate means 31 for fixing the reservoir 6 to the pocket 2. Thus the reservoir 6 can fit into the bottom wall 21. The reservoir 6 is held by clamping by the dispensing part 10. In another embodiment, not shown, the dispensing part 10 comprises an external end piece onto which the reservoir 6 has just fitted at the level of a neck. This neck is constrained in traction by the end piece, optionally an outer ring may be crimped on the outside of the neck by displacement along it in order to improve the seal.

The pocket 2 also comprises a housing 41 in the pocket 2 arranged to mount and/or fit the dispensing head 10 to the pocket 2, more precisely to the bottom wall 21.

The device 1900 comprises the reservoir 6 communicating with the exterior pocket $2_2$ through the feed orifice 8, said reservoir 6 comprising an interior volume arranged to contain the fluid, said interior volume being delimited at least in part by the deformable envelope 56.

The deformable envelope 56 of the reservoir is made of TPO or PE or PP.

The deformable envelope 56 comprises a pressing surface 26 arranged to, from outside the device 1900, receive the pressing pressure 18, external to the device 1900 and orthogonal to the longitudinal direction of the dispensing channel 20.

Thus, at each pressing pressure 18 greater than the threshold force, the piston 5 or part of the piston 5, initially included in the interior volume of the exterior pocket $2_2$, will move into the housing 9 of the piston 5.

Thus, the reservoir 6 is arranged to reduce its interior volume after each opening of the feed valve 38.

The reservoir 6, in particular the deformable wall 56 of the reservoir 6, comprises the means 31 for fixing the reservoir 6 to the pocket 2, specifically for fixing the reservoir 6 to the bottom wall 21, in particular to the bottom wall 21 comprising a part of the interior pocket $2_1$.

The means 31 for fixing the pocket 2 to the reservoir 6 are integral with the reservoir 6, in particular with the deformable wall 56 and the holding surface 33 of the reservoir. The means 31 are thicker than the rest of the deformable wall 56 of the reservoir 6.

These means 31 for fixing are a rigid part of the deformable wall 56, that is to say more rigid than the other parts of the deformable wall 56 of the reservoir 6.

The holding surface 33 is flat and is a rigid part of the deformable wall 56, that is to say more rigid than the other parts of the deformable wall 56 of the reservoir 6.

The means 31 of the deformable wall 56 comprise at least one corner edge 31 which fits into the interior pocket $2_1$. In the case of the device 1900, the deformable wall comprises two edges 31 made of corner to fit the reservoir 6 into the pocket 2, specifically to fix the reservoir 6 to the bottom wall 21, in particular to the bottom wall 21 comprising the interior pocket $2_1$.

Thus the flange 45 is arranged to, by exerting a mounting pressure (not shown) on the holding surface 53(sic) of the reservoir 6, fit and/or fix the edges 31 at the corner of the reservoir 6 in the pocket 2.

The device 1900 may be a mono-material refill, typically of the same family as the polyolefin compounds.

FIG. 20 shows an exploded view of the device 1900 not yet comprising a reservoir 6.

The exterior pocket $2_2$ comprises means for fixing the movable wall 3 to the bottom wall 21. The volumes of the exterior pocket $2_2$ and of the interior pocket $2_1$ are delimited when the movable wall 3 is fixed to the bottom wall 21.

The movable wall 3 comprises at least one pin 35, four on the device 1900, to precisely position and fix the movable wall 3 to the bottom wall 21. The bottom wall comprises at least one hole 37, four in total of FIG. 20, arranged to accommodate at least one pin 35 of the movable wall 3.

In one embodiment of a method for assembling the device 1900, the dispensing valve 28 is mounted in the dispensing head 10, in particular in the dispensing channel 20. The dispensing head 10 is then fitted into the housing 41 of the pocket 2 (in particular in the bottom wall 21 comprising a part of the interior pocket $2_1$). The movable wall 3 is then assembled to the bottom wall 21 of the pocket 2 so as to form and/or define the interior pocket $2_1$ and exterior pocket $2_2$. The movable wall 3 must be fixed to the bottom wall 21.

In the case of a method of a device 100 comprising a reservoir 6, the movable wall 3 must be fixed to the bottom wall 21. Thus, the reservoir 6 is clamped between the dispensing head 10, at the level of the flange 45, and pocket 2.

Note that along the axis of translation of the piston 5 in the housing 9, starting from the wall 3:

- the housing 9 extends beyond the channel of the interior pocket $2_1$ connecting the orifice 13 to the valve 28, and/or
- the valve 28 is not located along this axis.

Note that the pocket $2_1$ includes:

- a first part inside the pocket $2_2$, and
- a second part, forming an angle or bend in relation to the first part, and located under the pocket 22.

Referring to FIG. 21, the valve 28 may be held in the channel 10 by a rib 67.

The movable wall 3 has a technical function of spring or of return means exerting a force bringing the piston 5 towards the outside of the housing 9.

In FIG. 19, it can be seen that the piston 5 is formed at least in part by at least part of the movable wall 3.

The piston 5 is in direct contact with the wall forming the pressing surface 26. In a variant not shown for which the envelope 56 does not surround the pocket 2 but just forms a reservoir outside the pocket 2, the piston 5 is formed at least in part by at least part of the pressing surface 26.

FIGS. 23 to 25 illustrate another embodiment of a device 2300 for dispensing a fluid. Only the differences with the device 1900 will be described.

The dispensing head 10 of the device 2300 does not comprise a flange 45 but retains the same shape and the same direction of elongation.

Thus, the dispensing head 10 is arranged to be nested, that is to say held fixed, in the housing 41 of the pocket 2.

The device 2300 further comprises a cap 74 arranged to be positioned and/or fit on the dispensing head 10. When the cap 74 is fixed to the dispensing head 10, no fluid can exit through the outlet 24 of the device 2300. The cap 74 is arranged to be airtight when it is pressed against the outlet 24 for the priming phase during vacuum filling.

The cap 74 is made of plastic.

As in the device 1900, the movable wall 3 comprises the junction wall 7. There is continuity of material between the movable wall 3 and the junction wall 7.

However, the movable wall 3 is not made of the same material as the junction wall 7.

The movable wall 3 is made of PP, PE or TPO.

The junction wall 7 is made of PP, PE or TPO.

The junction wall 7 is rigid, that is to say more rigid than the movable wall 3.

The movable wall 3 and the deformable wall 56 of the reservoir 6 are similar, that is to say made of the same material. There is continuity of material between the movable wall 3 and the deformable wall 56. They are formed by a single piece comprising two zones of welding or fixing, one welding or fixing zone 431 for welding or fixing the wall 3 on the wall 21, and one welding or fixing zone 432 for welding or fixing the wall 56 to the wall $21_1$.

Indeed, the device 2300 comprises a plate 43. The plate 43 is substantially planar. The plate 43 comprises the movable wall 3, the junction wall with the piston 5 and the deformable wall 56 of the reservoir 6. The plate 43 therefore comprises parts having different stiffnesses.

The plate 43 is arranged to be positioned on the bottom wall 21 of the pocket 2.

The plate 43 is arranged to be fixed to the bottom wall 21 of the pocket 2, more precisely on an upper face $21_1$ of the bottom wall 21.

The upper face $21_1$ of the bottom wall 21 is substantially planar.

The plate 43 is fitted and/or welded to the bottom wall 21 of the pocket 2.

The volume of the reservoir 6 is between the bottom wall 21 of the pocket 2 and the deformable envelope 56.

The deformable envelope 56 of the reservoir 6 comprises successive radial corrugations $56_2$ around an axis B.

The axis B is perpendicular to the plane 47 of the wall 43 and/or 56.

The deformable envelope 56 is substantially contained in a plane 47 around which the corrugations $56_2$ oscillate, the axis B being substantially perpendicular to this plane 47. The plane 47 is substantially parallel to the upper face $21_1$ of the bottom wall 21.

The axis B is substantially perpendicular to the direction of elongation of the dispensing head 10.

The corrugations $56_2$ have an amplitude of oscillation, preferably constant.

The amplitude of oscillation of the corrugations $56_2$ is between the plane 47 and the upper face $21_1$ of the bottom wall 21 on which the plate 43 is fixed.

In one embodiment of a method for assembling the device 2300, the dispensing valve 28 is mounted in the dispensing head 10. The dispensing head 10 is then fitted into the housing 41 of the pocket 2 (in particular in the bottom wall 21 comprising a part of the interior pocket $2_1$). If the device 2300 is not used, the cap 74 is positioned on one face of the dispensing head 10 comprising the outlet 24. The plate 43 is then assembled with the bottom wall 21 on its upper face $21_1$.

The plate 43 must be fixed to the bottom wall 21.

The method for assembling the device 2300 is carried out under vacuum and comprises vacuum welding.

The vacuum assembly process comprises the following successive steps:

- positioning at least part of the reservoir 6, at least part of the pocket 2, on which the dispensing valve 28, the dispensing head 10 and the cap 74 are assembled,
- filling the future interior volume of the reservoir 6 (and preferably the future interior volume of the pocket 2) with the fluid to be dispensed,
- closing the reservoir 6 (with the wall 56) and the pocket (with the wall 3),
- placing the device according to the invention in a cavity 61,
- emptying the air in the cavity 61 to reach a pressure less than 1 bar,
- making the plate 43 approach towards the upper face $21_1$ of the bottom wall 21 of pocket 2, preferably by reducing the volume of the cavity 61 (preferably obtained by compressing a bellows 63) and
- welding (preferably not ultrasonic welding means 51, 53), under vacuum, the plate 43 to the upper face $21_1$ of the bottom wall 21 of the pocket 2, while continuing the approach of the plate 43 towards the upper face $21_1$ of the bottom wall 21 preferably by reducing the volume of the cavity 61 (preferably obtained by compressing a bellows 63 typically from 0.3 to 0.6 mm).

The vacuum assembly process then comprises an over-pressure of the cavity 61 comprising the assembled device 2300 greater than 1 bar.

The vacuum assembly process of the device 2300 is accomplished by a vacuum assembly device 2500, shown in FIG. 25.

The vacuum assembly device 2500 comprises a sonotrone 51 and a booster 53.

The movable wall 3 has a technical function of spring or return means exerting a force bringing the piston 5 towards the outside of the housing 9.

Note that the piston 5 is formed at least in part by at least part of the movable wall 3.

Note that the piston 5 is formed at least in part by at least part of the pressing surface.

Alternatively, the device 2300 is placed in a case such as a refill. In this variant, the wall 3 is placed in contact with a button or a wall of the case forming the pressing surface 26. This button is guided by guide means of the device so as to press on the movable surface 3 while being guided in a translational movement parallel to the direction of elongation of the piston 5.

FIGS. 26 to 27 illustrate a seventh embodiment of a device 3000 for dispensing a fluid. Only the differences with the device of FIG. 17 will be described.

The device 3000 for distributing the fluid comprises:

- the pocket 2 comprising an interior pocket $2_1$ and an exterior pocket $2_2$, said interior pocket $2_1$ being located at least partly in the exterior pocket $2_2$, the interior pocket $2_1$ having an interior volume arranged to contain the fluid, the exterior pocket $2_2$ having an interior volume arranged not to contain the fluid, said interior volume of the exterior pocket $2_2$ being delimited at least in part by a movable wall 3 (which is preferably a wall integral with a cap 305 with continuity of material, more precisely a thin wall (at least 2 times thinner than the wall thickness of the head 10)), said movable wall 3 being arranged to, under the exertion of a pressing pressure 18, reduce the interior volume of the interior pocket $2_1$ (and the interior volume of the exterior pocket $2_2$) by deforming and/or moving,
- an outlet 24 arranged to dispense the fluid.

The interior volume of the interior pocket $2_1$ is delimited at least in part by:

- a piston 5 integral with a junction wall 7 delimiting at least in part the interior volume of the exterior pocket 22,
- a housing 9 of the piston 5 arranged to accommodate the piston 5 and guide it during an axial movement 11 of said piston 5 in the housing.

The interior volume of the interior pocket $2_1$ is the interior volume of the housing 9.

The device 3000 is arranged to guide the fluid according to a circuit comprising a route, passing directly from the reservoir 6 and/or from a head cavity 306 to the interior of the interior pocket $2_1$, without passing through the interior of the exterior pocket $2_2$, (the connecting orifice 13 connecting the interior volume of the exterior pocket $2_2$ to the inside of the interior pocket $2_1$ and/or of the piston 5 not being present in this embodiment).

The head cavity 306 is a volume in the head 10 preferably comprising the product and is oriented towards the reservoir 6.

The head cavity 306 is arranged so as not to undergo compression of the fluid.

The head cavity 306 is located outside the pocket $2_1$.

In the case of FIG. 26, the head cavity 306 corresponds to the interior volume of the piston 5.

The volume of the head cavity 306 is delimited by a flat surface which passes at the level of the wall 7.

The device 3000 also comprises a feed orifice 8 connecting the interior volume of the piston 5 and/or the reservoir 6 to the interior volume of the interior pocket $2_1$ and located at one end of the piston 5 which enters the housing 9.

The interior volume of the piston 5 is part of the reservoir 6.

With reference to FIGS. 26 and 27, the expression "volume of the pocket 2" means the interior volume of the interior pocket $2_1$ without the interior volume of the exterior pocket $2_2$.

The device 3000 is arranged to operate in all the positions of the head 10, in particular the head upward or downward with respect to the terrestrial gravitational force, and comprises means for returning the piston 5 or the housing 9 (as opposed to devices/cartridges of upside down dispensers, the return means are external to the cartridges) remove the passage.

The device 3000 further comprises braking means 15 arranged to block the axial movement 11 of the piston 5 in the housing 9 when the movable wall 3 is subjected to a pressing pressure 18 (previously called external force 18), less than a force threshold.

The braking means 15 typically comprise:

- a lug or tab located on the exterior of the piston 5 and/or the interior of the housing 9, this lug or tab being arranged to rub or be blocked by a surface respectively of the exterior(sic) of the housing 9 and/or of the interior(sic) of the piston 5, and/or
- a lug or tab located on the exterior of the housing 9 and/or the interior of a wall 303 disposed around the housing 9, this lug or tab being arranged to rub or be blocked by a surface respectively of the interior of the wall 303 and/or of the exterior of the housing 9. These embodiments are preferred because they act on the face opposite to the sealing face between the piston 5 and the housing 9 so as not to damage this sealing.

The piston 5 and the housing 9 are therefore arranged to allow three phases of movement of the piston 5 in the housing 9 during an exercise of the force 18 (we speak of a relative movement of the piston 5 with respect to the housing; in practice in FIG. 26 the housing moves (with the head 10) around the piston 5 while the piston 5 is stationary):

1) a blocking phase for which the piston 5 does not move beyond the means 15 as long as the force 18 is less than the threshold force, then a crossing of the means 15 as soon as the force 18 is greater than this threshold force;

2) a free movement of the piston 5 in the housing 9 once the piston 5 has passed the means 15, typically according to a translation of the piston 5 of at least 0.5 mm or even 1 mm in its housing 9, making it possible to give an impulse or acceleration to the threshold force (kinetic energy) and 3) a compression phase, comprising an increase in the pressure in the pocket $2_1$.

The cavity 306 always remains stationary.

The most important are phases 1 and 3, phase 2 is optional.

In certain configurations, phase 1 may be recovered by the frictional forces of the piston in the housing (dynamic frictional force less than static frictions).

The axial movement 11 of the piston 5 is along the central axis of the piston 5.

The device 3000 comprises a pressing surface 26, also called a contact surface 26, arranged to, under the exertion of the pressing pressure 18 and through the dispensing head 10, reduce the interior volume of the interior pocket $2_1$ (and exterior pocket $2_2$) by deforming and moving the movable wall 3.

The dispensing head 10 is arranged to move in the direction of the reservoir 6 so that when it moves towards or approaches the reservoir 6 in a direction of movement, the fluid exits the head 10 laterally, that is to say that it exits through the outlet 24 in an outlet direction perpendicular or oblique with respect to this direction of movement.

The movable wall 3 has a technical function of spring or of return means exerting a force returning the piston 5 towards the outside of the housing 9. The head 10 comprises return means of the piston or housing without a metal spring, preferably made of polyolefin more precisely polypropylene (PP) (single material or same family). In another embodiment, not shown, in order to increase the return force of the movable wall 3, the pocket 2 may comprise a spring or an elastic part, preferably around the piston 5 and/or the housing 9.

The pressing surface 26 is integral with the dispensing head 10, and preferably comprises at least part of the dispensing head 10.

Note that, in planes perpendicular to the direction of the axial movement 11 of the piston 5 relative to the housing 9, the interior pocket $2_1$ has a section smaller than the section of the exterior pocket $2_2$ and/or than the area of the pressing surface 26 arranged to receive the pressing pressure 18 from the outside of the device and/or than a section of the reservoir 6. A reduction in the section of the interior pocket $2_1$ has the advantage of increasing the pressure of the fluid, which is particularly advantageous in the case of a spray; in the present embodiment, there is preferably a reduction of at least 2 times the section or surface of the pocket $2_1$ relative to the pocket $2_2$ and/or the surface 26 and/or the reservoir 6.

The device 3000 comprises the outlet 24.

The outlet 24 opens onto the outside of the device 3000.

The outlet 24 is located on the dispensing head 10.

The outlet 24 is arranged to dispense fluid in a direction substantially perpendicular to a direction 11 of movement of the dispensing head 10.

The dispensing head 10 is arranged to follow a translational movement.

The outlet 24 is arranged to dispense fluid in a direction substantially parallel to an axis of elongation of the dispensing channel 20 (lateral outlet to the head 10).

The interior pocket $2_1$ is located under an exterior surface of the device less than 10 mm, preferably less than 5 mm, from this exterior surface.

There is no intermediate rod between the pressing surface and the pocket $2_1$ making it possible to modify its volume (as for all the embodiments of FIGS. 17 to 27, moreover).

The exercise of a pressing pressure 18 allows a lateral exit of the product through the outlet and a displacement of the movable wall 3 towards the reservoir 6 or next to the reservoir 6.

The device 3000 comprises a dispensing orifice 22 connecting the pocket $2_1$ to the dispensing channel 20.

The dispensing valve 28 is inside the dispensing channel 20 of the device 3000.

The dispensing channel 20 of the device 3000 comprises an interior volume arranged to comprise (or accommodate) the dispensing valve 28. Thus only the dispensing valve 28 is comprised in the dispensing channel 20.

The device 3000 comprises the dispensing valve 28 located in the dispensing channel 20, and which, in an open state, allows a passage of fluid from the inside of the interior pocket $2_1$ to the outlet 24, passing through the dispensing orifice 22 and the dispensing channel 20 (in particular through the housing 80), and, in a closed state, does not allow a passage of fluid from the inside of the interior pocket $2_1$ to the outlet 24, passing through the dispensing orifice 22 and the dispensing channel 20 (precisely through the housing 80). The valve 28 is not in the axis of the device.

The dispensing head 10 comprises a spray comprising a mixer 25 as previously described.

The dispensing head 10 is located on around and outside the pocket $2_1$.

The dispensing head 10 is arranged to, by exerting a pressure 18 on the pressing surface 26, move at least according to the translational movement. The translational movement of the dispensing head 10 is in the same direction and the same sense as the axial movement 11 of the housing 9 around the piston 5.

Part of the dispensing head 10 is arranged, under the exertion of the pressing pressure 18, to slide at least in part along an exterior wall 302 of the junction wall 7 or of the bottom wall 21 more precisely of the exterior pocket $2_2$ so as to move and/or deform the movable wall 3 of the exterior pocket 22.

The pressing surface 26 is arranged to, under the exertion of a pressure, reduce the interior volume of the interior pocket $2_1$ (and exterior pocket $2_2$) by deforming the movable wall 3, more exactly by crushing it in the direction of the junction wall 7 to the reservoir 6.

The deformable movable wall 3 has a shape memory. When this wall 3 is not subjected to any exterior stress, it resumes or remains in its form illustrated in FIG. 26, which maximizes the volume of the interior pocket $2_1$ and exterior pocket $2_2$.

The pressing surface 26, accessible from the outside of the device 3000 by a hand of a user, has a minimum surface of 10 $mm^2$.

The housing 9 of the piston 5 is delimited at least in part by the bottom wall 21. A part of the bottom wall 21, that is to say the part of the bottom wall 21 in contact with the dispensing channel 20, is integral with the housing 9 of the piston 5.

The bottom wall 21 at least partially delimits the volume of the interior pocket $2_1$ but not the exterior pocket 22.

The junction wall 7 may or may not at least partially delimit the piston 5.

The bottom wall 21 at least partially delimits the housing 9 of the piston 5.

In the particular case of the device 3000 illustrated in FIG. 26, the braking means 15 of the piston 5 preferably comprise at least one tab 303 of the wall 7 directed towards the walls of the housing 9, preferably the external edge of the walls forming the housing 9. However, the tab can be in the cap 305 on wall 7 or 21. The tab is oriented substantially in the axis of the piston and opposes the relative movement of the piston 5 in the housing 9, it may be deformed transversely.

In the device 3000, the movable wall 3 is separated from the junction wall 7. The junction wall 7 is arranged to delimit the interior volume of the pocket $2_2$ and the interior volume of the envelope of the reservoir 6.

The junction wall 7 comprises a substantially planar shape. In the case of the device 3000, the junction wall 7 is rigid, that is to say more rigid than the deformable wall 3 of the pocket 2.

The movable wall 3 is located between the bottom wall 21 and the junction wall 7.

The junction wall 7 has the same rigidity as the bottom wall 21.

The junction wall 7 is fixed to the movable wall 3.

The movable wall 3 is fixed to the bottom wall 21.

The deformable wall 3 is flexible.

The movable wall 3 is typically made of PP thinner than the rest.

The piston 5 is fixed to the junction wall 7 by welding and/or molding, by interlocking or preferably are one and the same part.

The piston 5 is integral with the flat part of the junction wall 7.

The junction wall 7 is made of PP.

The piston 5 is made of the same material as the junction wall 7. On the device 3000, the piston 5 and the junction wall 7 form a single piece.

Thus the piston 5 is therefore positioned between the flat part of the junction wall 7 and the housing 9 for the piston 5.

The housing 9 for the piston 5 is positioned between the piston 5 and the dispensing channel 20. This channel 20 is optional in particular if a flat or sufficiently small dispensing valve is used, for example of the "stud" type.

The piston 5 is hollow and cylindrical.

The exterior diameter of the piston 5 comprises an increase in its diameter at the end of the piston 5 facing the housing 9 of the piston 5. This arrangement makes it possible to have a sealed linear annular contact during the compression phases, that is to say when the dispensing head 10 is driven by the translational movement reducing the volume of the pocket 2. This makes it possible, among other things, to increase the sealing performance of the device 3000. A low rotational movement (for example of the ball joint type) and optionally complementary to this translational movement.

The device 3000 further comprises the feed orifice 8 connecting the interior of the piston 5 and/or the reservoir 6 to the interior volume of the interior pocket $2_1$ without passing through the exterior pocket 22.

The device 3000 comprises the reservoir 6. The reservoir 6 does not communicate with the exterior pocket $2_2$ through the feed orifice 8 or through any other orifice. The reservoir 6 comprises an interior volume arranged to contain the fluid.

The device 3000 is arranged to guide the fluid along the route described above:

- passing directly from the reservoir 6 and/or from the head cavity 306 inside the interior pocket $2_1$, without passing through the inside of the exterior pocket $2_2$, at each increase in the volume of the interior pocket $2_1$ i.e. at each raising of the head 10 i.e. each time the piston exits to the outside of the housing 9, then
- passing the inside of the interior pocket $2_1$ towards the orifice 22 then the channel 20 then the outlet 24, at each pressing pressure 18 on the movable wall 3 greater than the threshold force, and/or, at each decrease in the interior volume of the interior pocket $2_1$ (and of the exterior pocket $2_2$) i.e. each movement of the piston 5 towards the inside of the housing 9. The movement of the piston 5 in the housing 9 causes compression of the product present in the volume of the pocket 21.

A feed valve 38 is located in the orifice 8.

The valve 38 typically comprises a membrane pressed against the piston 5 on the side of the housing 9. The valve 38 is not mechanically linked to the head 10. The valve is mounted laterally, not in the axis of the head.

The valve 38, in an open state (this open state being achieved in particular during an increase in the interior volume of the pocket $2_1$), allows the passage of the fluid contained in the reservoir 6 and/or the interior of the piston towards the pocket $2_1$, and, in a closed state (this closed state being achieved in particular when the interior volume of the pocket $2_1$ is reduced), does not allow it.

The feed valve 38 closes after a (sufficient) pressure on the movable wall 3, it thus forms the feed valve of the interior pocket 21.

The valve 38 is arranged to:

close during a movement of the piston 5 reducing the interior volume of the pocket $2_1$, open during a movement of the piston 5 increasing the interior volume of the pocket $2_1$.

The device 3000 further comprises a ring 74 arranged to be positioned and/or fit onto the dispensing head 10.

The wall 7 comprises, or is integral with, means 304 (comprising the wall 302) arranged to guide the movement of the head 10 and located inside the head 10. This makes it possible to reduce the height of the device 3000.

As illustrated in FIG. 27, the flexible reservoir is clipped with a rigid ring integral or not of the reservoir. An edge of the wall 7 makes it possible to fit the ring 74.

Pocket 2 is located:

directly under a pressing surface 26 arranged to receive the pressing pressure 18 from outside the device, or directly under an assembly consisting of a pressing surface 26 arranged to receive the pressing pressure 18 from outside the device and a channel comprising a valve.

In this embodiment, the device according to the invention comprises return means 307, non-metallic, arranged to bring up and/or out the piston 5 from its housing 9.

The area S2 of an internal section of the housing 9 is divided at least by two with respect to the area S1 of a pressing surface 26 arranged to receive the pressing pressure 18 from the outside of the device.

For a spray, between 50 and 100 microliter is expelled.

The interior volume (V1) of the piston 5 is greater than 40 microliters.

The sum of the interior volume (V1) of the piston 5 and the interior volume (V2) of the housing 9 is greater than 80 microliters.

A crimping ring 180 makes it possible to crimp the reservoir on the bottom wall.

Note that this embodiment comprises the cavity 306.

This cavity 306 corresponds to the interior volume of the piston 5.

This cavity 306 is not closed but the fluid contained in the reservoir 6 can flow from the reservoir 6 to the cavity 306, and/or from the cavity 306 to the outlet 24.

However, it is noted that the majority (more than 50%) or even preferably the totality of the volume of the cavity 306 is not a dead volume, that is to say that the fluid flowing from the reservoir 6 to the outlet 24 disturbs and creates necessarily a movement of the fluid in the cavity 306.

It is further noted that the interior volume of the cavity 306 is greater than the maximum volume of fluid exiting through the outlet 24 when the piston 5 enters its housing 11(sic).

The movable wall 3 has a technical function of spring or return means exerting a force bringing the piston 5 towards the outside of the housing 9.

In FIG. 26, it can be seen that the housing 9 is formed at least in part by at least part of the movable wall 3.

The housing 9 is in direct contact with the wall forming the pressing surface 26.

The housing 9 is formed in the same part as the pressing surface 26 and/or the housing 9 is formed at least in part by at least part of the pressing surface 26.

Preferably, the housing 80 is formed in two stages:

firstly, the channel 20 is formed by molding, leaving an opening for the mold spindle used for this molding, this opening being typically located in the extension of the channel 20 opposite the outlet 24, then secondly, at least part of this opening is closed (by injection of flexible or rigid material), the valve 28 preferably being inserted into the housing 80 through this opening.

FIGS. 28 to 29 illustrate an eighth embodiment of a device 4000 for dispensing a fluid. Only the differences with the device 3000 of FIG. 27 will be described.

The device 4000 for dispensing a fluid comprises:

an outlet 24, a pocket 2 having an interior volume for containing a fluid, the interior volume being delimited at least in part by a movable wall 4, a reservoir 6 arranged to contain the fluid, a pocket cap 40.

The pocket cap 40 comprises a feed valve 38 which in an open state allows a passage of fluid from the reservoir 6 to the interior volume of the pocket 2 and in a closed state does not allow, and/or a dispensing valve 28 which in an open state allows a passage of fluid from the interior volume of the pocket 2 to the outlet 24 and in a closed state does not allow. The device 4000 comprises the feed valve 38 and the dispensing valve 28.

The feed valve 38 of the device 4000 allows, in an open state, a passage of fluid from the reservoir 6 to the interior volume of the pocket 2 and in a closed state does not allow. The feed valve 38 is located in the pocket cap 40 so as, in its open state, to open the feed orifice 8 and, in its closed state, to close the feed orifice 8.

In the case shown, the pocket cap 40 comprises the feed valve 38 and the dispensing valve 28.

The feed valve 38 and the feed(sic) valve 28 are integral and in one piece. The part dispensing(sic) valve 38 is positioned on the feed orifice 8 and the part dispensing valve 28 blocks the passage of fluid towards the outlet 24 in a dispensing channel 20 positioned in the pocket cap 40.

The dispensing valve 38(sic) and the feed valve 28(sic) are positioned in a housing 130 located in the pocket cap 40.

The housing 130 of the pocket cap 40 is arranged to accommodate the feed valve 38 and the dispensing valve 28. The housing 130 is connected to the dispensing channel 20.

The device 4000 also comprises:

a cavity 122, a reservoir orifice 124 forming a junction between the reservoir 6 and the cavity 122.

The pocket cap 40 is arranged to be mounted by insertion into the cavity 122 of the device 4000 so as to be mounted by extending:

from the reservoir 6 to the outlet 24, passing through the pocket 2 at least partially while passing through the movable wall 4, or going along the pocket 2 at least partially (in the particular case of FIG. 28 or 29, it is noted that the pocket cap 40 is arranged to be mounted by insertion into the cavity 122 of the device 4000 so as to be mounted by extending along the pocket 2 over its entire length).

In the case of the device 4000, the pocket cap 40 is mounted by extending along the pocket 2 at least partially.

The device 4000 comprises an inlet orifice 120 arranged to insert the pocket cap 40 into the device from the outside of the device 4000 and opening into the cavity 122.

The interior volume of the pocket 2 comprises at least a part (i.e. is partially or totally) outside the cavity 122.

The cavity 122 is entirely outside the reservoir 6.

The pocket cap 40 comprises an interior volume, called head reservoir 126, arranged to lead on one side to the reservoir orifice 124 and on the other side to a feed orifice 8 connecting the head reservoir 126 to the interior volume of the pocket 2.

The cavity 122 comprises an interior volume distinct from the interior volume of the pocket 2.

The head reservoir 126 is located in the cavity 122. The head reservoir 126 comprises a circular shaped end facing the side of the reservoir 6.

The movable wall 4 is fixed to at least one outer wall of the cavity 122 (and delimiting the cavity). Thus, part of the interior volume of the pocket 2, with the exception of the interior volume delimited by the deformable wall 4, is located in the cavity 122.

The interior volume of the head reservoir 126 is at least 1 $cm^3$, or even at least 3 $cm^3$ or even at least 5 $cm^3$ and/or comprises air or fluid to be dispensed.

The pocket cap 40 is mounted in the cavity 122 so that a wall of the pocket cap, inserted into the reservoir orifice 124 and delimiting at least in part the head reservoir 126, forms, at the end of screwing, a first sealed junction 148 between the interior volume of the pocket 2 and the reservoir 6.

The first sealed junction 148 is arranged so that at the end of screwing, the first sealed junction 148 is sealed. The same goes for all other junctions inside the device. The seal 149A comprises a flexible material in axial compression. The seal 149B is a skirt having a larger radial component than the axial component.

The first sealed junction 148 is in the form of a collar and is positioned on a wall delimiting at least part of the reservoir 6. The first sealed junction 148 is in particular placed on a part of the reservoir 6.

The sealing of the first sealed junction 148 is produced by radial pressure (i.e. having a larger component radially than in other directions) in particular by fitting together and/or screwing one end of the head cap 126(sic) into one end of the reservoir 6 in the form of a collar 148.

When the pocket cap 40 is mounted in the cavity 122, the head reservoir 126 does not extend over the entire volume of the cavity 122.

To fill the device, the pocket cap is removed, the reservoir and then at least part of the cavity 122 and/or the pocket 2 are filled with the product to be dispensed, then one end of the cap 40 is inserted into the cavity 122, the product will then come back up in the cap 40 and/or in the pocket 2, the air escapes through the orifice 120. The air trapped in the head reservoir can exit through the vent 146. The cap is tightly screwed using sealing elements 149A and/or 149B.

The pocket cap 40 includes a vent 146.

The vent 146 is typically a hole which allows to evacuate the air contained in the cavity 122 and/or the reservoir 6 when the pocket cap 40 is inserted in the cavity 122. The vent 146 makes it possible to avoid the air overpressure effect and avoid keeping air in the device.

Thus, during the insertion of the pocket cap 40 into the cavity 122, the air contained in the cavity 122 escapes through the vent 146. At the end of the screwing of the cap 40, the vent 146 is blocked by an internal wall of the cavity 122.

The head cap 40 comprises a second part 128, separate from the head reservoir 126 and arranged to conduct the fluid from the interior volume of the pocket 2 towards the outlet 24.

A dispensing channel 20 is positioned in the second part 128. The dispensing channel is comprised in the housing 130 of the pocket cap 40.

The second part 128 also comprises the dispensing valve 28, positioned in the dispensing channel 20, which in an open state allows passage of fluid from the interior volume of the pocket 2 to the outlet 24 and in a closed state does not allow.

The outlet 24 is positioned at the second part 128 of the pocket cap 40 and more precisely on an outer wall of the second part 128.

Thus, the device 4000 is arranged to guide the fluid along a circuit comprising:

- a first route 141, passing from the reservoir 6 to the head reservoir 126 through the reservoir orifice 124, then
- a second route 142 passing from the head reservoir 126 to the interior volume of the pocket 2 via the feed orifice 8, then
- a third route 143 connecting the interior volume of the pocket 2 to the outlet 24 via the second part 128 of the pocket cap 40.

The device 4000 is arranged to guide the fluid along the first and second route, after each end of pressing pressure 18 on the movable wall 4 of the pocket and/or on each increase in the interior volume of the pocket 2.

The device 4000 is arranged to guide the fluid along the third route, at each pressing pressure 18 on the movable wall of the pocket 2 and/or on each decrease in the interior volume of the pocket 2, said feed orifice 8 being closed by the feed valve 38.

The pressing pressure is typically that provided by a user pressing with one of his hand fingers (typically on the wall 4), possibly by means of a lever or button.

The feed valve 38 opens with each pressing pressure on the movable wall 4.

The opening of the feed valve 38 thus allows the passage of the fluid along the second route.

The dispensing valve 28 opens after each pressing pressure, for example when a user removes his finger from the movable wall 4.

The opening of the dispensing valve 28 thus allows the passage of the fluid along the third route.

The pocket cap 40 comprises fixing means 132 arranged to fix the pocket cap 40 to walls delimiting the cavity 122 by screwing.

The fixing means 132 comprise an anti-unlocking system 132 of the pocket cap 40 to the cavity 122 arranged to prevent loosening of the pocket cap 40. The anti-unlocking system 132 is for example a system 132 of inclined teeth which allows a rotation of the cap in one direction to screw it but which does not allow it in the other direction to unscrew it.

The inclined teeth are arranged around the entire perimeter of the circular end of the reservoir head 126 facing the reservoir 6. In a variant (not shown) of the device 4000, teeth are inserted into recesses during tightening and which, after tightening, are blocked in the recesses, which thus prevents the loosening of the head reservoir 126 in the cavity 122.

The reservoir 6, the cavity 122 and the pocket 2, with the exception of the movable wall 4 of the pocket 2, are integral so as to form a single piece.

The movable wall 4 of the pocket 2 is assembled by welding to the single part formed by the cavity 122 and the reservoir 6.

The movable wall 4 of the pocket is flexible, that is to say less rigid than the rest of the pocket 2.

The movable wall 4 is typically made of PP, PE or TPO and thinner than the thickness of the cavity 122 or of the reservoir 6.

The movable wall 4 of the pocket 2 is of convex shape, that is to say it comprises a curvature. For example, the pocket is of concave shape (in the direction from the cavity

122 towards the pocket 2). In a variant not shown, the pocket 2, in particular the movable wall 4, may be of different shape, for example elliptical, rectangular, square, spherical, etc.

The reservoir 6 and the cavity 122 form a single piece.

The reservoir 6 and the cavity 122 are produced by polymer injection and/or PP, PE or TPO blowing. The reservoir 6 is a cylindrical chamber provided with a piston, this piston is preferably made of the same material as the walls of the reservoir, preferably made of polyolefin, preferably it comprises a single annular band arranged to be compressed against the internal walls of the reservoir.

The reservoir 6 extends in a longitudinal direction centered on a first axis of elongation A.

The pocket 2 extends in a longitudinal direction centered on a second axis of elongation, and/or the pocket cap 40, preferably the head reservoir 126, may extend in a longitudinal direction centered on a third axis of elongation C.

The first axis of elongation A is offset relative to the second axis and/or to the third axis C. In this way, the reservoir 6 and the pocket cap 40, in particular the head reservoir 126, are not centered on the same axis, they are off-center.

The first axis of elongation A and/or the second axis of elongation and/or the third axis of elongation C are mutually parallel.

The pocket cap 40 extends in an elongation direction 136, coincident with the longitudinal direction of the pocket cap 40. The pocket cap 40 is arranged to be mounted by insertion into the cavity 122 in an insertion direction parallel to its elongation direction 136, the inlet orifice 120 and the reservoir orifice 124 being aligned in the elongation direction 136.

The plane of the inlet orifice 120 and the plane of the reservoir orifice 124 are mutually parallel and orthogonal to the elongation direction 136 of the pocket cap 40.

The pocket cap 40 is inserted into the cavity 122 through the inlet opening 120. The pocket cap 40 is then screwed to the reservoir 6 via the anti-unlocking system 132.

Note that, in a variant of the device 4000 for which the feed valve is not carried by the cap 40 but directly connects the reservoir 6 to the pocket 2, then the device 4000 is arranged to guide the fluid according to a circuit:

- not including the first route 141, passing from the reservoir 6 to the head reservoir 126 through the reservoir orifice 124, then if the valve is on the bottom wall there is no first route, not going through the head reservoir
- not including the second route 142 passing from the head reservoir 126 to the interior volume of the pocket 2 via the feed orifice 8, then
- comprises only a route passing from the reservoir 6 to the pocket 2 then the route 143 connecting the interior volume of the pocket 2 to the outlet 24 via the part 128 of the pocket cap 40.

FIG. 30 illustrates a ninth embodiment of a device 5000 for dispensing fluid. Only the differences with the device 4000 of FIGS. 28-29 will be described.

More specifically, FIG. 30 illustrates a variant of the device 4000 illustrated in FIGS. 28-29.

In the device 5000, the reservoir 6, the cavity 122 and the pocket 2 are integral so as to form a single piece.

The reservoir 6, the cavity 122 and the pocket 2 are made by injection of PP, PE or TPO polymer or by 3D printing (for 3D printing, the rigid part may be made of rigid TPU and the flexible (deformable) part may be made of soft TPU).

In the case of the device 5000, the pocket cap 40 also comprises the head reservoir 126 inserted into the cavity 122.

In the device 5000, when the pocket cap 40 is mounted in the cavity 122, the head reservoir 126 extends over the entire length of the cavity 122 arranged to accommodate the head reservoir 126.

The pocket cap 40 also comprises the vent 146 arranged to evacuate the air contained in the cavity 122 when the pocket cap 40 is being inserted into said cavity 122.

The cavity 122 is separate from the interior volume of the pocket 2.

When the pocket cap 40 is inserted into the cavity, the device 5000 comprises the first sealed junction 148 formed between the volume of the pocket 2 and the reservoir 6 when the pocket cap 40 is fixed in the cavity 122.

The first sealed junction 148 is formed when the walls of the cavity 122 exert a transverse or radial force at the level of the walls of the head reservoir 126 positioned near the reservoir 6 and inserted into the cavity 122.

However, this sealed junction 148 is not essential, since there could be a slight play at the level of the element 124 and a slight relief on the element 150.

The pocket cap 40 is mounted in the cavity 122 so that a wall of the pocket cap 40, inserted in the reservoir opening 124 and at least partially delimiting the head reservoir 126, forms, at the end of screwing, a second sealed junction 150 between the interior volume of the pocket 2 and the head reservoir 126.

The second sealed junction 150 is arranged so that at the end of screwing, the second sealed junction 150 is sealed against the product at least 50% tight.

In the device 5000, the vent 146 is arranged to expel the air contained in the cavity 122 or the head reservoir 126 out of the device 5000 when the pocket cap 40 is being mounted or arranged in the cavity 122.

In a variant (not shown) of the device 6000(sic), the reservoir 6 may comprise at least one flexible wall arranged to be inserted into the head reservoir 126 as the reservoir 6 is emptied of its fluid according to the same principle of the device 700 illustrated in FIGS. 10, 11 and 12.

There is a seal between the cap 40 and the bottom wall 21.

FIGS. 31 and 32 illustrate a tenth embodiment of a device 6000 for dispensing a fluid. Only the differences with the device 4000 of FIGS. 28-29 will be described.

In the device 6000, the reservoir 6, the cavity 122 and the pocket 2 are integral so as to form a single piece.

The reservoir 6, the cavity 122 and the pocket 2 are produced by 3D printing.

The cavity 122 is provided with deformable walls forming the parts 611, 662 and 663 of the reservoir 6 and arranged to laterally increase the capacity of the reservoir 6.

In the device 6000, the reservoir 6 is divided into several parts 661, 662, 663. This embodiment therefore comprises several feed orifices 124 (one per part of the reservoir 6) connecting the reservoir 6 to the cavity 122.

The device 6000 comprises two pockets 211 and 212, diametrically opposed to each other on an external wall of the cavity 122 (or of the reservoir 6).

For this reason, the device 6000 comprises two feed orifices 8 each connecting the reservoir 6 or the cavity 122 inside the pocket 2.

The deformable walls of the parts 661, 662 and 663 of the reservoir 6 are distinct from the pockets 211 and 212. The deformable walls 662, 663 are at least partly positioned between the pockets 211 and 211(sic).

The two pockets 211 and 212 are identical but in a variant of the device 6000 (not illustrated), these two pockets 211, 212 may be of different shape and therefore of different interior volumes. It is also conceivable that the reservoir 6 is arranged to contain two distinct fluids and that the pockets 211 and 212 are arranged to each accommodate a particular fluid.

The pocket cap 40 comprises two feed valves 38 which, each in an open state allows a passage of fluid from the reservoir 6 and/or from the cavity 122 to the interior volume of the pocket respectively 211 or 212 and in a state closed does not allow.

The device 6000 also comprises the dispensing valve 28, separate from the two feed valves 38, which in an open state allows a passage of fluid from the interior volume of the pocket 2 to the outlet 24 and in a closed state does not.

The fluid therefore passes from the reservoir 126 and/or from the cavity 122 to a pocket 2 (211 or 212) and from this pocket 2 to the channel 20 of the pocket cap 40 before reaching the dispensing valve 28. The dispensing valve 28 is positioned in the dispensing channel 20.

The first axis of elongation A is not offset with respect to the third axis C. In this way, the reservoir 6 and the pocket cap 40 are centered on the same axis, they are coaxial.

The first axis of elongation A and/or the second axis of elongation and/or the third axis of elongation C are mutually parallel.

In the particular case of FIG. 32, it will be noted that the pocket cap 40 is arranged to be mounted by insertion in the cavity 122 of the device 4000 so as to be mounted by extending only partially along the pocket 2.

FIG. 33 illustrates an eleventh embodiment of a device 7000 for dispensing a fluid. Only the differences with the device 6000 of FIGS. 31-32 will be described.

The pocket cap 40 of the device 7000, the dispensing channel 20, the feed valve 38, and the distribution valve 28.

The interior volume of the pocket 2 is entirely included in the cavity 122.

The cavity 122 is entirely outside the reservoir 6.

In particular, the pocket 2 and the movable wall 4 of the pocket are positioned in the interior volume of the cavity 122.

In device 7000, the dispensing valve 28 is positioned in the dispensing channel 20 of the pocket cap 40.

The device 7000 is arranged to guide the fluid passing from the reservoir 6 to the interior volume of the pocket 2 via the reservoir orifice 124 and from the interior volume of the pocket 2 to the dispensing channel 20 via a dispensing orifice 8 connecting the interior volume of the pocket 2 to the dispensing channel 20.

The movable wall of the pocket 2 is of convex shape, that is to say it comprises a curvature. For example, the pocket is of concave shape on the interior side of the pocket.

The pocket cap 40 comprises a part 140, different from the head reservoir 126 of FIGS. 28-29. In fact, in the case of the device 8000(sic), the cavity 140 is not arranged to lead on one side to the reservoir orifice 124 and on the other hand to a feed orifice 8 connecting the head reservoir 126. to the interior volume of the pocket 2. The fluid to be dispensed passes directly from the reservoir 6 to the interior volume of the pocket 2 via the reservoir orifice 124 or the feed orifice 8 (these two orifices being combined).

The pocket 2 comprises a threaded collar. The part 140 of the pocket cap 40 is inserted into the skirt of the cavity thus delimiting the first sealed junction 148 between the interior volume of the pocket 2 and the reservoir 6.

The cap 40 is arranged to slide in the bottom wall at the level of the junction 148.

The first sealed junction 148 is arranged so that at the end of screwing, the first sealed junction 148 is sealed against the product.

The device 7000 comprises a pressing surface 26 positioned on the pocket cap 40, also called the contact surface 26, arranged to, under the exertion of the pressing pressure 18 and through the pocket cap 40, reduce the interior volume of the pocket 2 by deforming and moving the movable wall 4. When pressing the pressing surface 26, the head reservoir slides in the skirt (the pocket is crushed). In a preferred embodiment, the part 140 comprises a plug 145 on the side of the reservoir, in this case, the interior volume of the part 140 preferably comprises a gas such as air.

The interior volume of the part 140 extends from the reservoir 6 or from the cap 145 to the dispensing valve. The volume of the part 140 may be at least 1 $cm^3$, or even at least 3 $cm^3$ or even at least 5 $cm^3$, it may comprise a gas and/or fluid to be dispensed.

The cap 40 is arranged to slide in a ring 159 while being guided by this ring 159.

The movable wall 4 of the pocket comprises a first collar 158 arranged to be assembled (fitted or screwed or clipped) in the head cap 40, in particular at the level of the head of the pocket cap 40. The collar 158 of the cavity 122 comprises a wall thicker than the wall delimiting the movable wall 4 of the pocket 2. The upper end of the collar 158 of the pocket 2 forms the inlet opening 120.

FIG. 34 illustrates a twelfth embodiment of a device 8000 for dispensing fluid. Only the differences with the device 7000 of FIG. 33 will be described.

In the device 8000, the cavity 122 coincides with the pocket 2. Thus, the interior volume of the pocket 2 is equal to the interior volume of the cavity 122.

The device 8000 comprises a pocket housing 160 positioned at least in part in the pocket 2 in which the feed valve 38 and the dispensing valve 28 are positioned. The housing 160 of the pocket 2 is arranged to accommodate the dispensing valve 38 and the feed valve 28.

The dispensing valve 28 and the feed valve 38 form a single piece.

The device 8000 is arranged to guide the fluid passing from the reservoir 6 to the interior volume of the pocket 2, in particular in the interior volume formed by the movable wall 4 of the pocket 2, via the reservoir orifice 124 or feed orifice 8(sic) (these two orifices being merged) and from the interior volume of the pocket 2 to the dispensing channel 20 via a dispensing orifice 8.

The movable wall 4 of the pocket 2 is of convex shape, that is to say it comprises a curvature. For example the pocket 2 is of concave shape.

The pocket cap 40 has the shape of a T having an upper part 162, the head 162 of the T, and a lower part 140. The part 140 may be arranged to contain a fluid or not to contain fluid. The fluid may be air, vacuum, or fluid to be dispensed by the device 8000.

In the case of the device 8000, the pocket cap 40 is inserted into the cavity 122 (the pocket 2) by screwing. For this, the cavity 122 and more specifically the movable wall 4 of the pocket comprises a first collar 158 arranged to be assembled (fitted or screwed or clipped) in the head cap 40, in particular at the head of the pocket cap 40. The collar 158 of the cavity 122 comprises a wall that is thicker than the wall delimiting the movable wall 4 of the pocket 2. The upper end of the collar 158 of the pocket 2 forms the inlet orifice 120.

The part 140 of the pocket cap 40 is different from the head reservoir 126 of FIGS. 28-29. The part 140 is a cylinder centered on an axis R. The part 140 of the pocket cap 40 is arranged to be inserted into the cavity 122 in particular in the interior volume of the pocket 2 so that the interior volume of the movable wall 4 and the part 140 are centered on a common axis, the axis R. In this way, the interior volume of the movable wall 4 and the part 140 are coaxial.

The pocket 2 comprises a second collar. The part 140 of the pocket cap 40 is inserted into the second collar of the cavity thus delimiting the first sealed junction 148 between the interior volume of the pocket 2 and the reservoir 6.

The first sealed junction 148 is arranged so that at the end of screwing, the first sealed junction 148 is sealed against the product at least 50% tight.

FIGS. 35-40 illustrate another embodiment of a device 3500 for dispensing a fluid. FIGS. 41-46 illustrate another embodiment of a device 4100 for dispensing a fluid. For these two modes 3500, 4100, only their differences with the device 7000 of FIG. 33 will be described.

Each of the embodiments of the device 3500, 4100 for dispensing a fluid comprises:

- the outlet 24,
- the pocket 2 having an interior volume to contain a fluid, the interior volume of the pocket 2 being delimited at least in part by the movable wall 4,
- the reservoir 6 arranged to contain the fluid and comprising two openings, the upper opening 124 oriented towards the pocket 2 and a lower opening 87, said reservoir 6 being arranged to reduce its interior volume when the fluid exits the reservoir,
- the dispensing valve 28 which, in an open state allows passage of the fluid from the pocket 2 to the outlet 24, and, in a closed state, does not allow it,
- the feed valve 38 which, in an open state, allows the passage of the fluid contained in the reservoir 6 towards the pocket 2, and which, in a closed state, does not allow it.

The lower opening 87 is arranged to allow a passage of the fluid, preferably a passage of a cannula (or filling rod) transporting the fluid, so as to fill the reservoir 6 with fluid at least in part at least up to the feed valve 38 so that the fluid is in contact with the feed valve 38 and preferably so as to fill with fluid also at least partly the volume inside the pocket 2.

The feed valve is arranged to allow the rod or cannula to pass, for example by bending.

FIGS. 35-40 illustrate the embodiment of a device 3500 for dispensing a fluid. Only its differences with the device 7000 of FIG. 33 will be described.

The reservoir 6 is delimited at least in part by a movable piston 86 arranged to move so as to reduce the interior volume of the reservoir 6 when the fluid exits from the reservoir 6, this piston 86 being provided with the lower opening 87, the lower opening 87 being blocked by a removable cap 89.

The removable cap 89 is screwed onto the piston 86.

The piston 86 is comprised between the reservoir 6 and a bottom wall 91, said bottom wall 91 being provided with means 93 for blocking the piston 86 from rotating when screwing the cap 89 on the piston 86 when the piston 86 is in contact with the bottom wall 91.

Different variants of this embodiment 3500 may be combined with one another:

- in the variant illustrated in FIG. 36, the means 93 typically comprise for example a slot into which a part of the piston 86 fits, and/or
- in the variant illustrated in FIG. 37, the means 93 typically comprise, for example, clipping means, and/or
- in the variant illustrated in FIG. 39, the piston 86 is provided with at least one hole 95 arranged to allow passage of the fluid between the reservoir 6 and a sealing zone 97 comprised between the piston 86 and a wall 99 along which the piston 86 is arranged to move, and/or
- the piston may have a curved shape (disc, ellipse, or other shape) or of a polygon. In the variant illustrated in FIG. 40, the piston 86 has, in a sectional view perpendicular to a direction of movement of the piston 86 along a wall 99, a polygon shape comprising several sides connected by angles, the device further comprising a force distributing part 103 arranged to press the piston 86 against the wall 99 at several (preferably all) sides of the polygon but except for the angles of the polygon. In another variant, the distribution part 103 may be replaced by a variable thickness of the walls of the piston 86.

FIGS. 41-46 illustrate another embodiment of a device 4100 for dispensing a fluid. Only its differences with the device 3500 of FIGS. 35 to 40 will be described.

The reservoir 6 arranged to contain the fluid is delimited by:

- a flexible wall 108 comprising the two openings, the upper opening 124 facing towards the pocket 2 and the lower opening 87, and
- a rigid wall 91, preferably removable, arranged to block the lower opening 87.

The area of a section of the upper opening 124 (this section being chosen to minimize the area of the upper opening 124) is at least twice (and even at least four times) smaller than the area of a section of the lower opening 87 (this section being chosen to minimize the area of the lower opening 87).

The flexible wall 108 is arranged to deform so as to reduce the interior volume of the reservoir 6 when the fluid exits from the reservoir 6.

The device 4100, more exactly the rigid wall 91, is arranged to keep the position of the lower opening 87 in the device 4100 fixed with respect to the position of the upper opening 124 in the device 4100.

The flexible wall 108 is fixed to the pocket 2 according to a sealed junction.

The flexible wall 108 comprises a cylinder 81 above the reservoir 6 allowing sealing. In order to have a seal, either this cylinder 81 is compressed (in the case of FIGS. 42 and 44), or it is nested (in the case of FIG. 41). It is preferable to have a second cylinder concentric with the first cylinder 81.

The device 4100 comprises means 110 for internal guiding of the cap (which is the part forming the interior volume of the pocket 2 and further enclosing the dispensing valve 28). The means 110 are arranged to guide a movement of the cap. The means 110 take the form of a wall 110 emerging from the bottom wall 21.

The device 4100 comprises a useful retaining hollow 111 in particular in the case where the reservoir 6 is a changeable cartridge. This hollow 111 makes it possible, when this hollow is held by fingers or clips of an external housing, to keep the reservoir 6 fixed while the cap or head can rotate.

Different variants of this embodiment 4100 can be combined with one another:

the flexible wall 108 is fixed to the pocket 2 according to a sealed junction:

by welding, and/or by clipping (by a clip 83), and/or by interlocking, as illustrated in the variant of FIG. 41 and/or by compression of the flexible wall 108 around its upper opening 124 between on the one hand a part forming or integral with the pocket 2 and located outside the reservoir 6 and on the other hand a ring 109 (and whose edge upper forms the feed seat 62 as previously described) inserted inside the reservoir 6, as illustrated in the variants of FIGS. 42 and 44, 46. In the variant of FIG. 42, the ring 109 is integral with the rigid wall 91 and the ring 109 and the wall 91 form one and the same part with continuity of material, while in the variant of FIGS. 44 and 46, the ring 109 and the wall 91 form two distinct parts without continuity of material; and/or the flexible wall 108 and the feed valve 38 are formed in the same part with continuity of material (as illustrated in FIGS. 41 to 43) or in two separate parts without continuity of material (as illustrated in FIGS. 44 to 46).

Note that in all of the embodiments described above, the device is arranged to operate (i.e. to dispense fluid through the outlet via the feed and/or dispensing valves) with its dispensing head upwards (i.e. the outlet 24 located above the reservoir 6) or downwards (i.e. the outlet 24 located below the reservoir 6).

Of course, the invention is not limited to the examples described and numerous modifications can be made to these examples.

For example, in all of the embodiments and variants that have just been described:

the force 18 may be exerted directly by a user or by means of a button, and/or in the case of a reservoir provided with a piston, the pressure equalization hole is at least 3 $mm^2$ in size.

For example, in all of the embodiments and variants of FIGS. 17 to 27:

the device may comprise means for pre-guiding the piston 5 in its housing 9, these pre-guiding means typically comprising at least one tab 17 and/or at least one wall 65.

the wall 3 (or "spring" 3) may form part of the head 10, or may be a part independent of the head 10 such as for example a flexible cylinder arranged to compress.

In the case of FIG. 26, the piston 5 and the housing 9 may be interchanged.

In this case:

the piston 5 is integral with the head 10 and the wall 21, and/or the housing 9 is integral with the wall 7, and/or the head cavity 306 is located under the housing 9, outside the piston 5, and/or the junction wall 7 at least partially delimits the housing 9 and/or the head cavity 306, and/or the bottom wall 21 at least partially delimits the piston 5, and/or the translational movement of the dispensing head 10 is in the same direction and the same sense as the axial movement 11 of the piston 5 in the housing 9.

The invention claimed is:

1. A device for dispensing a fluid, comprising:

a pocket comprising an interior pocket, said interior pocket having an interior volume arranged to contain the fluid, a movable wall being arranged to, under the exertion of a pressing pressure on a pressing surface, reduce the interior volume of the interior pocket by deforming and/or by moving, an outlet arranged to dispense the fluid, characterized in that the interior volume of the interior pocket is delimited at least in part by:

a piston integral with a junction wall or a bottom wall, a housing of the piston arranged to accommodate the piston and guide it during an axial movement of the piston in the housing, the piston or the housing being formed at least in part by at least part of the movable wall, and/or:

the piston or the housing being in direct contact with a wall forming the pressing surface; or the piston or the housing being formed at least in part by at least part of the pressing surface;

the device further comprising:

a dispensing channel arranged to conduct the fluid from the interior pocket to the outlet; and a mixer arranged to receive different separate flows of fluid and mix them in the form of a spray at the outlet.

2. The device according to claim 1, wherein the pocket further comprises an exterior pocket , the interior pocket being located at least partly in the exterior pocket, the interior and exterior pockets each having an interior volume arranged to contain the fluid, the interior volume of the exterior pocket being delimited at least in part by the movable wall, the movable wall being arranged to, under the exertion of the pressing pressure, reduce the interior volume of the exterior pocket by deforming and/or moving.

3. The device according to claim 2, wherein the junction wall and/or the bottom wall at least partially delimits the interior volume of the exterior pocket .

4. The device according to claim 2, comprising braking means arranged to block an axial movement, of the piston in the housing, reducing the interior volume of the interior pocket and exterior pocket when the movable wall (3) is subjected to a pressing pressure, less than a threshold force.

5. The device according to claim 4, wherein:

the braking means are in contact with the piston and comprise at least one tab inclined towards the outside of the piston, and/or the braking means are in contact with the housing of the piston and comprise at least one tab inclined towards the inside of the housing.

6. The device according to claim 2, comprising a reservoir communicating with the exterior pocket through a feed orifice, said reservoir comprising an interior volume arranged to contain the fluid, said interior volume being delimited at least in part by a deformable envelope.

7. The device according to claim 2, wherein the device is arranged to guide the fluid according to a circuit comprising:

a first route, passing:

from the inside of the exterior pocket to the inside of the interior pocket via at least one connecting orifice connecting the interior volume of the exterior pocket to the inside of the inside pocket, and a second route, passing from the inside of the interior pocket to the outlet.

8. The device according to claim 7, wherein the device is arranged to guide the fluid along the second route, at each pressing pressure on the movable wall (3) greater than the threshold force and/or at each decrease in the interior volume of the interior pocket and of the exterior pocket for which the connecting orifice is closed.

9. The device according to claim 7, wherein the device is arranged to guide the fluid along the first route, after an end of each pressing pressure greater than the threshold force, and/or at each increase in the interior volume of the interior pocket and of the exterior pocket for which the connecting orifice is open.

10. The device according to claim 7, wherein the connecting orifice:

is formed at a junction between one end of the piston and one end of the housing of the piston, and/or includes a hole located in the housing of the piston.

11. The device according to claim 7, wherein the connecting orifice is arranged to:

close when the piston moves reducing the interior volume of the pocket, open when the piston moves increasing the interior volume of the pocket.

12. The device according to claim 1, further comprising an exterior pocket, said interior pocket being located at least partly in the exterior pocket, the interior pocket having an interior volume arranged to contain the fluid, the exterior pocket having an interior volume which is not arranged to contain the fluid, said interior volume of the exterior pocket being delimited at least in part by the movable wall, said movable wall being arranged to, under the exertion of the pressing pressure, reduce the interior volume of the exterior pocket by deforming and/or by moving, the device being arranged to guide the fluid according to a circuit comprising a route passing directly from a reservoir and/or from the interior of the piston to the interior of the interior pocket, without go through the inside of the exterior pocket.

13. The device according to claim 1, wherein the device comprises a dispensing valve located in the dispensing channel and arranged to conduct the fluid from the interior pocket to the outlet.

14. The device according to claim 13, wherein one end of the dispensing valve is integral with a rod arranged to sink into the mixer so as to form different channels arranged to lead the different separate flows of fluid to the mixer.

15. The device according to claim 1, wherein the movable wall comprises or is a deformable wall.

16. The device according to claim 1, wherein the movable wall comprises the junction wall.

17. The device according to claim 1, wherein the movable wall is separated from the junction wall.

18. The device according to claim 17, wherein the movable wall comprises or is a rigid wall.

19. The device according to claim 15, wherein the deformable wall comprises successive radial corrugations about an axis.

20. The device according to claim 1, further comprising braking means arranged to block an axial movement, of the piston in the housing, reducing the interior volume of the interior pocket when the movable wall is subjected to a pressing pressure, less than a threshold force, the braking means comprising:

a lug or tab located on the exterior of the piston and/or the interior of the housing, this lug or tab being arranged to rub or be blocked by a surface respectively of the interior of the housing and/or of the exterior of the piston, and/or a lug or tab located on the exterior of the housing and/or the interior of a wall disposed around the housing, this lug or tab being arranged to rub or be blocked by a surface respectively of the interior of the wall and/or of the exterior of the housing.

21. The device according to claim 1, wherein the interior pocket is located under an exterior surface of the device less than 10 mm from this exterior surface.

22. The device according to claim 1, wherein the exercise of a pressing pressure allows a lateral exit of the product through the outlet and a displacement of the movable wall towards the reservoir or next to the reservoir.

23. The device according to claim 1, wherein , in planes perpendicular to the direction of the axial movement of the piston relative to the housing, the interior pocket has a section smaller than the section of the exterior pocket and/or the area of the pressing surface arranged to receive the pressing pressure from the exterior of the device and/or a section of the reservoir.

24. The device according to claim 1, wherein the pocket is located:

directly under the pressing surface arranged to receive the pressing pressure from outside the device, or directly under an assembly consisting of the pressing surface arranged to receive the pressing pressure from outside the device and a channel comprising a valve.

25. The device according to claim 1, comprising return means, arranged to raise the piston out of its housing.

26. The device according to claim 1, wherein the area of an internal section of the housing is divided at least by two with respect to the area of the pressing surface arranged to receive the pressing pressure from outside the device.

27. A device for dispensing a fluid, comprising:

a pocket comprising an interior pocket, said interior pocket having an interior volume arranged to contain the fluid, a movable wall being arranged to, under the exertion of a pressing pressure on a pressing surface reduce the interior volume of the interior pocket by deforming and/or by moving, an outlet arranged to dispense the fluid, wherein the interior volume of the interior pocket is delimited at least in part by:

a piston integral with a junction wall or a bottom wall, a housing of the piston arranged to accommodate the piston and guide the piston during an axial movement of the piston in the housing, the piston or the housing being formed at least in part by at least part of the movable wall, and/or:

the piston or the housing being in direct contact with a wall forming the pressing surface; or the piston or the housing being formed at least in part by at least part of the pressing surface; and the device comprises a dispensing valve located in a dispensing channel and arranged to conduct the fluid from the interior pocket to the outlet;

wherein the pocket further comprises an exterior pocket , the interior pocket being located at least partly in the exterior pocket, the interior and exterior pockets each having an interior volume arranged to contain the fluid, the interior volume of the exterior pocket being delimited at least in part by the movable wall, the movable wall being arranged to, under the exertion of the pressing pressure, reduce the interior volume of the exterior pocket by deforming and/or moving.

28. A device for dispensing a fluid, comprising:

a pocket comprising an interior pocket, said interior pocket having an interior volume arranged to contain the fluid, a movable wall being arranged to, under the exertion of a pressing pressure on a pressing surface, reduce the interior volume of the interior pocket by deforming and/or by moving, an outlet arranged to dispense the fluid, wherein the interior volume of the interior pocket is delimited at least in part by:

a piston integral with a junction wall or a bottom wall, a housing of the piston arranged to accommodate the piston and guide the piston during an axial movement of the piston in the housing, the piston or the housing being formed at least in part by at least part of the movable wall, and/or:

the piston or the housing being in direct contact with a wall forming the pressing surface; or the piston or the housing being formed at least in part by at least part of the pressing surface.

wherein the device comprises an exterior pocket, said interior pocket being located at least partly in the exterior pocket, the interior pocket having an interior volume arranged to contain the fluid, the exterior pocket having an interior volume which is not arranged to contain the fluid, said interior volume of the exterior pocket being delimited at least in part by the movable wall, said movable wall being arranged to, under the exertion of the pressing pressure, reduce the interior volume of the exterior pocket by deforming the wall, the device being arranged to guide the fluid according to a circuit comprising a route passing directly from a reservoir.

* * * * *